(12) United States Patent
Michaels et al.

(10) Patent No.: US 8,428,104 B2
(45) Date of Patent: Apr. 23, 2013

(54) PERMISSION-BASED MULTIPLE ACCESS COMMUNICATIONS SYSTEMS

(75) Inventors: Alan J. Michaels, West Melbourne, FL (US); David B. Chester, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 713 days.

(21) Appl. No.: 12/496,170

(22) Filed: Jul. 1, 2009

(65) Prior Publication Data

US 2011/0002463 A1    Jan. 6, 2011

(51) Int. Cl.
*H04B 1/00* (2006.01)
(52) U.S. Cl.
USPC .......................... 375/141; 375/130; 375/140
(58) Field of Classification Search ................ 375/141
See application file for complete search history.

(56) References Cited

U.S. PATENT DOCUMENTS

| | | | |
|---|---|---|---|
| 3,564,223 A | 2/1971 | Harris et al. |
| 4,095,778 A | 6/1978 | Wing |
| 4,646,326 A | 2/1987 | Backof, Jr. et al. |
| 4,703,507 A | 10/1987 | Holden |
| 4,893,316 A | 1/1990 | Janc et al. |
| 5,007,087 A | 4/1991 | Bernstein et al. |
| 5,048,086 A | 9/1991 | Bianco et al. |
| 5,077,793 A | 12/1991 | Falk et al. |
| 5,210,770 A | 5/1993 | Rice |
| 5,276,633 A | 1/1994 | Fox et al. |
| 5,297,153 A | 3/1994 | Baggen et al. |
| 5,297,206 A | 3/1994 | Orton |
| 5,319,735 A | 6/1994 | Preuss et al. |
| 5,412,687 A | 5/1995 | Sutton et al. |
| 5,596,600 A | 1/1997 | Dimos et al. |
| 5,598,476 A | 1/1997 | LaBarre et al. |

(Continued)

FOREIGN PATENT DOCUMENTS

| | | |
|---|---|---|
| EP | 0 849 664 A2 | 6/1998 |
| EP | 0 949 563 | 10/1999 |

(Continued)

OTHER PUBLICATIONS

Taylor, F.J., "Residue Arithmetic a Tutorial with Examples", Computer, vol. 17, No. 5, pp. 50-62, May 1984, doi: 10.1109/MC.1984.1659138.

(Continued)

*Primary Examiner* — Erin File
(74) *Attorney, Agent, or Firm* — Fox Rothschild, LLP; Robert J. Sacco

(57) ABSTRACT

Systems (100) and methods (400) for selectively controlling access to multiple data streams which are communicated using a shared frequency spectrum and shared spreading codes. The methods involve generating a first product signal (FPS) by spreading first symbols of a first amplitude modulated (AM) signal using a first spreading code (SC). The methods also involve generating a second product signal (SPS) by spreading second symbols of a complimentary AM signal using a second SC. The FPS (124) and SPS 126 are combined to form a protected data communication signal (PDCS) including first data recoverable by a receiver (106). A global data communication signal (GDCS) is combined with PDCS (128) to form an output signal (140) having a spread spectrum format. The GDCS is generated using a digital modulation process and includes second data recoverable by a plurality of receivers (106, 108).

20 Claims, 16 Drawing Sheets

U.S. PATENT DOCUMENTS

| | | |
|---|---|---|
| 5,646,997 A | 7/1997 | Barton |
| 5,677,927 A | 10/1997 | Fullerton et al. |
| 5,680,462 A | 10/1997 | Miller et al. |
| 5,757,923 A | 5/1998 | Koopman, Jr. |
| 5,811,998 A | 9/1998 | Lundberg et al. |
| 5,852,630 A | 12/1998 | Langberg et al. |
| 5,900,835 A | 5/1999 | Stein |
| 5,923,760 A | 7/1999 | Abarbanel et al. |
| 5,924,980 A | 7/1999 | Coetzee |
| 5,937,000 A | 8/1999 | Lee et al. |
| 5,963,584 A | 10/1999 | Boulanger et al. |
| 6,014,446 A | 1/2000 | Finkelstein |
| 6,023,612 A | 2/2000 | Harris et al. |
| 6,038,317 A | 3/2000 | Magliveras et al. |
| 6,078,611 A | 6/2000 | La Rosa et al. |
| 6,141,786 A | 10/2000 | Cox et al. |
| 6,212,239 B1 | 4/2001 | Hayes |
| 6,304,216 B1 | 10/2001 | Gronemeyer |
| 6,304,556 B1 | 10/2001 | Haas |
| 6,310,906 B1 | 10/2001 | Abarbanel et al. |
| 6,314,187 B1 | 11/2001 | Menkhoff et al. |
| 6,331,974 B1 | 12/2001 | Yang et al. |
| 6,377,782 B1 | 4/2002 | Bishop et al. |
| 6,473,448 B1 | 10/2002 | Shono et al. |
| 6,570,909 B1 | 5/2003 | Kansakoski et al. |
| 6,614,914 B1 | 9/2003 | Rhoads et al. |
| 6,665,692 B1 | 12/2003 | Nieminen |
| 6,732,127 B2 | 5/2004 | Karp |
| 6,744,893 B1 | 6/2004 | Fleming-Dahl |
| 6,754,251 B1 | 6/2004 | Sriram et al. |
| 6,766,345 B2 | 7/2004 | Stein et al. |
| 6,842,479 B2 | 1/2005 | Bottomley |
| 6,842,745 B2 | 1/2005 | Occhipinti et al. |
| 6,864,827 B1 | 3/2005 | Tise et al. |
| 6,865,218 B1 | 3/2005 | Sourour |
| 6,888,813 B1 | 5/2005 | Kishi |
| 6,901,104 B1 | 5/2005 | Du et al. |
| 6,937,568 B1 | 8/2005 | Nicholl et al. |
| 6,980,656 B1 | 12/2005 | Hinton, Sr. et al. |
| 6,980,657 B1 | 12/2005 | Hinton, Sr. et al. |
| 6,986,054 B2 | 1/2006 | Kaminaga et al. |
| 6,993,016 B1 | 1/2006 | Liva et al. |
| 6,999,445 B1 | 2/2006 | Dmitriev et al. |
| 7,023,323 B1 | 4/2006 | Nysen |
| 7,027,598 B1 | 4/2006 | Stojancic et al. |
| 7,035,220 B1 | 4/2006 | Simcoe |
| 7,069,492 B2 | 6/2006 | Piret et al. |
| 7,076,065 B2 | 7/2006 | Sherman et al. |
| 7,078,981 B2 | 7/2006 | Farag |
| 7,079,651 B2 | 7/2006 | Den Boer et al. |
| 7,095,778 B2 | 8/2006 | Okubo et al. |
| 7,133,522 B2 | 11/2006 | Lambert |
| 7,170,997 B2 | 1/2007 | Petersen et al. |
| 7,190,681 B1 | 3/2007 | Wu |
| 7,200,225 B1 | 4/2007 | Schroeppel |
| 7,233,969 B2 | 6/2007 | Rawlins et al. |
| 7,233,970 B2 | 6/2007 | North et al. |
| 7,245,723 B2 | 7/2007 | Hinton, Sr. et al. |
| 7,269,198 B1 | 9/2007 | Elliott et al. |
| 7,269,258 B2 | 9/2007 | Ishihara et al. |
| 7,272,168 B2 | 9/2007 | Akopian |
| 7,277,540 B1 | 10/2007 | Shiba et al. |
| 7,286,802 B2 | 10/2007 | Beyme et al. |
| 7,310,309 B1 | 12/2007 | Xu |
| 7,349,381 B1 | 3/2008 | Clark et al. |
| 7,423,972 B2 | 9/2008 | Shaham et al. |
| 7,529,292 B2 | 5/2009 | Bultan et al. |
| 7,643,537 B1 | 1/2010 | Giallorenzi et al. |
| 7,725,114 B2 * | 5/2010 | Feher .................. 455/456.1 |
| 7,779,060 B2 | 8/2010 | Kocarev et al. |
| 7,830,214 B2 | 11/2010 | Han et al. |
| 7,853,014 B2 | 12/2010 | Blakley et al. |
| 7,929,498 B2 * | 4/2011 | Ozluturk et al. .............. 370/335 |
| 7,949,032 B1 | 5/2011 | Frost |
| 7,974,146 B2 | 7/2011 | Barkley |
| 2001/0017883 A1 | 8/2001 | Tiirola et al. |
| 2002/0012403 A1 | 1/2002 | McGowan et al. |
| 2002/0034191 A1 | 3/2002 | Shattil |
| 2002/0034215 A1 | 3/2002 | Inoue et al. |
| 2002/0041623 A1 | 4/2002 | Umeno |
| 2002/0054682 A1 | 5/2002 | Di Bernardo et al. |
| 2002/0099746 A1 | 7/2002 | Tie et al. |
| 2002/0110182 A1 | 8/2002 | Kawai |
| 2002/0115461 A1 | 8/2002 | Shiraki et al. |
| 2002/0122465 A1 * | 9/2002 | Agee et al. .................... 375/141 |
| 2002/0128007 A1 | 9/2002 | Miyatani |
| 2002/0172291 A1 | 11/2002 | Maggio et al. |
| 2002/0174152 A1 | 11/2002 | Terasawa et al. |
| 2002/0176511 A1 | 11/2002 | Fullerton et al. |
| 2002/0186750 A1 | 12/2002 | Callaway et al. |
| 2003/0007639 A1 | 1/2003 | Lambert |
| 2003/0016691 A1 | 1/2003 | Cho |
| 2003/0044004 A1 | 3/2003 | Blakley et al. |
| 2003/0156603 A1 | 8/2003 | Rakib et al. |
| 2003/0182246 A1 | 9/2003 | Johnson et al. |
| 2003/0198184 A1 | 10/2003 | Huang et al. |
| 2004/0001534 A1 | 1/2004 | Yang |
| 2004/0001556 A1 | 1/2004 | Harrison et al. |
| 2004/0059767 A1 | 3/2004 | Liardet |
| 2004/0092291 A1 | 5/2004 | Legnain et al. |
| 2004/0100588 A1 * | 5/2004 | Hartson et al. ................ 348/608 |
| 2004/0146095 A1 | 7/2004 | Umeno et al. |
| 2004/0156427 A1 | 8/2004 | Gilhousen et al. |
| 2004/0161022 A1 | 8/2004 | Glazko et al. |
| 2004/0165650 A1 | 8/2004 | Miyazaki et al. |
| 2004/0165681 A1 | 8/2004 | Mohan |
| 2004/0196212 A1 | 10/2004 | Shimizu |
| 2004/0196933 A1 | 10/2004 | Shan et al. |
| 2005/0004748 A1 | 1/2005 | Pinto et al. |
| 2005/0021308 A1 | 1/2005 | Tse et al. |
| 2005/0031120 A1 | 2/2005 | Samid |
| 2005/0050121 A1 | 3/2005 | Klein et al. |
| 2005/0075995 A1 | 4/2005 | Stewart et al. |
| 2005/0089169 A1 | 4/2005 | Kim et al. |
| 2005/0129096 A1 * | 6/2005 | Zhengdi et al. ............... 375/150 |
| 2005/0207574 A1 | 9/2005 | Pitz et al. |
| 2005/0249271 A1 | 11/2005 | Lau et al. |
| 2005/0254587 A1 | 11/2005 | Kim et al. |
| 2005/0259723 A1 | 11/2005 | Blanchard |
| 2005/0265430 A1 | 12/2005 | Ozluturk et al. |
| 2005/0274807 A1 | 12/2005 | Barrus et al. |
| 2006/0034378 A1 | 2/2006 | Lindskog et al. |
| 2006/0072754 A1 | 4/2006 | Hinton et al. |
| 2006/0088081 A1 | 4/2006 | Withington et al. |
| 2006/0093136 A1 | 5/2006 | Zhang et al. |
| 2006/0123325 A1 | 6/2006 | Wilson et al. |
| 2006/0209926 A1 | 9/2006 | Umeno et al. |
| 2006/0209932 A1 | 9/2006 | Khandekar et al. |
| 2006/0251250 A1 | 11/2006 | Ruggiero et al. |
| 2006/0264183 A1 | 11/2006 | Chen et al. |
| 2007/0098054 A1 | 5/2007 | Umeno |
| 2007/0121945 A1 | 5/2007 | Han et al. |
| 2007/0133495 A1 | 6/2007 | Lee et al. |
| 2007/0149232 A1 | 6/2007 | Koslar |
| 2007/0195860 A1 | 8/2007 | Yang et al. |
| 2007/0201535 A1 | 8/2007 | Ahmed |
| 2007/0217528 A1 | 9/2007 | Miyoshi et al. |
| 2007/0230701 A1 | 10/2007 | Park et al. |
| 2007/0253464 A1 | 11/2007 | Hori et al. |
| 2007/0291833 A1 | 12/2007 | Shimanskiy |
| 2008/0008320 A1 | 1/2008 | Hinton et al. |
| 2008/0016431 A1 | 1/2008 | Lablans |
| 2008/0019422 A1 | 1/2008 | Smith et al. |
| 2008/0026706 A1 | 1/2008 | Shimizu et al. |
| 2008/0075195 A1 | 3/2008 | Pajukoski et al. |
| 2008/0080439 A1 | 4/2008 | Aziz et al. |
| 2008/0084919 A1 | 4/2008 | Kleveland et al. |
| 2008/0095215 A1 | 4/2008 | McDermott et al. |
| 2008/0107268 A1 | 5/2008 | Rohde et al. |
| 2008/0198832 A1 | 8/2008 | Chester |
| 2008/0204306 A1 | 8/2008 | Shirakawa |
| 2008/0263119 A1 | 10/2008 | Chester et al. |
| 2008/0294707 A1 | 11/2008 | Suzuki et al. |
| 2008/0294710 A1 | 11/2008 | Michaels |
| 2008/0294956 A1 | 11/2008 | Chester et al. |
| 2008/0304553 A1 | 12/2008 | Zhao et al. |
| 2008/0304666 A1 | 12/2008 | Chester et al. |

| | | | |
|---|---|---|---|
| 2008/0307022 | A1 | 12/2008 | Michaels et al. |
| 2008/0307024 | A1 | 12/2008 | Michaels et al. |
| 2009/0022212 | A1 | 1/2009 | Ito et al. |
| 2009/0034727 | A1 | 2/2009 | Chester et al. |
| 2009/0044080 | A1 | 2/2009 | Michaels et al. |
| 2009/0059882 | A1 | 3/2009 | Hwang et al. |
| 2009/0086848 | A1 | 4/2009 | Han et al. |
| 2009/0110197 | A1 | 4/2009 | Michaels |
| 2009/0122926 | A1 | 5/2009 | Azenkot et al. |
| 2009/0196420 | A1 | 8/2009 | Chester et al. |
| 2009/0202067 | A1 | 8/2009 | Michaels et al. |
| 2009/0245327 | A1 | 10/2009 | Michaels |
| 2009/0279688 | A1 | 11/2009 | Michaels et al. |
| 2009/0279690 | A1 | 11/2009 | Michaels et al. |
| 2009/0285395 | A1 | 11/2009 | Hu et al. |
| 2009/0296860 | A1 | 12/2009 | Chester et al. |
| 2009/0300088 | A1 | 12/2009 | Michaels et al. |
| 2009/0309984 | A1 | 12/2009 | Bourgain et al. |
| 2009/0310650 | A1 | 12/2009 | Chester et al. |
| 2009/0316679 | A1 | 12/2009 | Van Der Wateren |
| 2009/0323766 | A1 | 12/2009 | Wang et al. |
| 2009/0327387 | A1 | 12/2009 | Michaels et al. |
| 2010/0029225 | A1 | 2/2010 | Urushihara et al. |
| 2010/0030832 | A1 | 2/2010 | Mellott |
| 2010/0054225 | A1 | 3/2010 | Hadef et al. |
| 2010/0073210 | A1 | 3/2010 | Bardsley et al. |
| 2010/0111296 | A1 | 5/2010 | Brown et al. |
| 2010/0142593 | A1* | 6/2010 | Schmid .......................... 375/147 |
| 2010/0254430 | A1 | 10/2010 | Lee et al. |
| 2010/0260276 | A1 | 10/2010 | Orlik et al. |
| 2011/0222393 | A1 | 9/2011 | Kwak et al. |

FOREIGN PATENT DOCUMENTS

| | | |
|---|---|---|
| EP | 2 000 900 A2 | 12/2008 |
| EP | 2 000 902 A2 | 12/2008 |
| GB | 1167272 A | 10/1969 |
| JP | 7140983 A | 6/1995 |
| JP | 2001255817 A | 9/2001 |
| JP | 2004279784 A | 10/2004 |
| JP | 2005017612 A | 1/2005 |
| WO | WO-0135572 A2 | 5/2001 |
| WO | WO-2006 110954 | 10/2006 |
| WO | WO 2008 065191 | 6/2008 |
| WO | WO-2008099367 A2 | 8/2008 |
| WO | WO-2008130973 A1 | 10/2008 |
| WO | WO 2009 146283 | 12/2009 |

OTHER PUBLICATIONS

Barda, A; et al., "Chaotic signals for multiple access communications," Electrical and Electronics Engineers in Israel, 1995, Eighteenth Convention of, vol., No., pp. 2.1.3/1-2.1/3/5, Mar. 7-8, 1995.
Alia, G., et al., "A VLSI Algorithm for Direct and Reverse Conversion from Weighted Binary Number System to Residue Number System", IEEE Trans on Circuits and Systems, vol. Cas-31, No. 12, Dec. 1984.
Menezes, Vanstone, Oorschot: "Handbook of Applied Cryptography", 1997, CRC Press LLC, USA, XP002636791, p. 80-85, p. 238-242.
Schneier, Bruce: "Applied Cryptography Second Edition", 1997, John Wiley & Sons, USA, XP002636792, p. 254-255.
Socek, D., et al., Short Paper: Enhanced 1-D Chaotic Key Based Algorithm for Image Encryption, Sep. 2005, IEEE.
Abu-Khader, Nabil, Square Root Generator for Galois Field in Multiple-Valued Logic., Recent Patents on Electrical Engineering; Sep. 2011, vol. 4 Issue 3, p. 209-213, 5p, 2 Diagrams, 3 Charts.
Pirkin, Llya, Calculations in Galois Fields., C/C++ Users Journal; Oct. 2004, vol. 22 Issue 10, p. 14-18, 4p, 1 Color Photograph.
Popescu, Angel, A Galois Theory for the Field Extension K ((X))/K., Glasgow Mathematical Journal; Sep. 2010, vol. 52 Issue 3, p. 447-451, 5p.
Pirkin, Ilya, Calculations in Galois Fields., C/C++ Users Journal; Oct. 2004, vol. 22 Issue 10, p. 14-18, 4p, 1 Color Photograph.
Diaz-Toca, G.M. and Lombardi, H. , Dynamic Galois Theory., Journal of Symbolic Computation; Dec. 2010, vol. 45 Issue 12, p. 1316-1329, 14p.
Galias, Z., et al., "Quadrature Chaos-Shift Keying: Theory and Performance Analysis", IEEE Transactions on Circuits and Systems Part I: Regular Papers, IEEE Service Center, New York, NY US, vol. 48, No. 12, Dec. 1, 2001 XP011012427; pp. 1510-1514.
International Search Report mailed Dec. 30, 2011, European Patent Application No. 11001222.6, in the name of Harris Corporation.
Abel, et al., "Chaos Communications-Principles, Schemes, and System Analysis" Proceedings for the IEEE, IEEE. New York, NY. vol. 90, No. 5, May 1, 2002, XP011064997, ISSN: 0018-9219.
Barile, Margherita, "Bijective," From MathWorld—A Wolfram Web Resource, created by Eric W. Weisstein. http://mathworld.wolfram.com/Bijective.html.
Chren, W A: "PN Code Generator with Low Delay-power Product for Spread-Spectrum Communication Systems" IEEE Transactions on Circuits and Systems II: Express Briefs, IEEE Service Center, New York, NY US, vol. 46, No. 12, Dec. 1, 1999, pp. 1506-1511, XP000932002, ISSN: 1057-7130.
Deckert, T., et al: "Throughput of WLAN with TDMA and Superimposed Transmission with Resource and Traffic Constraints" Personal, Indoor and Mobile Radio Communications, 2006 IEEE 17th Inter National Symposium on, IEEE, PI, Sep. 1, 2006, pp. 1-5, XP031023581, ISBN: 978-1-4244-0329-5.
Deckert, T., et al: 1-10 "Superposed Signaling Option for Bandwidth Efficient Wireless LANs" Proceedings of the 7th International Symposium on Wireless Personal Multimedia Communications, [Online] Sep. 15, 2004,XPOO2558039.
De Matteis, A., et al., "Pseudorandom Permutation". Journal of Computational and Applied Mathematics, Elsevier, Netherlands, vol. 142, No. 2, May 15, 2002, pp. 367-375, XP007906923, ISSN: 0377-0427.
Knuth, D E: "The Art of Computer Programming, 3.2.2 Other Methods" The Art of Computer Programming. vol. 2: Seminumerical Algorithms, Boston, MA: Addison-Wesley, US, Jan. 1, 1998, pp. 26-40, XP002409615, ISBN: 978-0-0201-89684-8.
Knuth, D.E., "The Art of Computer Programming, Third Edition; vol. 2 Seminumerical Algorithms". Feb. 2005, Addison-Wesley, Boston 310200, XP002511903, pp. 142-146, 284-292.
Kolumban, et al., "The Role of Synchronization in Digital Communications Using Chaos—Part II: Chaotic Modulation and Chaotic Synchronization", IEEE Transactions on Circuits and Systems Part I: Regular Papers, IEEE Service Center, New York, NY US, vol. 45, No. 11, Nov. 1, 1998, XP011011827, ISSN: 1057-7122.
Kolumban, et al., "Chaotic Communications with Correlator Receivers: Theory and Performance Limits" Proceedings of the IEEE, vol. 90, No. 5, May 2002.
Leung, et al., "Time-varying synchronization of chaotic systems in the presence of system mismatch" Physical Review E (Statistical, Nonlinear, and Soft Matter Physics) APS through AIP USA, [online] Vo. 69, No. 2, Feb. 1, 2004, pp. 26201-1, XP002499416, ISSN: 1063-651X. Retrieved from the Internet: URL:http://prola.aps.org/pdf/PRE/v69/i2/e026201 [retrieved Oct. 13, 2008].
Manikandan, et al, "A Novel Pulse Based Ultrawide Band System Using Chaotic Spreading Sequences" Communication Systems Software and Middleware, 2007. COMSWARE 2007. 2nd International Conference on, IEEE, PI, Jan. 1, 2007, pp. 1-5, XP031113946 ISBN: 978-1-4244-0613-5; p. 1, p. 5.
Morsche et al., "Signals and Systems," lecture notes, University of Eindhoven, The Netherlands (1999).
Nakamura, et al, "Chaotic synchronization-based communications using constant envelope pulse" Electrical Engineering in Japan, [Online] vol. 163, No. 3, Feb. 12, 2008, pp. 47-56, XP002539977 Japan. Retrieved from the Internet: URL:http://www3.interscience.wiley.com/cgi-bin/fulltext/117910986/PDFSTART>; [retrieved on Aug. 4, 2009] p. 47-p. 48; p. 50-p. 51.
Panella, et al., "An RNS Architecture for Quasi-Chaotic Oscillators" The Journal of VLSI Signal Processing, Kluwer Academic Publishes, BO, vol. 33, No. 1-2, Jan. 1, 2003, pp. 199-220, XP019216547, ISSN: 1573-109X.
Pleszczynski, S, "On the Generation of Permutations" Information Processing Letters, Amsterdam, NL, vol. 3, No. 6, Jul. 1, 1975, pp. 180-183, XP008023810, ISSN: 0020-0190.
Pourbigharaz F. et al, Modulo-Free Architecture for Binary to Residue Transformation with Respect to (2m−1, 2m, 2m+1) Moduli Set, IEEE International Symposium on Circuits and Systems, May 30-Jun. 2, 1994, pp. 317-320, vol. 2, London, UK.

Salberg, et al, "Stochastic multipulse-PAM: A subspace modulation technique with diversity" Signal Processing, Elsevier Science Publishers B.V. Amsterdam, NL, vol. 83, No. 12, Dec. 1, 2003, pp. 2559-2577, XP004467986; ISSN: 0165-1684.

Vanwiggeren et al., "Chaotic Communication Using Time-Delayed Optical Systems", International Journal of Bifurcation and Chaos, vol. 9, No. 11 (1999), pp. 2129-2156, World Scientific Publishing Company.

Weisstein, Eric W., "Injection," From MathWorld—A Wolfram Web Resource. http://mathworld.wolfram.com/Injection.html.

Weisstein, Eric W. "Surjection," From MathWorld—A Wolfram Web Resource, http://mathworld.wolfram.com/Surjection.html.

Yen, et al., (1999) "Residual Number System Assisted CDMA: A New System Concept", In: ACTS'99, Jun. 8-11, 1999, Sorrento, Italy.

Yu, et al., "A comparative Study of Different Chaos Based Spread Spectrum Communication Systems", ISCAS 2001, Proceedings of the 2001 IEEE International Symposium on Circuits and Systems, Sydney, Australia, May 6-9, 2001; (IEEE International Symposium on Circuits and Systems], New York, NY : IEEE, US, vol. 3, pp. 216-216, XP01054114, ISBN: 978-0-7803-6685-5.

Michaels, et al., U.S. Appl. No. 12/496,214, filed Jul. 1, 2009, entitled "Anti-Jam Communications Having Selectively Variable PAPR Including Cazac Waveform".

Michaels, et al., U.S. Appl. No. 12/507,111, filed Jul. 22, 2009, entitled "Anti-Jam Communications Using Adaptive Chaotic Spread Waveform".

Chester, et al., U.S. Appl. No. 12/480,264, filed Jun. 8, 2009, entitled "Continuous Time Chaos Dithering".

Chester, et al., U.S. Appl. No. 12/481,704, filed Jun. 10, 2009, entitled "Discrete Time Chaos Dithering".

Michaels, et al., U.S. Appl. No. 12/345,163, filed Dec. 29, 2008, entitled "Communications System Employing Chaotic Spreading Codes With Static Offsets".

Micheals, et al., U.S. Appl. No. 12/344,962, filed Dec. 29, 2008, entitled "Communications System Employing Orthogonal Chaotic Spreading Codes".

Michaels, et al., U.S. Appl. No. 12/396,828, filed Jun. 3, 2009, entitled "Communications System Employing Orthogonal Chaotic Spreading Codes".

Michaels, et al., U.S. Appl. No. 12/496,170, filed Jul. 1, 2009, entitled "Permission Based Multiple Access Communications Systems".

Michaels, et al., U.S. Appl. No. 12/496,233, filed Jul. 1, 2009, entitled "Permission-Based Secure Multiple Access Communication Systems Rotations".

Michaels, et al., U.S. Appl. No. 12/507,512, filed Jul. 22, 2009, entitled "Permission-Based TDMA Chaotic Communication Systems".

Micheals, et al., U.S. Appl. No. 12/496,085, filed Jul. 1, 2009, entitled, "High-Speed Cryptographic System Using Chaotic Sequences".

Michaels, et al., U.S. Appl. No. 12/496,123, filed Jul. 1, 2009, entitled, "Rake Receiver for Spread Spectrum Chaotic Communications Systems".

Michaels, et al., U.S. Appl. No. 12/496,146, filed Jul. 1, 2009, entitled "Improved Symbol Estimation for Chaotic Spread Spectrum Signal".

Micheals, et al., U.S. Appl. No. 12/480,316, filed Jun. 8, 2009, entitled "Symbol Duration Dithering for Secured Chaotic Communications".

Michaels, et al., U.S. Appl. No. 12/496,183, filed Jul. 1, 2009, entitled "Bit Error Rate Reduction in Chaotic Communications".

Michaels, Alan, U.S. Appl. No. 12/248,131, filed Oct. 9, 2008, entitled "Ad-Hoc Netowrk Acquistion Using Chaotic Sequence Spread Waveform".

Michaels, Alan, U.S. Appl. No. 12/201,021, filed Aug. 29, 2008, entitled, "Multi-Tier Ad-Hoc Network Communications".

Office Action issued in Japanese Patent Application No. 2010-504206 in the name of Harris Corporation; mailed Jan. 6, 2012.

Bender, et al., "Techniques for data hiding", 1995, IBM Systems Journal, vol. 35, pp. 313-336.

Aparicio; "Communications Systems Based on Chaos" May 2007. Universldad Rey Juan Carlos.

Bererber, S.M., et al., "Design of a CDMA System in FPGA Technology", Vehicular Technology Conference, 2007. VTC2007-Spring. IEEE 65$^{th}$ Apr. 22, 2007, Apr. 25, 2007, pp. 3061-3065, XP002575053 Dublin ISBN: 1-4244-0266-2 Retrieved from the Internet: URL:http://ieeexplore.ieee.org> [retrieved on Mar. 23, 2010].

Desoky, A.H., et al., "Cryptography Software System Using Galois Field Arithmetic" 2006 IEEE Information Assurance Workshop, West Point, NY, Jun. 12-13, Piscataway, NJ, USA IEEE, Jan. 1, 2006, pp. 386-387, XP031099891.

El-Khamy S E: "New trends in wireless multimedia communications based on chaos and fractals" National Radio Science Conference, 2004. NRSC 2004. Proceedings of the Twenty-First Cairo, Egypt Mar. 16-18, 2004, Piscataway, NJ, USA, IEEE, Mar. 16, 2004, pp. _1-1_1, XP010715117 ISBN: 978-977-5031-77-8.

Lai, X., et al., "A Proposal for a New Block Encryption Standard" Advances in Cryptology—Eurocrypt '90, Workshop on the Theory and Application of Cryptographic Techniques Proceedings, Springer-Verlag Berlin, Germany, 1998, pp. 389-404, XP000617517.

Soobul, Y., et al. "Digital chaotic coding and modulation in CDMA" IEEE AFRICON 2002 Oct. 2, 2002, Oct. 4, 2002, pp. 841-846, XP002575052 Retrieved from the Internet: URL:http://ieeexplore.ieee.org> [retrieved on Mar. 23, 2010].

Rabiner, Lawrence R., "A Tutorial on Hidden Markov Models and Selected Applications in Speech Recognition", Proceedings of the IEEE, vol. 77, No. 2, Feb. 1989.

Boyar, "Inferring Sequences Produce by Pseudo-Random Number Generators", Journal of the Associate for Computing Machine, vol. 36, No. 1, pp. 20-41, 1989.

Barile, M., "Bijective", From MathWorld—A Wolfram Web Resource, created by Eric W. Weisstein, [online] [retrieved on Nov. 8, 2010] Retrieved from the Internet: <http://mathworld.wolfram.com/Bijective.html>.

Weisstein, E., Surejection:, From MathWorld—A Wolfram Web Resource [online] [retrieved on Nov. 8, 2010] Retrieved from the Internet: <http://mathworld.wolfram.com/surjection.html>.

Weisstein, E., Surejection:, From MathWorld—A Wolfram Web Resource [online] [retrieved on Nov. 8, 2010] Retrieved from the Internet: http://mathworld.wolfram.com/injection.html>.

Harris Corp., International Search Report mailed Feb. 11, 2010, Application Serial No. PCT/US2009/059948.

Harris Corp., International Search Report mailed Apr. 13, 2010, Application Serial No. PCT/US2009/0069121.

Harris Corp., International Search Report mailed Apr. 13, 2010, Application Serial No. PCT/US2009/0069118.

Harris Corp., European Search Report mailed Mar. 4, 2010, Patent Application No. 08009745.4.

* cited by examiner

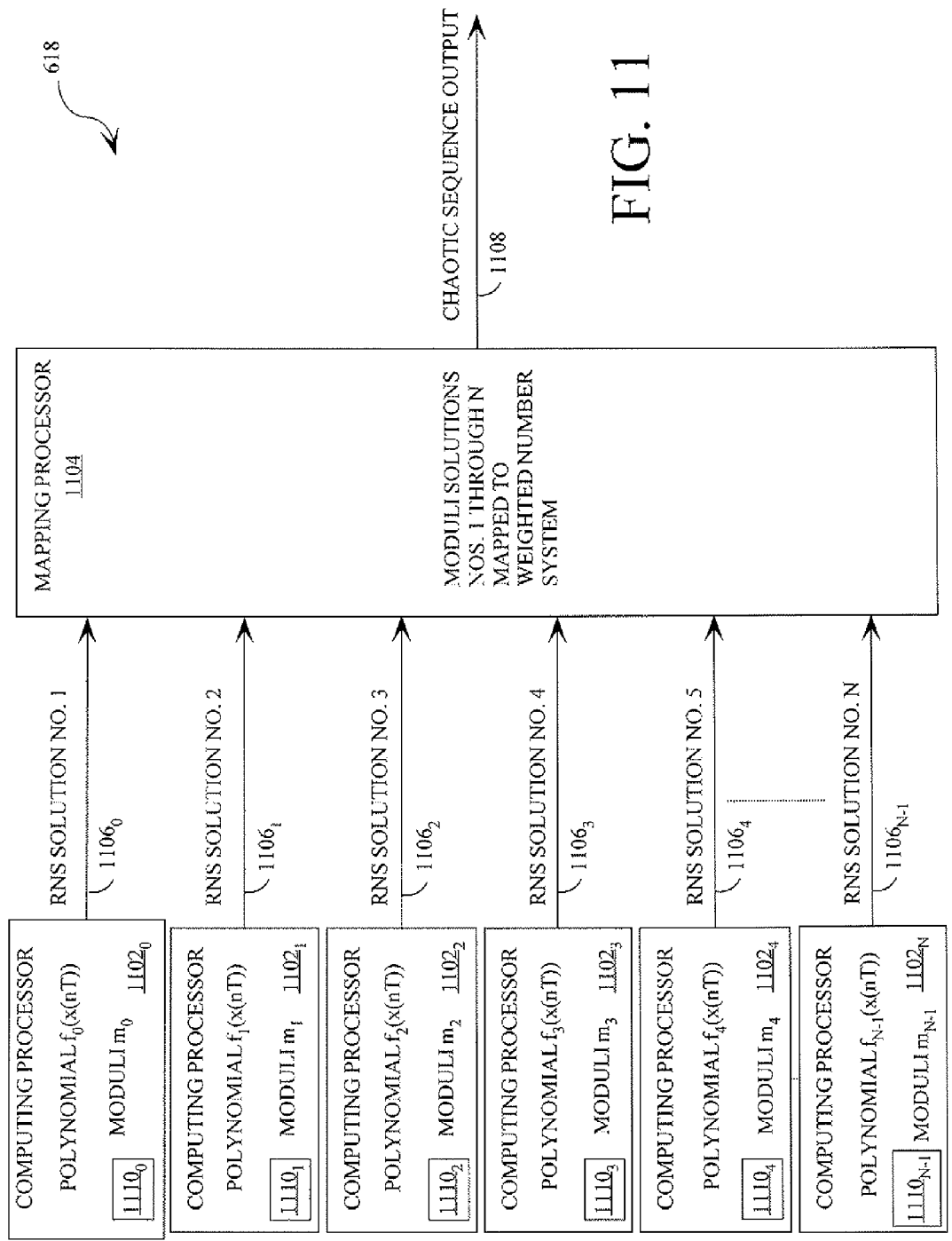

PERMISSION-BASED MULTIPLE ACCESS COMMUNICATIONS SYSTEMS

BACKGROUND OF THE INVENTION

1. Statement of the Technical Field

The invention concerns communications systems. More particularly, the invention concerns communications systems employing permission-based chaos-based multiple access methods.

2. Description of the Related Art

Pseudorandom number generators (PRNG) generally utilize digital logic or a digital computer and one or more algorithms to generate a sequence of numbers. While the output of conventional PRNG may approximate some of the properties of random numbers, they are not truly random. For example, the output of a PRNG has cyclostationary features that can be identified by analytical processes.

Chaotic systems can generally be thought of as systems which vary unpredictably unless all of its properties are known. When measured or observed, chaotic systems do not reveal any discernible regularity or order. Chaotic systems are distinguished by a sensitive dependence on a set of initial conditions and by having an evolution through time and space that appears to be quite random. However, despite its "random" appearance, chaos is a deterministic evolution.

Practically speaking, chaotic signals are extracted from chaotic systems and have random-like, non-periodic properties that are generated deterministically and are distinguishable from pseudo-random signals generated using conventional PRNG devices. In general, a chaotic sequence is one in which the sequence is empirically indistinguishable from true randomness absent some knowledge regarding the algorithm which is generating the chaos.

Some have proposed the use of multiple pseudo-random number generators to generate a digital chaotic-like sequence. However, such systems only produce more complex pseudo-random number sequences that possess all pseudo-random artifacts and no chaotic properties. While certain polynomials can generate chaotic behavior, it is commonly held that arithmetic required to generate chaotic number sequences requires an impractical implementation due to the precisions required.

Communications systems utilizing chaotic sequences offer promise for being the basis of a next generation of low probability of intercept (LPI) waveforms, low probability of detection (LPD) waveforms, and secure waveforms. While many such communications systems have been developed for generating chaotically modulated waveforms, such communications systems suffer from low throughput. The term "throughput", as used herein, refers to the amount of data transmitted over a data link during a specific amount of time. This throughput limitation stems from the fact that a chaotic signal is produced by means of a chaotic analog circuit subject to drift.

The throughput limitation with chaos based communication systems can be traced to the way in which chaos generators have been implemented. Chaos generators have been conventionally constructed using analog chaotic circuits. The reason for reliance on analog circuits for this task has been the widely held conventional belief that efficient digital generation of chaos is impossible. Notwithstanding the apparent necessity of using analog type chaos generators, that approach has not been without problems. For example, analog chaos generator circuits are known to drift over time. The term "drift", as used herein, refers to a slow long term variation in one or more parameters of a circuit. The problem with such analog circuits is that the inherent drift forces the requirement that state information must be constantly transferred over a communication channel to keep a transmitter and receiver synchronized.

The transmitter and receiver in coherent chaos based communication systems are synchronized by exchanging state information over a data link. Such a synchronization process offers diminishing return because state information must be exchanged more often between the transmitter and the receiver to obtain a high data rate. This high data rate results in a faster relative drift. In effect, state information must be exchanged at an increased rate between the transmitter and receiver to counteract the faster relative drift. Although some analog chaotic communications systems employ a relatively efficient synchronization process, these chaotic communications systems still suffer from low throughput.

The alternative to date has been to implement non-coherent chaotic waveforms. However, non-coherent waveform based communication systems suffer from reduced throughput, error rate performance, and exploitability. In this context, the phrase "non-coherent waveform" means that the receiver is not required to reproduce any synchronized copy of the chaotic signals that have been generated in the transmitter. The phrase "communications using a coherent waveform" means that the receiver is required to reproduce a synchronized copy of the chaotic signals that have been generated in the transmitter.

In view of the forgoing, there is a need for a coherent chaos-based communications system having an increased throughput. There is also a need for a chaos-based communications system configured for generating a signal having chaotic properties. As such, there is further a need for a chaos-based communications system that corrects drift between a transmitter and a receiver without an extreme compromise of throughput. Further, there is a need for a secure communication system that provides permission-based segmentation of transmitted data to multiple user groups.

SUMMARY OF THE INVENTION

Embodiments of the present invention relate to methods for selectively controlling access to multiple data streams which are communicated using a shared frequency spectrum and shared spreading codes. The methods involve generating a first product signal by spreading first symbols of a first amplitude modulated signal using a first spreading code. The methods also involve generating a second product signal by spreading second symbols of a complimentary amplitude modulated signal using a second spreading code. The first and second spreading codes include pseudo-random number sequences and/or digitally generated chaotic sequences. The second spreading code is orthogonal or statistically orthogonal to the first spreading code.

The first and second product signals are combined to form a protected data communication signal. The protected data communication signal includes first data recoverable by at least one receiver of a plurality of receivers. The methods further involve combining a global data communication signal and the protected data communication signal to form an output signal having a spread spectrum format. The global data communication signal is generated using a digital modulation process. The digital modulation process can include a phase modulation process. The global data communication signal includes second data recoverable by all of the receivers.

According to an aspect of the present invention, the first and second product signals are additively combined to produce a constant power envelope protected data communication signal. The global data communication signal is recovered at a first receiver of the plurality of receivers by de-spreading the output signal using a sum of a third spreading code and a fourth spreading code which are respectively identical to the first spreading code and the second spreading code. The first and third spreading codes are synchronized in time. Also, the second and fourth spreading codes are synchronized in time. Notably, the first receiver is prevented from independently recovering the third spreading code or the fourth spreading code. The first product signal is recovered at the first or a second receiver of the plurality of receivers by de-spreading the output using a third spreading code that is identical to the first spreading code.

Embodiments of the present invention also relate to communication systems configured for selectively controlling access to multiple data streams which are communicated using a shared frequency spectrum and shared spreading codes. The communication systems comprise a first discrete time amplitude modulator, a second discrete time amplitude modulator, a first combiner, and a second combiner. The first discrete time amplitude modulator is configured for generating a first product signal by spreading first symbols of a first amplitude modulated signal using a first spreading code. The second discrete time amplitude modulator is configured for generating a second product signal by spreading second symbols of a complimentary amplitude modulated signal using a second spreading code. The first combiner is configured for combining the first and second product signals to form a protected data communication signal. The protected data signal includes first data recoverable by at least one receiver of a plurality of receivers. The second combiner is configured for combining a global data communication signal and the protected data communication signal to form an output signal having a spread spectrum format. The global data communication signal is generated using a digital modulation process. The global data communication signal includes second data recoverable by all of the receivers.

BRIEF DESCRIPTION OF THE DRAWINGS

Embodiments will be described with reference to the following drawing figures, in which like numerals represent like items throughout the figures, and in which:

FIG. 11 is a block diagram of a chaos generator shown in FIG. 6 according to an embodiment of the invention.

DETAILED DESCRIPTION

Embodiments of the present invention will now be described with respect to FIGS. 1A-11. Embodiments of the present invention relate to permission-based multiple access communications systems. Multiple access communications systems according to embodiments of the present invention generally allow multiple signals to be transmitted from a plurality of sources at the same time over the same frequency band using distinct spreading codes. The multiple access communications described herein are accomplished using orthogonal or statistically orthogonal spreading codes in access unique configurations to spread each signal over a large, common frequency band. The orthogonal or statistically orthogonal spreading codes advantageously include distinct chaotic spreading codes generated by chaos generators. Appropriate orthogonal or statistically orthogonal spreading codes in unique configurations are used at one or more receivers to recover the data signals intended for a particular user. In effect, the communications system allows users with certain keys to access protected data (e.g., data targeted to specific users) and/or global data (e.g., data targeted to all authorized users). The term statistically orthogonal spreading codes as used herein refers to spreading codes with whose inner product over a finite duration has a statistical expectation of zero.

The communications systems described herein can be utilized in a variety of different applications where access to certain types of data is selectively controlled. The use of unique configurations of the same spreading codes can be coupled with the use of multiple spreading codes to expand the number of unique access permissions. Such applications include, but are not limited to, military applications and commercial mobile/cellular telephone applications.

Permission Based Multiple Access Communications System

Figure 1A:
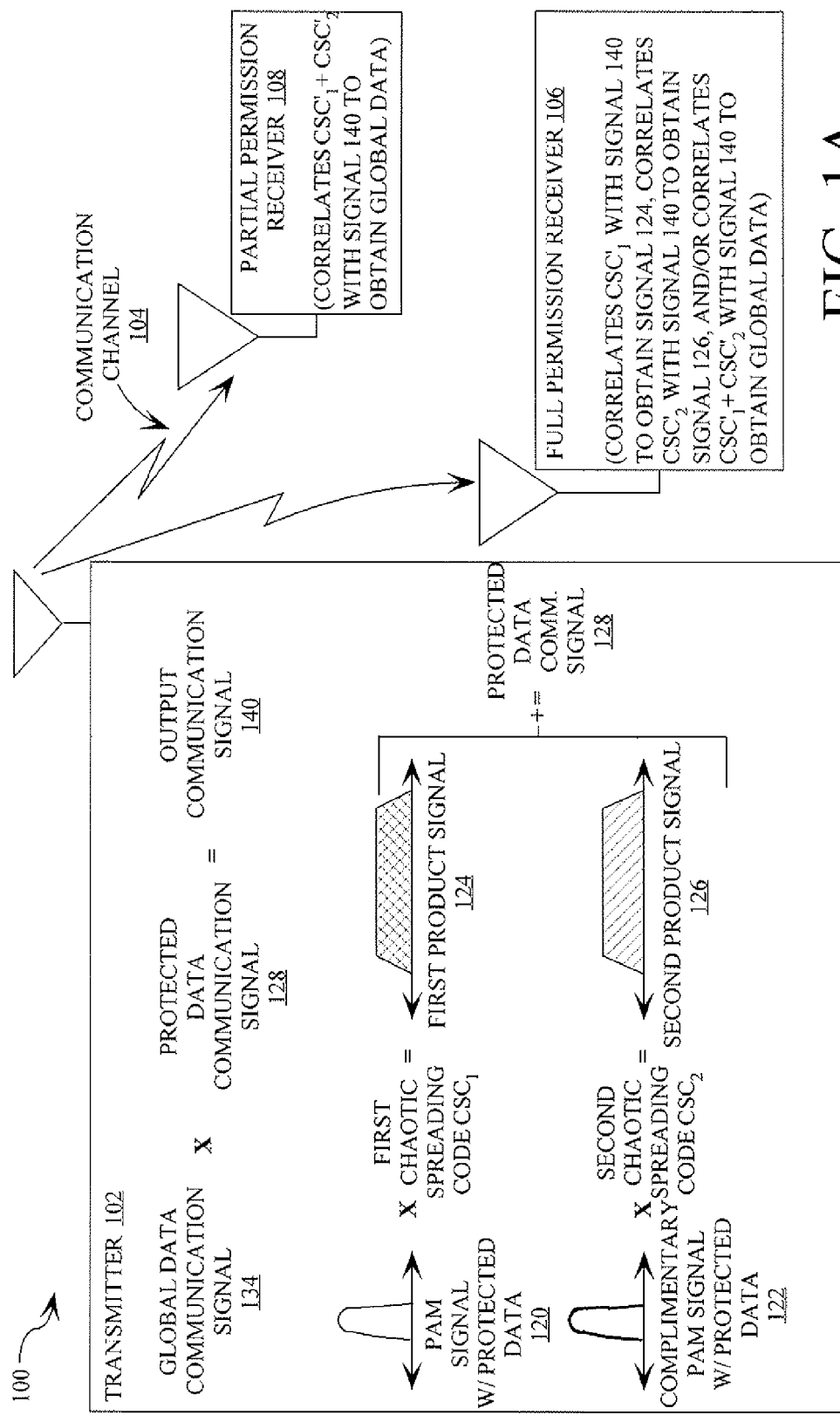
FIG. 1A is a schematic illustration of an exemplary multiple access communication system that is useful for understanding the invention.

Referring now to FIG. 1A, there is provided a schematic illustration of an exemplary permission based multiple access communication system (PBMACS) 100 according to an embodiment of the invention. As shown in FIG. 1A, PBMACS 100 is comprised of a transmitter 102 and receivers 106, 108. Transmitter 102 is generally configured to generate an output communication signal (OCS) 140 having chaotic properties. OCS 140 can include protected data (e.g., data targeted to specific users) and/or global data (e.g., data targeted to all authorized users). OCS 140 is generated using a coherent chaotic sequence spread spectrum (CCSSS) method.

The global data communication signal 134 is formed using a quadrature phase and amplitude modulation (e.g. QAM, APSK) such that global data is encoded in both the phase and amplitude of the global data communication signal 134. In embodiments of the present invention, the global data communication signal 134 is in effect formed using phase modulation only, by selecting a constant amplitude phase-modulated complex value for the duration of a global data symbol. The phase is exclusive to global data. One embodiment of forming the global data signal is as follows. A first global data signal (not shown) is formed by combining global data symbols (e.g., quadrature amplitude shift keying symbols) of a punctured quadrature amplitude modulated (PQAM) constellation with a fixed and specific amplitude.

In contrast to the global data communication signal 134 which is formed effectively using phase modulation only, a protected data communication signal 128 is formed using a combination of pulse amplitude modulated (PAM) symbols and the amplitude complements of the symbols. A first product signal 124 is formed by combining protected data symbols (e.g., PAM symbols) of a first amplitude modulated signal 120 with a first chaotic spreading code $CSC_1$. A second product signal 126 is formed by combining protected data symbols (e.g., PAM symbols) of a second amplitude modulated signal 122 with a second chaotic spreading code $CSC_2$. Chaotic spreading code $CSC_2$ is advantageously selected so that it is orthogonal or statistically orthogonal with respect to the chaotic spreading code $CSC_1$. The second amplitude modulated signal 122 has symbol amplitudes which are the complements of the amplitude of the amplitude modulated signal 120. The chaotic spreading codes $CSC_1$, $CSC_2$ spread the spectrum of the respective data symbols according to a spreading ratio.

A protected data communication signal 128 is obtained by combining the first product signal 124 with the second product signal 126. The protected data communication signal 128 is then combined with the global data communication signal 134 to generate the OCS 140. The protected data communication signal acts to spread the spectrum of the respective global data symbols according to a spreading ratio.

Transmitter 102 is also configured to transmit the OCS 140 to the receivers 106, 108. OCS 140 can be transmitted from the transmitter 102 over the communications channel 104. An embodiment of transmitter 102 will be described below in relation to FIG. 6.

Figure 1B:
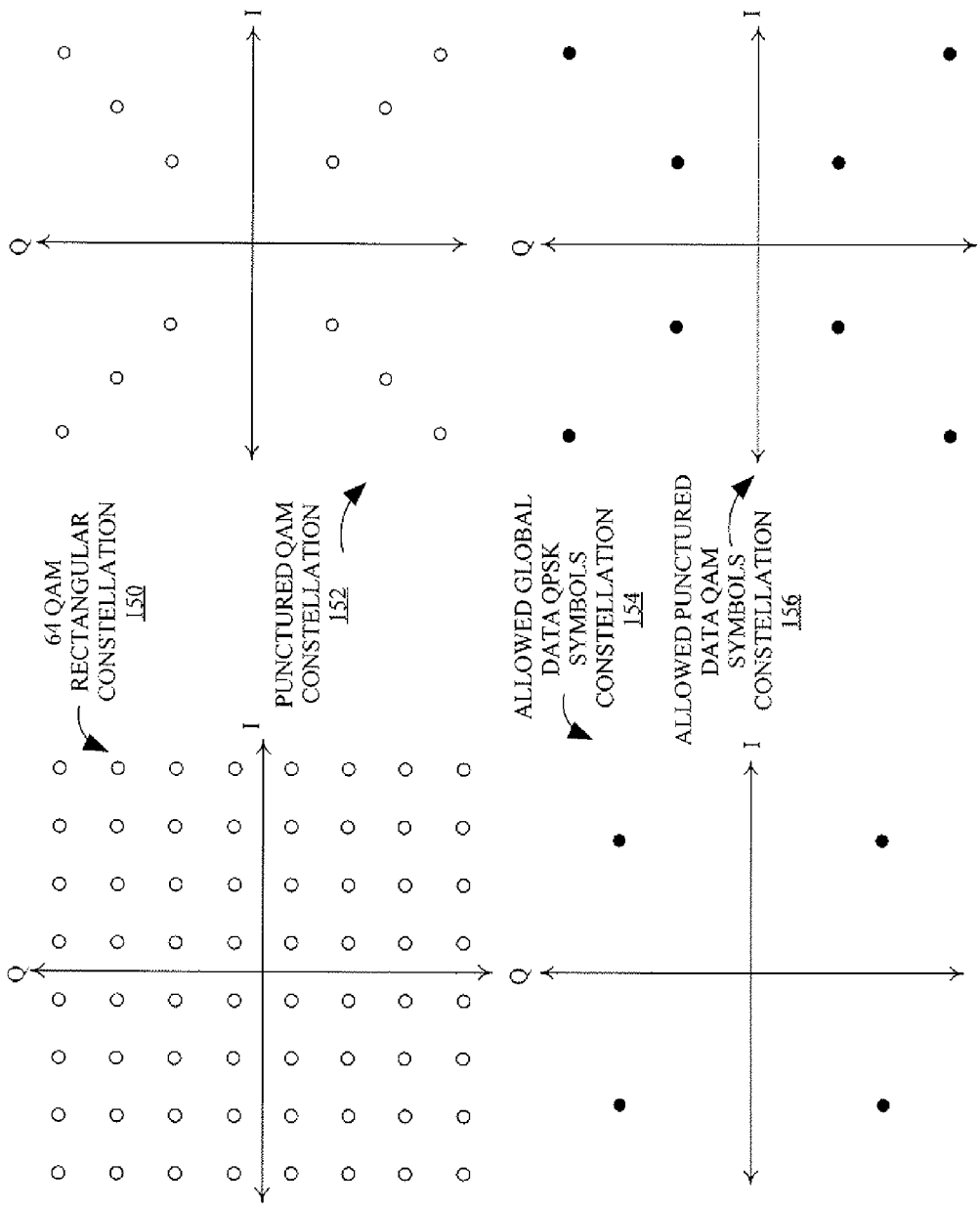
FIG. 1B is a schematic illustration of exemplary symbol constellations that are useful for understanding the invention.

Referring now to FIG. 1B, there is provided a schematic illustration of an exemplary punctured quadrature amplitude modulated constellation. Shown in FIG. 1B is a 64 quadrature amplitude modulation (QAM) constellation 150, a punctured QAM constellation with twelve (12) allowed symbols 152, the 4 symbols in the punctured QAM constellation that comprise the QPSK symbols in one embodiment of the global data 154, and the 4 symbols and their complementary symbols which comprise one embodiment of the protected data 156 symbols after combination with a QPSK reduction of the global data signal. As seen in the punctured QAM constellation 152, all allowed constellation values lie on two axes. As seen in constellations 152, 154, 156, the amplitudes of the protected symbols and the amplitudes of the complementary protected symbols allowed on the constellations are symmetric about the amplitudes allowed for the global data symbols.

Referring again to FIG. 1A, receiver 106 is generally configured for receiving signals transmitted from the transmitter 102. Receiver 106 is a full permission receiver. The phrase "full permission receiver", as used herein, means that the receiver is configured to access the protected data and the global data. The global data is recovered by correlating the OCS 140 with a first de-spreading code. The first de-spreading code is a chaotic sequence defined by the mathematical expression $DSC=CSC_1'+CSC_2'$. Receiver 106 is configured to generate a replica of the first chaotic spreading code $CSC_1$ and a replica of the second chaotic spreading code $CSC_2$. For convenience, these shall be referred to herein as $CSC_1'$ and $CSC_2'$. Each of the replica spreading codes $CSC_1'$, $CSC_2'$ is synchronized in time and frequency with the respective chaotic spreading code $CSC_1$, $CSC_2$. The PAM signal with protected data 120 and the complementary PAM signal with protected data 122 are recovered by correlating the OCS 140 with $CSC_1'$ and $CSC_2'$, respectively. Each of these correlations are performed independently for the recovery of the protected data. An exemplary embodiment of the receiver 106 will be described below in relation to FIG. 7.

Receiver 108 is generally configured for receiving signals transmitted from the transmitter 102. However, receiver 108 is a partial permission receiver. The phrase "partial permission receiver", as used herein, means that the receiver is configured to only access global data. The global data is recovered by correlating the OCS 140 with a de-spreading code. The de-spreading code is a chaotic sequence defined by the mathematical expression $DSC=CSC_1'+CSC_2'$. In this regard, it should be understood that receiver 108 is configured to generate a replica of the sum of the first chaotic spreading code $CSC_1$ and the second chaotic spreading code $CSC_2$. As noted, these replica chaotic spreading codes are referred to as herein as $CSC_1'$ and $CSC_2'$. The replica spreading codes $CSC_1'$, $CSC_2'$ are synchronized in time and frequency with the respective orthogonal or statistically orthogonal chaotic spreading code $CSC_1$, $CSC_2$. An exemplary embodiment of the receiver 106 will be described below in relation to FIG. 8.

Generation of Protected Data Communication Signal 128 Shown in FIG. 1A

The generation of protected data communication signal 128 shall now be described in relation to FIGS. 2A-5. To simplify the description of the formation of the protected data signal, the PAM signal with protected data 120 will be described in terms of only the magnitude of the amplitude modulated signal which can be viewed as a unipolar pulse amplitude modulated (PAM) signal. In the case of the punctured QAM constellation described above, the phase modulation is ignored as it is identical to the phase modulation of a QAM signal which is well known to those having ordinary skill in the art. It should be noted that some of the amplitudes (amplitudes and magnitudes are equivalent for positive unipolar signals) shown in FIG. 2B are associated with protected data while the phase angles are associated with global data in the context of the current invention.

Note that the PAM portion of signal 120 has statistical artifacts due to the periodicity of the modulation that can be used so as to compromise the security of the protected data. As such, the data communication signals 128, 134 can be generated using a method for removing statistical artifacts from the PAM signal 120. In effect, the security of all data can be increased as compared to conventional multiple access communications systems.

Figure 2A:
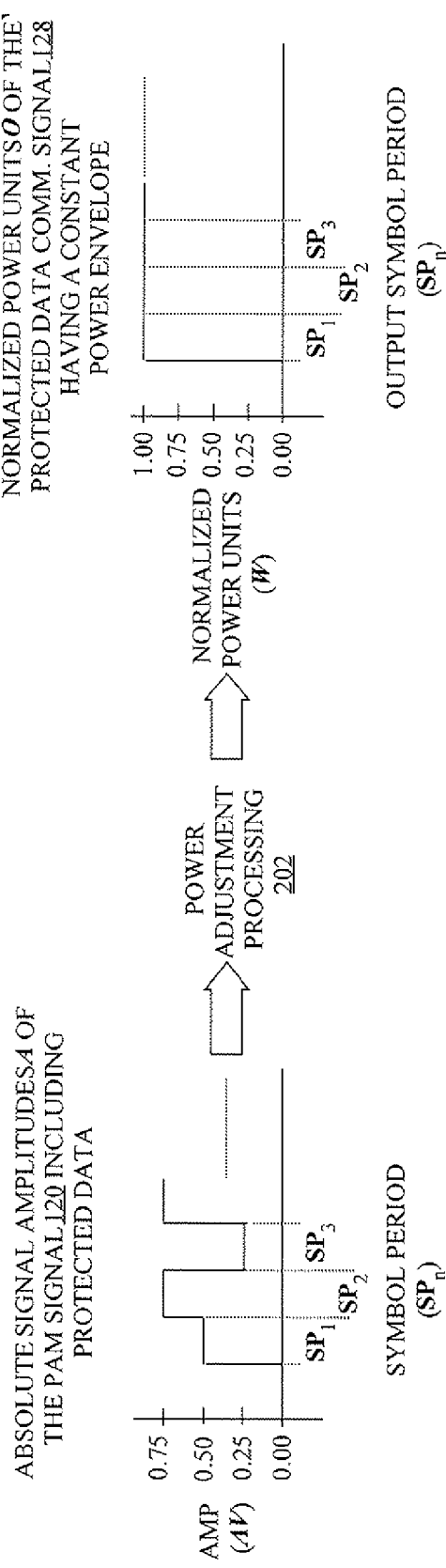
FIG. 2A is a conceptual diagram of a method for removing cyclostationary and statistical artifacts from a pulse amplitude modulated (PAM) signal that is useful for understanding the present invention.
Figure 2B:
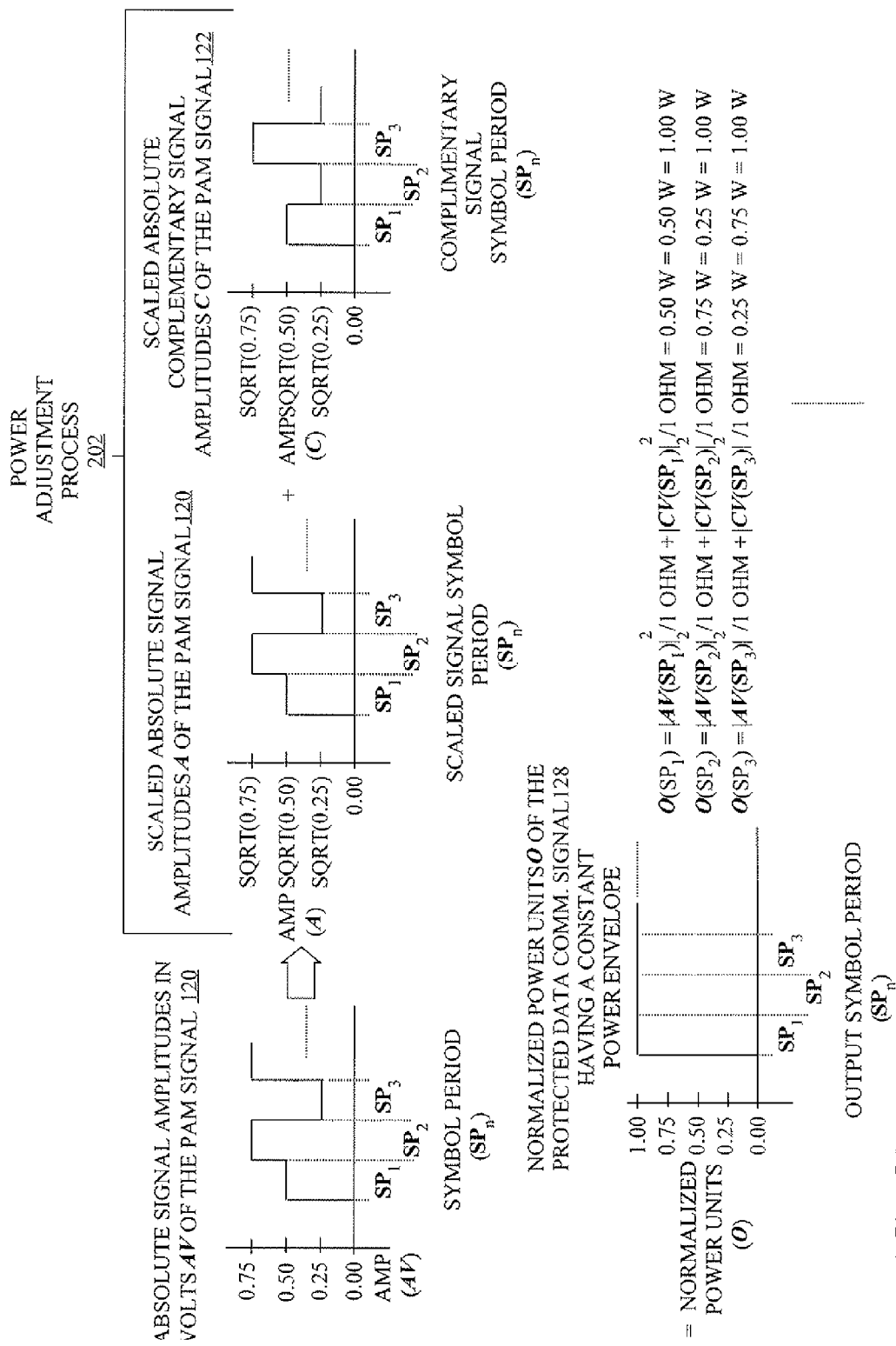
FIG. 2B is a schematic illustration of an amplitude adjustment process that is useful for understanding the present invention.

Referring now to FIG. 2A, there is provided a conceptual diagram of a method for removing statistical artifacts from the PAM signal 120 that assumes combination of the PAM signal 120 with a separable complement thereof. The separable complement is referred to as complementary signal 122. Notably, signals 120 and 122 as shown in FIG. 2A are not separable directly based on amplitudes. However, signals 120 and 122 will be shown in subsequent paragraphs to be made separable by virtue of orthogonal spreading sequences.

As shown in FIG. 2A, PAM signal 120 has cyclostationary signal properties resulting from its periodically changing amplitude and therefore its periodically changing transmitted power. In effect, an outside observer can obtain information about the PAM signal 120 simply by identifying the periodic nature of the symbol energy. Consequently, it is desirable to process the PAM signal 120 to reduce or eliminate the cyclostationary properties from the transmitted signal. This is accomplished by means of power adjustment processing (PAP) 202. PAP 202 generates the data communication signal 128 having a constant power envelope. The result is that the data communication signal 128 has a power or variance that does not change in statistical expectation over time. An exemplary PAP 202 will now be described in relation to FIGS. 2B-3.

Referring now to FIG. 2B, there is provided a conceptual illustration of an exemplary PAP 202 that is useful for understanding the present invention. As shown in FIG. 2B, PAP 202 generally involves combining the square root of the amplitudes AV (expressed in volts) of the PAM signal 120 for each symbol period SP with the square root of the amplitudes CV (expressed in volts) of the complementary PAM signal 122 such that the sum of the resulting average power O remain constants. For convenience, the amplitude AV of the PAM signal 120 for each symbol period SP shall be referred to herein as $AV(SP_n)$, where n is the index number of a particular symbol period SP. Thus, the amplitude AV of the PAM signal 120 for the first symbol period $SP_1$ is $AV(SP_1)$. Similarly, the amplitude AV of the PAM signal 120 for the second index period $SP_2$ is $AV(SP_2)$, and so on. The amplitude CV of the complementary PAM signal 122 for each symbol period SP shall be referred to herein as $CV(SP_n)$, where n is the index number of a particular symbol period SP. The amplitude CV of the complementary PAM signal 122 for the first symbol period $SP_1$ is $CV(SP_1)$. Likewise, the amplitude CV of the complementary PAM signal 122 for the second index period $SP_2$ is $CV(SP_2)$, and so on.

Such combining operations can be defined by the following mathematical equations (1)-(3) that represent the per symbol power of the signal by adding the symbol power and complementary symbol power. For simplicity, let the symbol voltages drive a one (1) ohm load. Since power equals voltage squared divided by resistance, setting resistance to one (1) ohm simplifies the power calculations to $O(SP_n)=|A(SP_n)|^2+|C(SP_n)|^2$.

$$O(SP_1)=|AV(SP_1)|^2/1\Omega+|CV(SP_1)|^2/1\Omega \quad (1)$$

$$O(SP_2)=|AV(SP_2)|^2/1\Omega+|CV(SP_2)|^2/1\Omega \quad (2)$$

$$O(SP_3)=|AV(SP_3)|^2/1\Omega+|CV(SP_3)|^2/1\Omega \quad (3)$$

where $O(SP_1)$ is a power of the protected data communication signal 128 for a first output symbol period. $O(SP_2)$ is a power of the protected data communication signal 128 for a second output symbol period. $O(SP_3)$ is a power of the protected data communication signal 128 for a third output symbol period. $AV(SP_1)$ is an amplitude of the PAM signal 120 for a first symbol period. $AV(SP_2)$ is an amplitude of the PAM signal 120 for a second symbol period. $AV(SP_3)$ is an amplitude of the PAM signal 120 for a third symbol period. $CV(SP_1)$ is an amplitude of the complementary PAM signal 122 for a first symbol period. $CV(SP_2)$ is an amplitude of the complementary PAM signal 122 for a second symbol period. $CV(SP_3)$ is an amplitude of the complementary PAM signal 122 for a third symbol period.

Referring again to FIG. 2B, PAP 202 produces a constant power envelope signal as is desirable for the protected data communication signal 128. However, PAP 202 does not produce a separable signal combination. The phrase "separable signal", as used herein, refers to a signal having separable signal components, wherein a first signal component is orthogonal or statistically orthogonal to all other signal components. One can appreciate that this non-separable signal combination is undesirable in a communications system application since there is no distinction, and therefore no useable information, between the direct combination of PAM signals 120, 122. As such, PAP 202 needs improvement so that the combination of the PAM signal 120 and the complementary PAM signal 122 is a separable signal combination. Such an improved PAP 202 will now be described in relation to FIGS. 2C and 3.

Figure 2C:
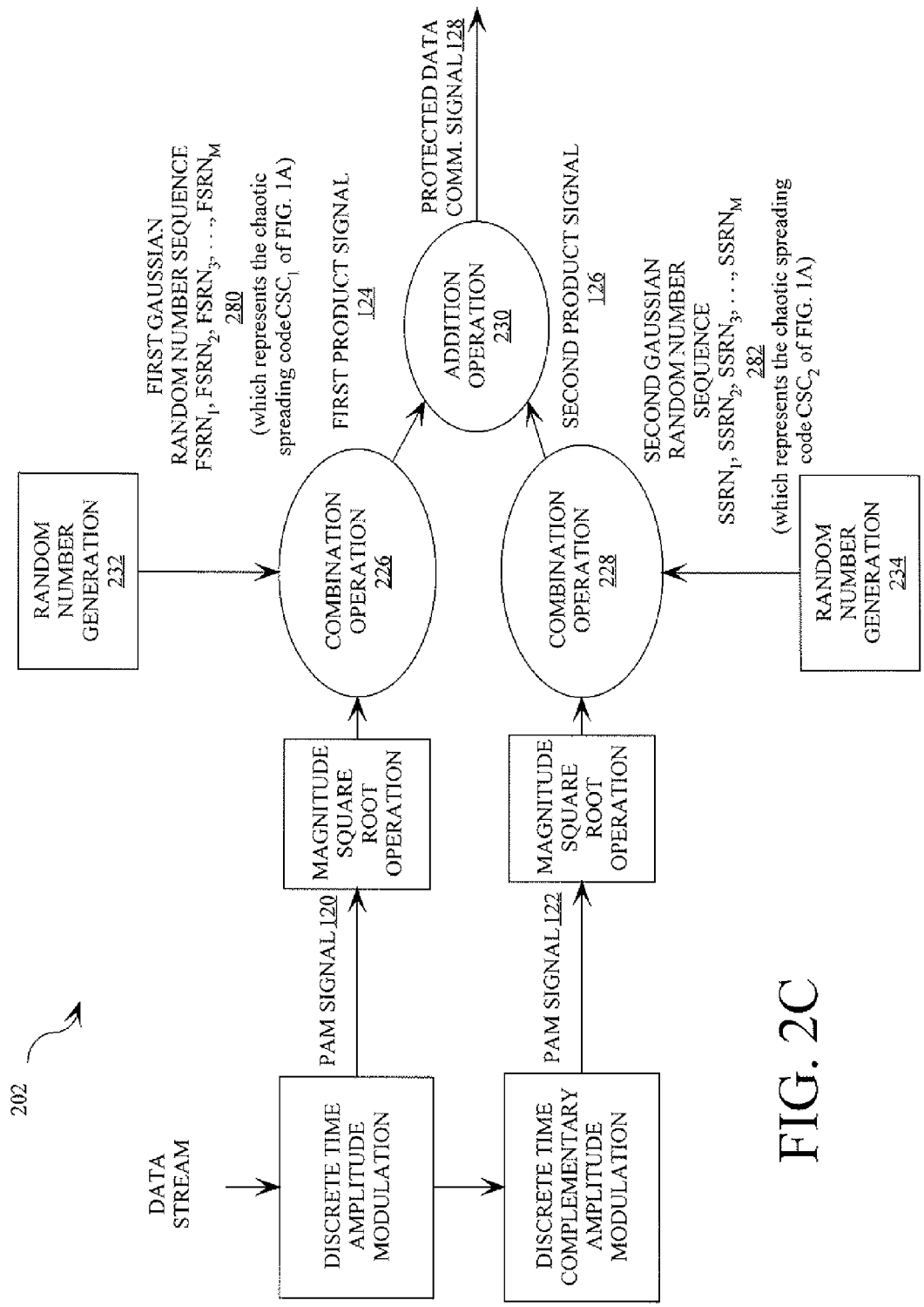
FIG. 2C is a schematic illustration of an improved amplitude adjustment process that is useful for understanding the present invention.

Referring now to FIG. 2C, the improved PAP 202 generally involves performing combination (or multiplication) operations 226, 228 utilizing orthogonal or statistically orthogonal signals (e.g., Gaussian random number sequences 280, 282) and an addition operation 230. It should be noted that the orthogonal or statistically orthogonal signal 280 represents the first chaotic spreading code $CSC_1$ of FIG. 1A. Similarly, the orthogonal or statistically orthogonal signal 282 represents the second chaotic spreading code $CSC_2$ of FIG. 1A. As used herein, the term statistically orthogonal signal may be applied to signals or discrete sequences, to indicate that the stationary statistical expectation of the inner product of two or more signals is zero (0). One typical example of orthogonal signals, in practical use, is the sine and cosine functions. In communications systems employing chaotic spreading sequences, the statistically orthogonal signals can be expressed as independent quadrature Gaussian random number sequences. For example, a first Gaussian random number sequence 280 can be generated using a random number generation operator 232. The first Gaussian random number sequence 280 can be defined as the sequence of random numbers $FSRN_1$, $FSRN_2$, $FSRN_3$, ..., $FSRN_M$. A second Gaussian random number sequence 282 can be generated using a random number generation operator 234. The second Gaussian random number sequence 282 can be defined as the second sequence of random numbers $SSRN_1$, $SSRN_2$, $SSRN_3$, ..., $SSRN_M$. In such a scenario, the Gaussian random number sequences 280, 282 can be generated utilizing two (2) statistically independent Gaussian random number generators, Gaussian pseudo-random number generators, or Gaussian chaotic number generators.

If the Gaussian random number sequences 280, 282 are generated using Gaussian-distributed chaotic number generators, then the random number sequences 280, 282 are chaotic number sequences. It should be understood that a mathematically chaotic signal based on a chaotic number sequence can be made to present itself as a noise signal having a Gaussian distribution. The Gaussian distribution is well known to those having ordinary skill in the art, and therefore will not be described herein. However, it should be appreciated that the power of the chaotic signal is measured as the variance of the Gaussian noise distribution. It is desirable to have the variance of the sum of the products of the combination (or multiplication) operations 226, 228 to equal a constant variance (or power) in statistical expectation. This constant variance need not be obtained from two (2) equal variance signals. Although, both random number generators 232, 234 can be selected to have standard normal (Gaussian) distributions with zero (0) mean and unit variance.

The combination (or multiplication) operations 226, 228 can be defined by mathematical equations (4) and (5) assuming a normalized resistance of one (1) ohm.

$$FPS = PAMS \cdot FOS = [sqrt[AV(SP_1)] \cdot FSRN_1], [sqrt[AV(SP_1)] \cdot FSRN_2], [sqrt[AV(SP_1)] \cdot FSRN_3], \ldots,$$
$$[sqrt[AV(SP_1)] \cdot FSRN_{M/N}], [AV(SP_2)] \cdot FSRN_{M/N+1}], [AV(SP_2)] \cdot FSRN_{M/N+2}], \ldots, [AV(SP_2)] FSRN_{2M/N}], [AV(SP_3)] \cdot FSRN_{2M/N+1}], \quad (4)$$

$$SPS = CS \cdot SOS = [sqrt[CV(SP_1)] \cdot SSRN_1], [sqrt[CV(SP_1)] \cdot SSRN_2], [sqrt[CV(SP_1)] \cdot SSRN_3], \ldots,$$
$$[sqrt[CV(SP_1)] \cdot SSRN_{M/N}], [sqrt[CV(SP_2)] \cdot SSRN_{M/N+1}], [sqrt[CV(SP_2)] \cdot SSRN_{M/N+2}], \ldots,$$
$$[sqrt[CV(SP_2)] \cdot SSRN_{2M/N}], [sqrt[CV(SP_3)] \cdot SSRN_{2M/N+1}], \quad (5)$$

where FPS is a first product signal 124 resulting from the multiplication of the square root of an amplitude of the PAM signal 120 and a first orthogonal or statistically orthogonal signal 280. SPS is a second product signal 126 resulting from the multiplication of the square root of an amplitude of the complementary PAM signal 122 and a second orthogonal or statistically orthogonal signal 282. PAMS is the magnitude square root of PAM signal 120. CS is the magnitude square root of complementary PAM signal 122. FOS is the first orthogonal or statistically orthogonal signal 280. SOS is the second orthogonal or statistically orthogonal signal 282.

The addition operation 230 can be defined by the following mathematical equation (6).

$$DCS = FPS + SPS = [(sqrt[AV(SP_1)] \cdot FSRN_1) + (sqrt[CV(SP_1)] \cdot SSRN_1)], \ldots, [(sqrt[AV(SP_2)] \cdot FSRN_{L+1}) + (sqrt[CV(SP_2)] \cdot SSRN_{L+1})], \quad (6)$$

where DCS is the protected data communication signal 128 resulting from the combination of the FPS 124 resulting from a first multiplication operation defined above in relation to mathematical equation (4) with the SPS 126 resulting from a first multiplication operation defined above in relation to mathematical equation (5).

Figure 3:
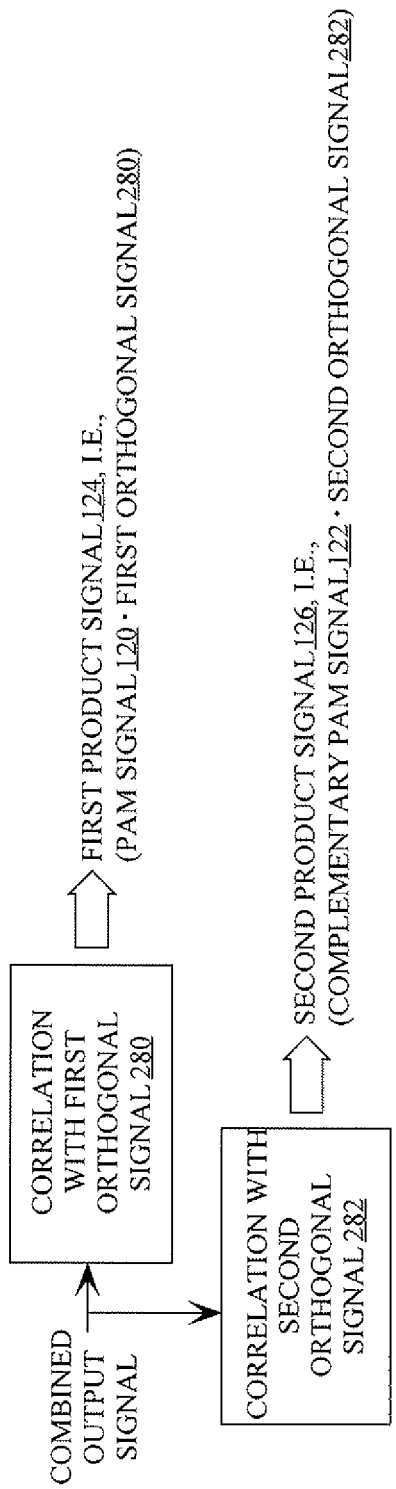
FIG. 3 is a schematic illustration of a signal separation that is useful for understanding the present invention.

Notably, the protected data communication signal 128 is a separable signal if FOS and SOS are known separately. Stated differently, the protected data communication signal 128 is comprised of separable components, namely FPS 124 and SPS 126. The signal components FPS 124 and SPS 126 can be separated utilizing correlation operations as shown in FIG. 3. Such correlation operations are well known to those having ordinary skill in the art, and therefore will not be described herein. However, it should be understood that any suitable correlation operation can be used without limitation, where the received signal is correlated against the locally generated, time synchronized, replicas of the spreading sequences used at the transmitter, $CSC_1'$ and $CSC_2'$, as described previously.

If only the sum (FOS+SOS) is known (as is the case at a partial permission receiver 108), then the global data can be retrieved using correlation techniques while simultaneously separable protected data spread respectively by FOS and SOS cannot be retrieved.

Figure 4:
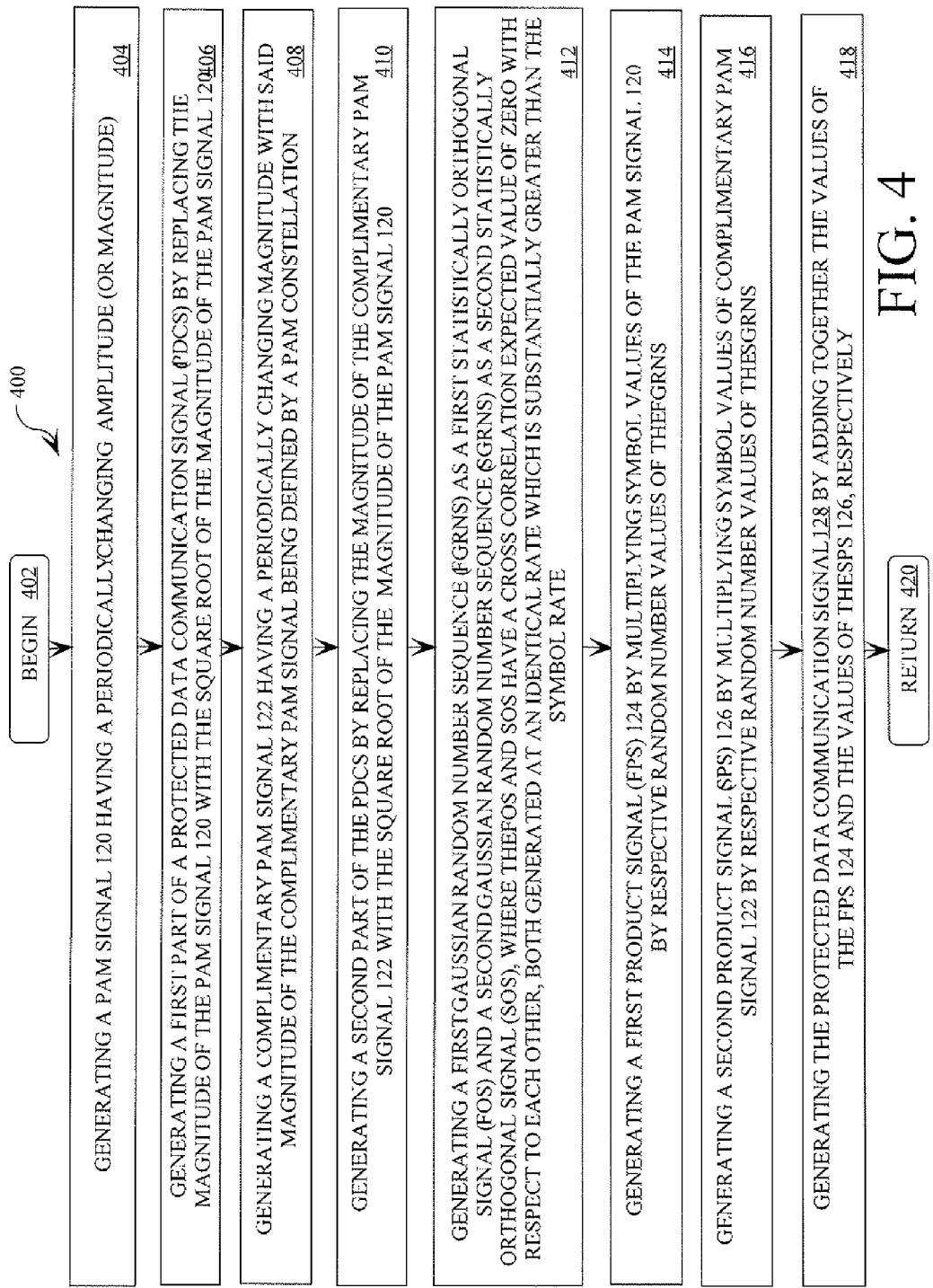
FIG. 4 is a flow diagram of a method for generating a chaotic amplitude modulated signal absent of statistical artifacts and having separable signal components.

Referring now to FIG. 4, there is a method 400 for generating a chaotic amplitude modulated signal absent of cyclostationary features and having separable signal components. As shown in FIG. 4, the method 400 begins at step 402 and continues with step 404. In step 404, a PAM signal 120 for the protected data signal is generated. The PAM signal 120 has a pulse amplitude modulated component. As stated above, the PAM signal 120 has a periodically changing amplitude (or magnitude). The PAM signal 120 can be generated in accordance with any known discrete time amplitude modulation scheme.

Thereafter, the method continues with step 406. In step 406, a first part of the protected data communication signal 128 ($FP_{128}$) is generated by replacing the amplitude of the PAM signal 120 by the square root of the magnitude values $|AV(SP_1)|, |AV(SP_2)|, |AV(SP_3)|, \ldots, |AV(SP_N)|$ of the PAM signal 120. Notably, dividing a nonzero unsigned number by the square root of its magnitude is equivalent to taking the square root of the magnitude of a that number.

In step 408, a complementary PAM signal 122 is generated for the protected data communication signal 128. The complimentary PAM signal 122 is the second part of the PAM data communication signal 128. The complementary PAM signal 122 is a signal with the same phase (and thus the same sign) as the PAM signal 120. The complementary PAM signal 122 has a magnitude that is one minus the magnitude of the PAM signal 120.

Thereafter, the method continues with step 410. In step 410, a second part of the data communication signal 128 ($SP_{128}$) is generated by replacing the amplitude of the complementary PAM signal 122 by the square root of the magnitude values $1-|AV(SP_1)|, 1-|AV(SP_2)|, 1-|AV(SP_3)|, \ldots, 1-|AV(SP_N)|$ of the PAM signal 120 where $|AV(SP_n)|$ is assumed to be normalized to be less than one (1). In such a scenario, the complementary PAM signal 122 has magnitude values defined by the following mathematical equations (7)-(9).

$$|CV(SP_1)| = sqrt(1-|AV(SP_1)|) \quad (7)$$

$$|CV(SP_2)| = sqrt(1|AV(SP_2)|) \quad (8)$$

$$|CV(SP_N)| = sqrt(1-|AV(SP_N)|) \quad (9)$$

where $|CV(SP_1)|$ is a first magnitude value of the complementary PAM signal 122. $|CV(SP_2)|$ is a second magnitude value of the complementary PAM signal 122. $|CV(SP_N)|$ is an $N^{th}$ magnitude value of the complementary PAM signal 122. Embodiments of the present invention are not limited in this regard. In particular, the amplitude (or magnitude) of the PAM signal 120 may be scaled or normalized to fit within the framework shown in FIG. 4.

Upon completing step 410, the method 400 continues with step 412. In step 412, a first Gaussian random number sequence (FGRNS) and a second Gaussian random number sequence (SGRNS) are generated. FGRNS behaves like a first statistically orthogonal signal (FOS). FGRNS is comprised of the random number sequence $FSRN_1, FSRN_2, FSRN_3, \ldots, FSRN_M$. The random number sequence $FSRN_1, FSRN_2, FSRN_3, \ldots, FSRN_M$ can be a true random number sequence, a pseudo-random number sequence, or a chaotic number sequence. Similarly, SGRNS behaves like a second statistically orthogonal signal (SOS). SOS is orthogonal or statistically orthogonal to the FOS. SGRNS is comprised of the random number sequence $SSRN_1, SSRN_2, SSRN_3, \ldots, SSRN_M$. The random number sequence $SSRN_1, SSRN_2, SSRN_3, \ldots, SSRN_M$ can be a true random number sequence, a pseudo-random number sequence, or a chaotic number sequence. Notably, the stationary statistical expectation of FOS and SOS is zero (0). FOS and SOS are generated at an identical rate which is substantially greater than a symbol rate.

After generating the FGRNS and SGRNS, step 414 is performed. In step 414, a first product signal (FPS) 124 is generated by multiplying symbol values of the PAM signal 120 by respective random number values of the FGRNS. For example, if $FP_{128}$ is comprised of a plurality of pulse amplitude modulated (PAM) symbol periods, then a first PAM symbol $A_{sym}(SP_1)$ of a first PAM symbol period is multiplied by a first random number FSRN$_1$ through the L$^{th}$ random number FSRN$_{M/N}$ of the FGRNS, i.e. A$_{sym}$(SP$_1$)·FSRN$_1$, A$_{sym}$(SP$_1$)·FSRN$_2$, ..., A$_{sym}$(SP$_1$)·FSRN$_{M/N}$, where M/N=L is the system's spreading ratio. Similarly, a second PAM symbol A$_{sym}$(SP$_2$) of a second PAM symbol period is multiplied by a second sequence of random numbers FSRN$_{M/N+1}$ through FSRN$_{2M/N}$ of the FGRNS, and so on. Embodiments of the present invention are not limited in this regard.

In step 416, a second product signal (SPS) 126 is generated by multiplying symbol values of the complementary PAM signal 122 by respective random number values of the SGRNS. For example, if SP$_{128}$ is comprised of a plurality of complementary symbol periods, then a first PAM symbol C$_{sym}$(SP$_1$) of a first complementary symbol period is multiplied by a first random number SSRN$_1$ through the L$^{th}$ random number SSRN$_{M/N}$ of the SGRNS, i.e., C$_{sym}$(SP$_1$)·SSRN$_1$, C$_{sym}$(SP$_1$)·SSRN$_2$, ..., C$_{sym}$(SP$_1$)·SSRN$_{M/N}$, where M/N=L is the system's spreading ratio. Similarly, a second amplitude C$_{sym}$(SP$_2$) of a second complementary symbol period is multiplied by a second random number sequence SSRN$_{M/N+1}$ through SSRN$_{2M/N}$ of the SGRNS, and so on. Embodiments of the present invention are not limited in this regard.

After generating the FPS 124 and SPS 126, method 400 continues with step 418. In step 418, the protected data communication signal 128 is generated by adding together each of values of the FPS 124 with respective values of the SPS 126. Subsequently, step 420 is performed where method 400 ends or other processing is resumed.

Figure 5:
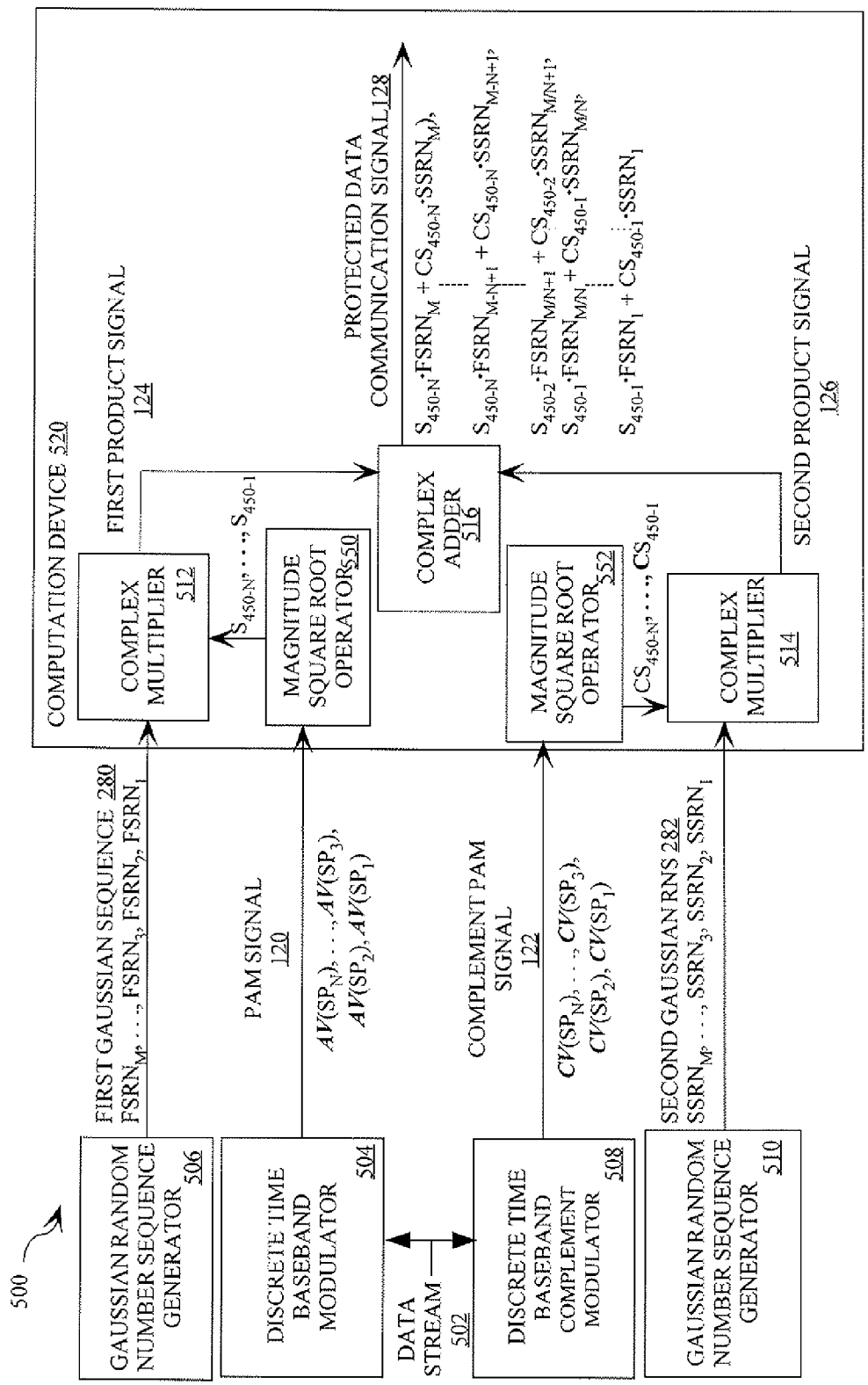
FIG. 5 is a block diagram of a chaotic pulse amplitude modulation (CPAM) system used in construction of the protected data communication signal according to an embodiment of the invention.

Referring now to FIG. 5, there is provided a more detailed block diagram of a chaotic pulse amplitude modulation (CPAM) system 500 implementing method 400 (described above in relation to FIG. 4). It should be noted that the CPAM system 500 can be implemented in the transmitter 102 of FIG. 1A for purposes of generating the protected data communication signal 128. The CPAM system 500 can be implemented in the transmitter 102 of FIG. 1A for purposes of generating the global data communication signal 134 with CV=AV for a fixed AV. In FIG. 5, A$_{sym}$(SP$_n$) is equal to the sign of AV(SP$_n$) times the square root of AV(SP$_n$) and C$_{sym}$(SP$_n$) is equal to the sign of AV(SP$_n$) times the square root of one (1) minus the magnitude of AV(SP$_n$) as described in relation to FIG. 4. A schematic illustration of the transmitter 102 implementing a CPAM system (such as that shown in FIG. 5) is provided in FIG. 6. The transmitter 102 of FIG. 6 will be described below in detail.

Referring again to FIG. 5, the CPAM system 500 illustrates a generalized application of the inventive concepts to discrete time amplitude modulation. As shown in FIG. 5, the CPAM system 500 is comprised of a discrete time baseband modulator (DTBM) 504, a discrete time baseband complement modulator (DTBCM) 508, Gaussian random number sequence generators (GRNSGs) 506, 510 and a computation device 520.

The DTBM 504 is configured to receive a serial digital data stream from an external device (e.g., a protected data generator). The DTBM 504 is also configured to modulate a serial digital data stream in accordance with any known discrete time amplitude modulation scheme with a restricted set of amplitudes. In embodiments of the present invention, such discrete time amplitude modulation schemes are limited to those with an even number of magnitudes generated by an amplitude modulation scheme whereby all magnitude pairs are symmetric about some mean value and whereby the mean value and the complement of the mean value are equal. Embodiments of the present invention are not limited in this regard. The DTBM 504 is also configured to communicate the PAM signal 120 to the computation device 520.

The GRNSG 506 is configured to generate a first Gaussian random number sequence (FGRNS) 280 and communicate the same to the computation device 520. Similarly, the GRNSG 510 is configured to generate a second Gaussian random number sequence (SGRNS) 282 and communicate the same to the computation device 520. Likewise, the DTBCM 508 is configured to generate the complementary PAM signal 122 and communicate the same to the computation device 520.

The computation device 520 is configured to process the received PAM signal 120, complementary PAM signal 122, FGRNS 280 and SGRNS 282. In this regard, it should be understood that the computation device 520 is comprised of magnitude square root operators (MSRO) 550, 552, complex multipliers 512, 514 and a complex adder 516.

The MSRO 550 is configured to determine the square root of the magnitude of each of the amplitudes values AV(SP$_1$), ..., AV(SP$_N$) of the PAM signal 120. Accordingly, the magnitude square root operations are defined by the following mathematical equations (10)-(12).

$$S_{450-1}=sqrt[AV(SP_1)] \qquad (10)$$

$$S_{450-2}=sqrt[AV(SP_2)] \qquad (11)$$

$$S_{450-N}=sqrt[AV(SP_N)] \qquad (12)$$

where S$_{450-1}$ is a result of a first square root operation performed by the MSRO 550. S$_{450-2}$ is a result of a second square root operation performed by the MSRO 550. S$_{450-N}$ is a result of an N$^{th}$ square root operation performed by the MSRO 550. The MSRO 550 is further configured to communicate the results S$_{450-1}$, S$_{450-2}$, ..., S$_{450-N}$ of the square root operations to the complex multiplier 512.

The complex multiplier 512 is configured to perform multiplication operations using the results S$_{450-1}$, S$_{450-2}$, ..., S$_{450-N}$ of the square root operations and the FGRNS 280. More particularly, the complex multiplier 512 is configured to multiply each of the results S$_{450-1}$, S$_{450-2}$, ..., S$_{450-N}$ by a respective random number FSRN$_1$, FSRN$_2$, ..., FSRN$_M$ of the FGRNS 280. These multiplication operations can be defined by the following mathematical equations (13)-(15).

$$R_{412-1}=S_{450-1} \cdot FSRN_1=sqrt|A(SP_1)| \cdot FSRN_1| \cdot \text{angle}(FSRN_1) \qquad (13)$$

$$R_{412-N+1}=S_{450-2} \cdot FSRN_{M/N+1}=sqrt|A(SP_2)| \cdot |FSRN_{M/N+1}| \cdot \text{angle}(FSRN_{M/N+1}) \qquad (14)$$

$$R_{412-M}=S_{450-N} \cdot FSRN_M=sqrt|A(SP_N)| \cdot |FSRN_M| \cdot \text{angle}(FSRN_M) \qquad (15)$$

where R$_{412-1}$ is a result of a first multiplication operation performed by the complex multiplier 512. R$_{412-2}$ is a result of a second multiplication operation performed by the complex multiplier 512. R$_{412-M}$ is result of an M$^{th}$ multiplication operation performed by the complex multiplier 512. The complex multiplier 512 is further configured to communicate a first product signal 124 including the results R$_{412-1}$, R$_{412-2}$, ..., R$_{412-M}$ of the multiplication operations to the complex adder 516.

The DTBM 504 is configured to generate symbols with a maximum absolute magnitude less than or equal to unity. The DTBCM 508 is configured to receive the data stream 502 and generate a complementary PAM signal 122. Accordingly, the operations to produce the complementary PAM signal 122 are defined by the mathematical equations (16)-(18).

$$CS_{450\text{-}1} = (1 - sqrt|AV(SP_1)|) = sqrt|CV(SP_1)| \quad (16)$$

$$CS_{450\text{-}2} = (1 - sqrt|AV(SP_2)|) = sqrt|CV(SP_2)| \quad (17)$$

$$CS_{450\text{-}N} = (1 - sqrt|AV(SP_N)|) = sqrt|CV(SP_N)| \quad (18)$$

The complex multiplier 514 is configured to perform multiplication operations using the SGRNS 282 and the results $CS_{450}$ of the square root operations performed by the MSRO 552. More particularly, the complex multiplier 514 is configured to multiply each of the results $CS_{450\text{-}1}$, $CS_{450\text{-}2}$, ... $CS_{450\text{-}N}$ by a respective random number $SSRN_1$, $SSRN_2$, ..., $SSRN_M$ of the SGRNS 282. These multiplication operations can be defined by the following mathematical equations (19)-(21).

$$R_{414\text{-}1} = CS_{450\text{-}1} \cdot SSRN_1 \quad (19)$$

$$R_{414\text{-}M/N} = CS_{450\text{-}2} \cdot SSRN_{M/N} \quad (20)$$

$$R_{414\text{-}M} = CS_{450\text{-}N} \cdot SSRN_M \quad (21)$$

where $R_{414\text{-}1}$ is a result of a first multiplication operation performed by the complex multiplier 514. $R_{414\text{-}2}$ is a result of a second multiplication operation performed by the complex multiplier 514. $R_{414\text{-}M}$ is a result of an $M^{th}$ multiplication operation performed by the complex multiplier 514. The multiplier 514 is further configured to communicate a second product signal 126 including the results $R_{414\text{-}1}$, $R_{414\text{-}2}$, ..., $R_{414\text{-}M}$ of the multiplication operations to the complex adder 516.

The complex adder 516 is configured to generate the protected data communication signal 128. More particularly, the complex adder 516 is configured to perform addition operations using the results $R_{412\text{-}1}$, $R_{412\text{-}2}$, ..., $R_{412\text{-}M}$, $R_{414\text{-}1}$, $R_{414\text{-}2}$, ..., $R_{414\text{-}M}$ received from the complex multipliers 512, 514. These addition operations can be defined by the following mathematical equations (22)-(24).

$$Sum_{416\text{-}1} = R_{412\text{-}1} + R_{414\text{-}1} \quad (22)$$

$$Sum_{416\text{-}2} = R_{412\text{-}2} + R_{414\text{-}2} \quad (23)$$

$$Sum_{416\text{-}M} = R_{412\text{-}M} + R_{414\text{-}M} \quad (24)$$

where $Sum_{416\text{-}1}$ is a sum of a first addition operation performed by the complex adder 516. $Sum_{416\text{-}2}$ is a sum of a second addition operation performed by the complex adder 516. $Sum_{416\text{-}M}$ is a sum of an $M^{th}$ addition operation performed by the complex adder 516.

The adder 516 is further configured to communicate the protected data communication signal 128 to an external device (not shown). As should be understood, the external device (not shown) can include radio frequency (RF) hardware configured to transmit a chaotic waveform. RF hardware is well known to those having ordinary skill in the art, and therefore will not be described in detail herein. However, it should be understood that the RF hardware performs actions to process the protected data communication signal 128 for placing the same in a proper form for transmission to a receiving device via a communications link. Note that the protected data communication signal 128 is of substantially similar format to a independently generated sequence of Gaussian random values (not shown) since the addition of two constant variance Gaussian random number sequences is again a constant variance Gaussian random number sequence. The digital baseband chaotic modulator will be described in relation to the transmitter architecture shown in FIG. 6, covering the modulation and transmission of any global data sequence, such as the global data communication signal 134, using a chaotically modulated transmission.

Referring again to FIG. 5, one embodiment of the present invention is a special case where only global data is transmitted. In this scenario, the amplitude of the protected data stream 502 is chosen to be a constant value between zero (0) and one (1), inclusive, for all symbol durations, such that the protected data communication signal 128 is constructed from a weighted addition of two Gaussian random number sequences 280, 282. Embodiments of the present invention are not limited in this regard.

As discussed above in relation to FIG. 1A, the protected data communication signal 128 is combined with a global data communication signal 134 via a digital baseband chaotic modulator to create the OCS 140. The global data communication signal 134 can take the form of any digitally modulated signal constellation, including amplitude and phase modulation techniques. These amplitude and phase modulation techniques are well known to those having ordinary skill in the art, and therefore will not be described in herein. However, it should be understood that any digital modulation format used to represent data may be used without limitation. Exemplary digital modulation constellations for the global data communication signal 134 are shown in FIG. 1B.

Embodiments of the present invention uses only constant amplitude modulated signal constellations for the global data communication signal 134. Exemplary digital modulation constellations include those produced by BPSK, QPSK and 8PSK modulation types. Choosing a constant amplitude signal constellation for the global data communication signal 134 provides the added assurance to the communication system that transmissions use a maximal entropy communication signal without any added cyclostationary signal content. An exemplary architecture to create this maximal entropy communication signal is described with respect to FIG. 6. Embodiments of the present invention are not limited in this regard.

Transmitter Architecture

Figure 6:
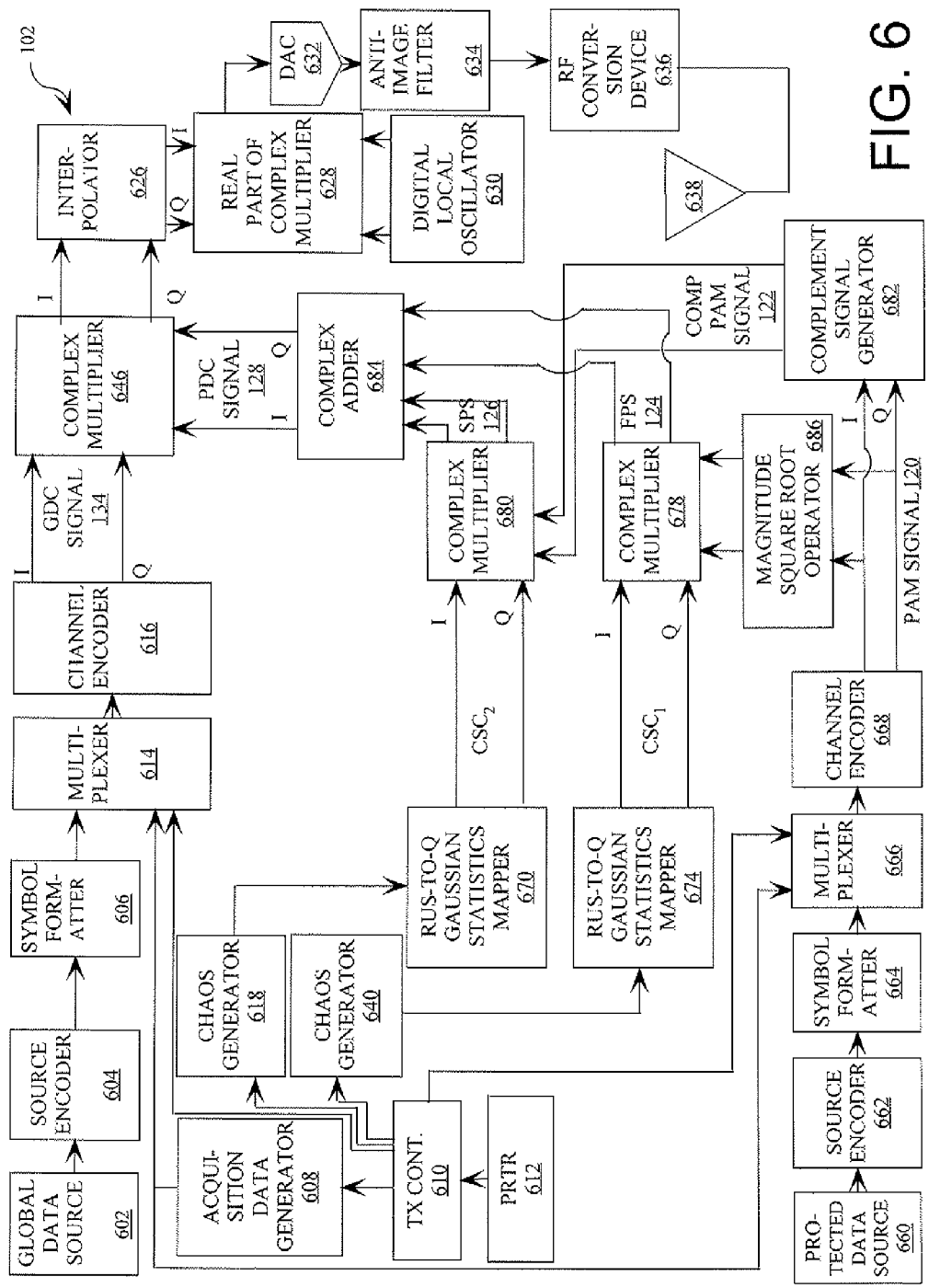
FIG. 6 is a more detailed block diagram of the transmitter shown in FIG. 1A according to an embodiment of the present invention.

Referring to FIG. 6, there is provided a block diagram of the transmitter 102 shown in FIG. 1A. The embodiment of the transmitter 102 assumes that: (1) a pulse amplitude modulation (PAM) data modulation is used in the construction of first product signal 124 and second product signal 126, combined for the protected data communication signal 128 and a phase shift keyed (PSK) modulation is used for the global data communication signal 134; (2) global data is encoded in the constant-amplitude PSK constellation; (3) protected data is encoded in the PAM and complementary PAM signal constellations; (4) no pulse shaping is applied to data symbols; (5) modulated global data symbols and random number generator values are generated in quadrature form; and (6) chaotic spectral spreading is performed at an intermediate frequency (IF).

The transmitter 102 is generally configured for generating quadrature amplitude-and-time-discrete baseband signals. The transmitter 102 is also configured for spreading the quadrature amplitude-and-time-discrete baseband signals over a wide intermediate frequency band. This spreading consists of multiplying the quadrature amplitude-and-time-discrete baseband signals by digital chaotic sequences. The products of these arithmetic operations are hereinafter referred to as digital chaotic signals. In this regard, it should be understood that the transmitter 102 is also configured to process the digital chaotic signals to place the same in a proper analog form suitable for transmission over a communications link. The transmitter 102 is further configured to communicate analog chaotic signals to a receiver (e.g., the receiver 106 and/or 108 described above in relation to FIG. 1A) via a communications link.

As shown in FIG. 6, the transmitter 102 is comprised of data sources 602, 660, source encoders 604, 662, symbol formatters 606, 664, an acquisition data generator 608, a transmitter controller 610, a precision real time reference (PRTR) 612, multiplexers 614, 666, channel encoders 616, 668, complex multipliers 646, 680, 678, a complement signal generator 682, a magnitude square root operator (MSRO) 686 and complex adder 684. The transmitter 102 is also comprised of chaos generators 618, 640 and real uniform statistics to quadrature (RUS-to-Q) Gaussian statistics mappers (RU-QGs) 670, 674. The transmitter 102 is further comprised of an interpolator 626, a digital local oscillator (LO) 630, a real part of a complex multiplier 628, a digital-to-analog converter (DAC) 632, an anti-image filter 634, an intermediate frequency (IF) to radio frequency (RF) conversion device 636, and an antenna element 638.

The data source 602 is a global data source. The data source 602 is generally an interface configured for receiving an input signal containing global data from an external device (not shown). As such, the data source 602 can be configured for receiving bits of data from the external data source (not shown). The data source 602 can further be configured for supplying bits of data to the source encoder 604 at a particular data transfer rate.

The source encoder 604 is generally configured to encode the global data received from the external device (not shown) using a forward error correction coding scheme. The bits of global data received at or generated by the source encoder 604 represent any type of information that may be of interest to a user. For example, the global data can be used to represent text, telemetry, audio, or video data. The source encoder 604 can further be configured to supply bits of global data to the symbol formatter 606 at a particular data transfer rate.

The symbol formatter 606 is generally configured to process bits of global data for forming channel encoded symbols. In embodiments of the present invention, the source encoded symbols are formatted into parallel words compatible with phase shift keyed (PSK) encoding. The symbol formatter 606 can further be configured for communicating the formatted data to the multiplexer 614.

The symbol formatter 606 is functionally similar to a serial in/parallel out shift register where the number of parallel bits out is equal to log base two ($\log_2$) of the order of the channel encoder 616. According to embodiments of the present invention, the symbol formatter 606 is selected for use with a quadrature phase shift keying (QPSK) modulator. As such, symbol formatter 606 is configured for grouping two (2) bits of global data together to form a QPSK symbol data word (i.e., a single two bit parallel word). Thereafter, symbol formatter 606 communicates the formatted symbol word data to the multiplexer 614. Embodiments of the present invention are not limited in this regard.

According to other embodiments of the present invention, symbol formatter 606 is functionally similar to a serial in/parallel out shift register where the number of parallel bits out is equal to log base two ($\log_2$) of the order of the channel encoder 616. The symbol formatter 606 is selected for use with a binary phase shift keying (BPSK) modulator. As such, the symbol formatter 606 is configured for mapping one bit of data to a BPSK symbol word. Thereafter, the symbol formatter 606 communicates the BPSK symbol word data to the multiplexer 614. Embodiments of the present invention are not limited in this regard.

According to other embodiments of the present invention, the symbol formatter 606 is selected for use with an 8-ary phase shift keying modulator. As such, the symbol formatter 606 is configured for mapping three (3) bits to an 8-ary PSK symbol word. Thereafter, the symbol formatter 606 communicates the 8-ary PSK symbol word data to the multiplexer 614. Embodiments of the present invention are not limited in this regard.

According to other embodiments of the invention, the symbol formatter 606 is selected for use with a sixteen quadrature amplitude modulator (16QAM). As such, the symbol formatter 606 is configured for mapping four (4) bits to a 16QAM symbol word. Thereafter, the symbol formatter 606 communicates the 16QAM symbol word data to the multiplexer 614. Embodiments of the present invention are not limited in this regard. Notably, when the symbol formatter 606 is selected for use with a non-constant amplitude data modulator, the output communication signal 140 tends to have detectable cyclostationary content.

Referring again to FIG. 6, the acquisition data generator 608 is configured for generating a "known data preamble". The "known data preamble" can be a repetition of the same known symbol or a series of known symbols. The "known data preamble" can be used to enable initial synchronization of chaotic sequences generated in the transmitter 102 and receiver (e.g., receiver 106 and/or 108 described above in relation to FIG. 1A). The duration of the "known data preamble" is determined by an amount required by a receiver (e.g., receiver 106 and/or 108 described above in relation to FIG. 1A) to synchronize with the transmitter 102 under known worst case channel conditions. The acquisition data generator 608 can be further configured for communicating the "known data preamble" to at least one of the multiplexers 614, 666.

Multiplexer 614 is configured to receive a binary word (that is to be modulated by the channel encoder 616) from the symbol formatter 606. The multiplexer 614 is also configured to receive the "known data preamble" from the acquisition data generator 608. The multiplexer 614 is coupled to the transmitter controller 610. The transmitter controller 610 is configured for controlling the multiplexer 614 so that the multiplexer 614 routes the "known data preamble" to the channel encoder 616 at the time of a new transmission.

According to alternative embodiments of the invention, the "known data preamble" is stored in a modulated form. In such a scenario, the architecture of FIG. 6 is modified such that the multiplexer 614 exists after the channel encoder 616. The "known data preamble" may also be injected at known intervals to aid in periodic resynchronization of chaotic sequences generated in the transmitter 102 and a receiver (e.g., receiver 106 and/or 108 described above in relation to FIG. 1A). This would typically be the case for an implementation meant to operate in harsh channel conditions. Embodiments of the present invention are not limited in this regard.

Referring again to FIG. 6, the multiplexer 614 can be configured for selecting symbol data to be routed to the channel encoder 616 after a preamble period has expired. Multiplexer 614 can also be configured for communicating data symbols to the channel encoder 616. In this regard, it should be appreciated that a communication of the symbol data to the channel encoder 616 is delayed by a time defined by the length of the "known data preamble." This delay allows all of a "known data preamble" to be fully communicated to the channel encoder 616 prior to communication of the data symbols.

The channel encoder 616 can be configured for performing actions to represent the "known data preamble" and the symbol data in the form of a modulated quadrature amplitude-and-time-discrete digital signal. The modulated quadrature amplitude-and-time-discrete digital signal is defined by digital words which represent intermediate frequency (IF) modulated symbols comprised of bits of global data having a one (1) value or a zero (0) value. Methods for representing digital symbols by a quadrature amplitude-and-time-discrete digital signal are well known to persons having ordinary skill in the art, and therefore will not be described herein. However, it should be appreciated that the channel encoder 616 can employ any known method for representing digital symbols by a quadrature amplitude-and-time-discrete digital signal.

As shown in FIG. 6, the channel encoder 616 can be selected as a digital baseband modulator employing quadrature phase shift keying (QPSK). As such, the output of the QPSK modulator includes an in-phase ("I") data and quadrature phase ("Q") data. Accordingly, channel encoder 616 is configured for communicating I and Q data to the complex multiplier 644.

According to embodiments of the present invention, the transmitter 102 is comprised of a sample rate matching device (not shown) between channel encoder 616 and complex multiplier 646. The sample rate matching device (not shown) can perform a sample rate increase on the amplitude-and-time-discrete digital signal so that a sample rate of the amplitude-and-time-discrete digital signal is the same as a digital chaotic sequence communicated to the complex multiplier 646. Embodiments of the present invention are not limited in this regard.

Complex multiplier 646 can be configured for performing a complex multiplication in the digital domain. The complex multiplier 646 is configured to receive an input from the channel encoder 616. The complex multiplier is further configured to receive an input from the complex adder 684. In the complex multiplier 646, the quadrature amplitude-and-time-discrete digital signal from the channel encoder 616 is multiplied by the sum of the two sample rate matched chaotic sequences. The sum chaotic signal is generated in the complex adder 684. The complex multiplier 646 generates the output communication signal 140 from the global data communication signal 134 and the protected data communication signal 128. The complex multiplier 646 is configured to deliver its output to an interpolator 626.

Data source 660 is a protected data source. Data source 660 is generally an interface configured for receiving an input signal containing protected data from an external device (not shown). As such, data source 660 can be configured for receiving bits of data from the external data source (not shown). Data source 660 can further be configured for supplying bits of data to source encoder 662 at a particular data transfer rate.

Source encoder 662 is generally configured to encode the protected data received from the external device (not shown) using a forward error correction coding scheme. The bits of protected data received at or generated by the source encoder 662 represent any type of information that may be of interest to a user. For example, the protected data can be used to represent text, telemetry, audio, or video data. Source encoder 662 can further be configured to supply bits of protected data to symbol formatter 664 at a particular data transfer rate.

The symbol formatter 664 is generally configured to process bits of protected data for forming channel encoded symbols. According to embodiments of the present invention, the source encoded symbols are formatted into parallel words compatible with pulse amplitude modulation (PAM) encoding. The symbol formatter 664 can further be configured for communicating the formatted data to the multiplexer 666.

Multiplexer 666 is generally configured for selecting symbol data to be routed to channel encoder 668 after a preamble period has expired. Multiplexer 666 can also be configured for communicating symbol data to channel encoder 668. In this regard, it should be appreciated that a communication of the symbol data to channel encoder 668 can be delayed by a time defined by the length of the "known data preamble."

Channel encoder 668 is generally configured for performing actions to represent the "known data preamble" and/or the symbol data in the form of a modulated amplitude-and-time-discrete digital signal. The modulated amplitude-and-time-discrete digital signal is defined by digital words which represent intermediate frequency (IF) modulated symbols comprised of bits of protected data having a one (1) value or a zero (0) value. Methods for representing digital symbols by an amplitude-and-time-discrete digital signal are well known to persons having ordinary skill in the art, and therefore will not be described herein. However, it should be appreciated that channel encoder 668 can employ any known method for representing digital symbols by an amplitude-and-time-discrete digital signal. Accordingly, channel encoder 668 is configured for communicating amplitude data to the MSRO 686 and complement signal generator 682.

MSRO 686 is the same as or substantially similar to the MSRO 550 of FIG. 5. As such, the description of magnitude square root operator 550 provided above in relation to FIG. 5 is sufficient for understanding the operations of MSRO 686. However, it should be understood that MSRO 686 is configured for communicating results of square root operations to complex multiplier 678.

Complex multiplier 678 is generally configured for performing a complex multiplication in the digital domain. In digital complex multiplier 678, a signal including results of square root operations performed by MSRO 686 is multiplied by a chaotic spreading code $CSC_1$. Chaotic spreading code $CSC_1$ is a digital representation of a chaotic sequence. The chaotic sequence is generated by chaos generator 640 and real uniform to quadrature Gaussian statistics mapper (RUQG) 674. Chaos generator 640 is generally configured for generating chaotic sequences in accordance with the methods described below in relation to FIGS. 9-10. Accordingly, chaos generator 640 employ a set of polynomial equations, a set of constants, and/or a set of relatively prime numbers as modulus for use in chaotic sequence generations. The rate at which the digital chaotic sequence is generated is an integer multiple of a data symbol rate. The greater the ratio between the data symbol period and the sample period of the digital chaotic sequence the higher a spreading gain. Notably, chaos generator 640 can be configured for receiving initial conditions from transmitter controller 610. The initial conditions define an arbitrary sequence starting location, i.e., the number of places (e.g., zero, one, two, Etc.) that a chaotic sequence is to be cyclically shifted. The initial condition will be described below in relation to step 1014 of FIG. 10. Chaos generator 640 can also be configured for communicating the chaotic sequence to RUQG 674.

RUQG 674 is generally configured for statistically transforming the chaotic spreading code (or chaotic sequence) into a transformed digital chaotic sequence with pre-determined statistical properties. The transformed digital chaotic sequence can have a characteristic form including real or quadrature. The transformed digital chaotic sequence can have different word widths and/or different statistical distributions. For example, RUQG 674 may take in two (2) uniformly distributed real inputs from the chaos generator 640 and convert those via a complex-valued bivariate Gaussian transformation to a quadrature output having statistical characteristics of a Guassian distribution. Such conversion techniques are well understood by those having ordinary skill in the art, and therefore will not be described in herein. However, it should be understood that such conversion techniques may use nonlinear processors, look-up tables, iterative processing (CORDIC functions), or other similar mathematical processes. RUQG 674 is also configured for communicating transformed chaotic sequences to the complex multiplier 678.

According to embodiments of the present invention, RUQG 674 statistically transforms the chaotic spreading code into a quadrature Gaussian form of the digital chaotic sequence. This statistical transformation is achieved via a nonlinear processor that combines lookup tables and embedded computational logic to implement the conversion of two (2) independent uniformly distributed random variables into a quadrature pair of Gaussian distributed variables. One such structure for this conversion is as shown in the mathematical equations (25) and (26).

$$G_1 = \sqrt{-2\log(u_1)} \cdot \cos(2\pi u_2) \quad (25)$$

$$G_2 = \sqrt{-2\log(u_1)} \cdot \sin(2\pi u_2) \quad (26)$$

where {u1, u2} are uniformly distributed independent input random variables and {$G_1$, $G_2$} are Gaussian distributed output random variables. Embodiments of the present invention are not limited in this regard. The output of the RUGQ 674 is the first chaotic spreading code $CSC_1$.

Referring again to FIG. 6, complex multiplier 678 is configured for performing complex-valued digital multiplication operations using the digital chaotic sequence output from RUQG 674 and the amplitude-and-time-discrete digital signal output from the MSRO 686. The result of the complex-valued digital multiplication operations is a digital representation of a coherent chaotic sequence spread spectrum modulated IF signal (hereinafter referred to as a "first spread spectrum digital chaotic signal"). The first spread spectrum digital chaotic signal comprises digital protected data that has been spread over a wide frequency bandwidth in accordance with the chaotic spreading code $CSC_1$ generated by components 640, 674. Complex multiplier 678 is also configured to communicate the first spread spectrum digital chaotic signal to the complex adder 684.

Complement signal generator (CSG) 682 is the same as or substantially similar to the compliment signal generator 508 of FIG. 5. As such, the description of the compliment signal generator 508 provided above in relation to FIG. 5 is sufficient for understanding the operations of the complement signal generator 682 of FIG. 6. However, it should be understood that CSCG 682 is configured for generating a complimentary signal and communicate the same to the complex multiplier 680.

Complex multiplier 680 is generally configured for performing a complex multiplication in the digital domain. In complex multiplier 680, the compliment signal from the CSG 682 is multiplied by a chaotic sequence. The chaotic sequence is generated by chaos generator 618. Chaos generator 618 is the same as or substantially similar to chaos generator 640. As such, the description of chaos generator 640 is sufficient for understanding chaos generator 618. However, is should be noted that chaos generator 618 is generally configured for generating chaotic sequences in accordance with the methods described below in relation to FIGS. 9-10. Chaos generator 618 is also configured for communicating the chaotic sequence to RUQG 670.

RUQG 670 is generally configured for statistically transforming chaotic sequences into transformed digital chaotic sequences with pre-determined statistical properties. The transformed digital chaotic sequences can have characteristic forms including real or quadrature. The transformed digital chaotic sequences can have different word widths and/or different statistical distributions. For example, RUQG 670 may take in two (2) uniformly distributed real inputs from chaos generator 618 and convert those via a complex-valued bivariate Gaussian transformation to a quadrature output having statistical characteristics of a Guassian distribution. Such conversion techniques are well understood by those having ordinary skill in the art, and therefore will not be described in herein. However, it should be understood that such conversion techniques may use nonlinear processors, look-up tables, iterative processing (CORDIC functions), or other similar mathematical processes. RUQG 670 is also configured for communicating transformed chaotic sequences to the complex multiplier 680.

According to embodiments of the present invention, RUQG 670 statistically transforms the chaotic sequence into a quadrature Gaussian form of the digital chaotic sequence. This statistical transformation is achieved via a nonlinear processor that combines lookup tables and embedded computational logic to implement the conversion of two (2) independent uniformly distributed random variables into a quadrature pair of Gaussian distributed variables. One such structure for this conversion is as shown in the above provided mathematical equations (25) and (26). Embodiments of the present invention are not limited in this regard. The output of the RUGQ 670 is the second chaotic spreading code $CSC_2$.

Referring again to FIG. 6, complex multiplier 680 is configured for performing complex-valued digital multiplication operations using the digital chaotic sequence output from RUQG 670 and the complimentary PAM signal 122 output from CSG 682. The result of the complex-valued digital multiplication operations is a digital representation of a coherent chaotic sequence spread spectrum modulated IF signal (hereinafter referred to as a "second spread spectrum digital chaotic signal"). The second spread spectrum digital chaotic signal comprises digital protected data that has been spread over a wide frequency bandwidth in accordance with the chaotic sequence generated by chaos generator 618. Complex multiplier 680 is also configured to communicate the second spread spectrum digital chaotic signal to complex adder 684.

Complex adder 684 is configured for generating the protected data communication signal 128 shown in FIG. 1A. In this regard, it should be understood that complex adder 684 is the same as or substantially similar to the complex adder 516 of FIG. 5. As such, the description of complex adder 516 provided above in relation to FIG. 5 is sufficient for understanding the operations of complex adder 684. However, it should be understood that complex adder 684 is configured for communicating the protected data communication signal 128 to the complex multiplier 646. Complex multiplier 646 is configured for generating the output communication signal 140 of FIG. 1A by performing complex multiplication operations using the amplitude-and-time-discrete digital signal (or global data communication signal 134 of FIG. 1A) from the channel encoder 616 and the protected data communication signal 128 from complex adder 684. Complex multiplier 646 is also configured for communicating the output communication signal 140 to interpolator 626.

Interpolator 626, real part of complex multiplier 628, and quadrature digital local oscillator 630 form at least one intermediate frequency (IF) translator. IF translators are well known to persons having ordinary skill in the art, and therefore will not be described herein. However, it should be understood that components 626, 628, 630 can be collectively configured for frequency modulating a signal received from complex multiplier 646 to a sampled spread spectrum digital chaotic signal. The IF translator (i.e., component 628) is configured for communicating the sampled spread spectrum digital chaotic signal to the DAC 632, wherein the sampled spread spectrum digital chaotic signal has an increased sampling rate and a non-zero intermediate frequency. DAC 632 can be configured for converting the sampled spread spectrum digital chaotic signal to an analog signal. DAC 632 can also be configured for communicating the analog signal to anti-image filter 634.

Anti-image filter 634 is configured for removing spectral images from the analog signal to form a smooth time domain signal. Anti-image filter 634 is also configured for communicating a smooth time domain signal to the RF conversion device 636. RF conversion device 636 can be a wide bandwidth analog IF-to-RF up converter. RF conversion device 636 is configured for forming an RF signal by centering a smooth time domain signal at an RF for transmission. RF conversion device 636 is also configured for communicating RF signals to a power amplifier (not shown). The power amplifier (not shown) is configured for amplifying a received RF signal. The power amplifier (not shown) is also configured for communicating amplified RF signals to an antenna element 638 for communication to a receiver (e.g., receiver 106 and/or 108 described above in relation to FIG. 1A).

It should be understood that the digital generation of the digital chaotic sequences at transmitter 102 and receivers (e.g., receiver 106 and/or 108 described above in relation to FIG. 1A) is kept closely coordinated under the control of a precision real time reference 612 clock. If the precision of the clock 612 is relatively high, then the synchronization of the chaos generators 618, 640 of transmitter 102 and the chaos generators (described below in relation to FIG. 7A, FIG. 7B, FIG. 8A and FIG. 8B) of the receivers 106, 108 is relatively close. Precision real time reference 612 allows the states of the chaos generators to be easily controlled with precision.

Receiver Architectures

Figure 7A:
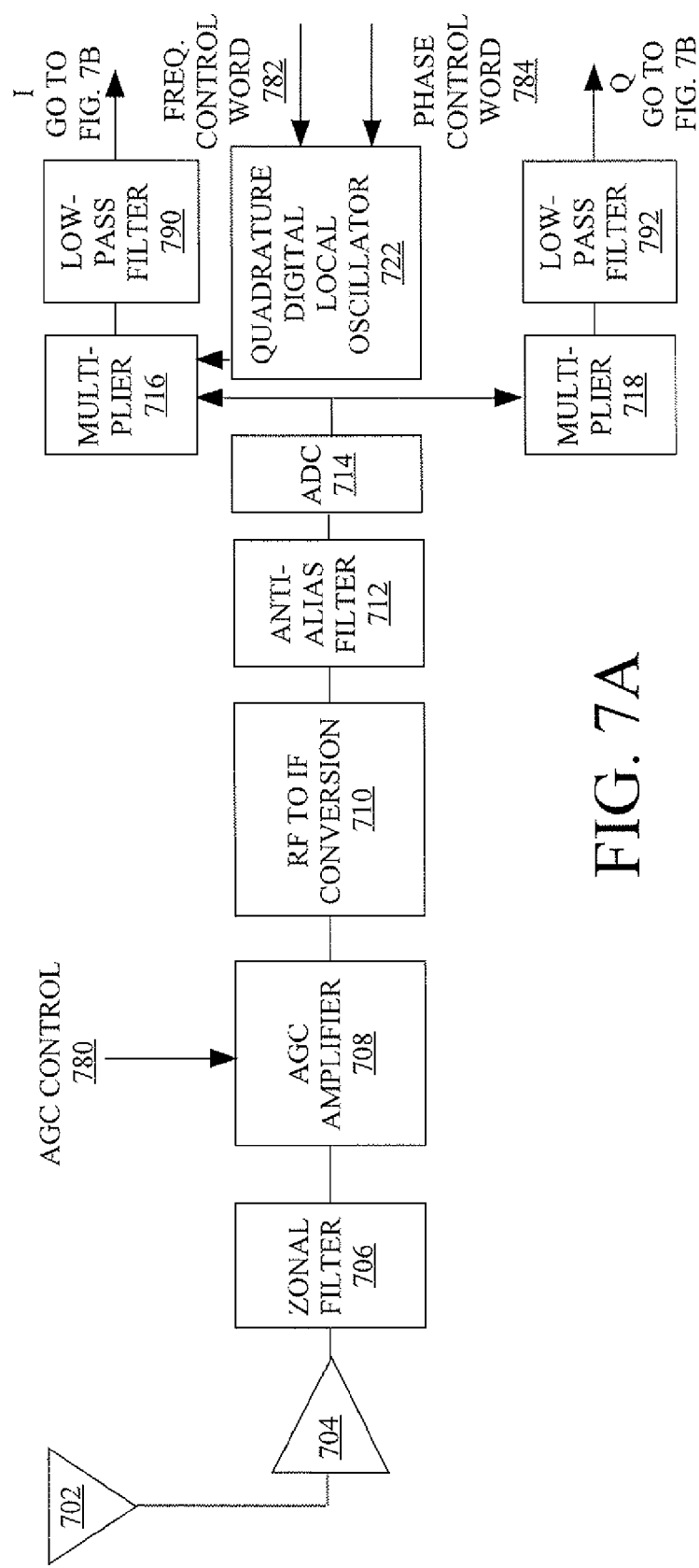
FIG. 7A is a more detailed block diagram of the full permission receiver shown in FIG. 1A according to an embodiment of the invention.
Figure 7B:
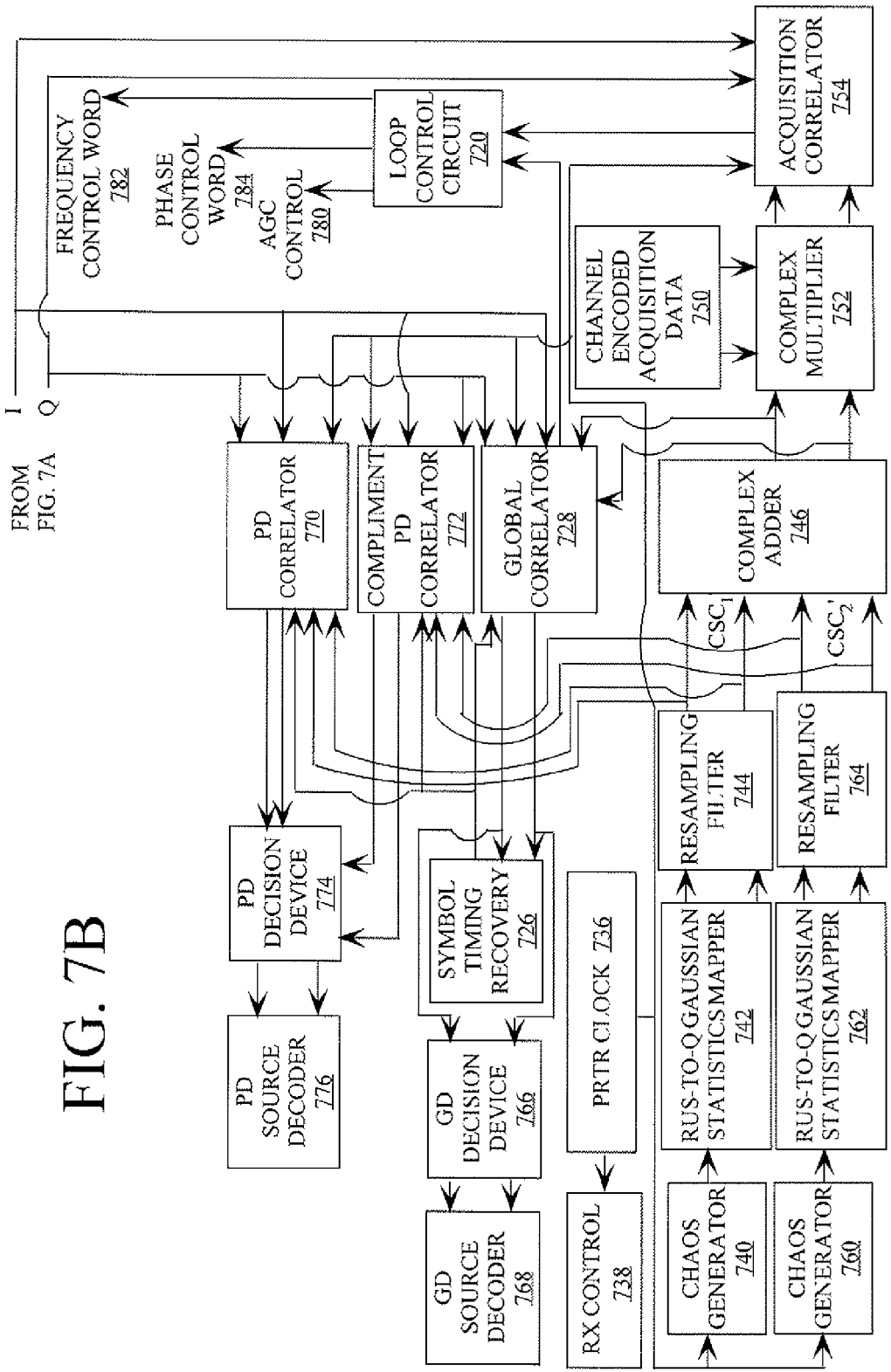
FIG. 7B is a more detailed block diagram of the full permission receiver shown in FIG. 1A according to an embodiment of the invention.

Referring now to FIG. 7A and FIG. 7B, there is provided a more detailed block diagram of receiver 106 of FIG. 1A. Receiver 106 is generally configured for receiving transmitted analog chaotic signals from the transmitter (e.g., transmitter 102 described above in relation to FIG. 1A and FIG. 6). Receiver 106 is also generally configured for down converting and digitizing a received analog chaotic signal. As shown in FIG. 7A, receiver 106 comprises an antenna element 702, a low noise amplifier (LNA) 704, a zonal filter 706, an automatic gain control (AGC) amplifier 708, a radio frequency (RF) to intermediate frequency (IF) conversion device 710, an anti-alias filter 712, and an analog-to-digital (A/D) converter 714.

Antenna element 702 is generally configured for receiving an analog input signal communicated from a transmitter (e.g., transmitter 102 described above in relation to FIG. 1A and FIG. 6) over a communications link (e.g., communications link 104 described above in relation to FIG. 1A). Antenna element 702 can also be configured for communicating the analog input signal to LNA 704. LNA 704 is generally configured for amplifying a received analog input signal while adding as little noise and distortion as possible. LNA 704 can also be configured for communicating an amplified, analog input signal to zonal filer 706. Zonal filter 706 is configured for suppressing large interfering signals outside of bands of interest. Zonal filter 706 can also be configured for communicating filtered, analog input signals to the AGC amplifier 708. AGC amplifier 708 is generally a controllable gain amplifier configured for adjusting a gain of an analog input signal. The AGC amplifier is configured to accept a signal from the Zonal filter 706 and the AGC control signal 780. AGC amplifier 708 is configured for communicating gain adjusted, analog input signals to the RF-to-IF conversion device 710.

RF-to-IF conversion device 710 is generally configured for mixing an analog input signal to a particular IF. RF-to-IF conversion device 710 is also configured for communicating mixed analog input signals to anti-alias filter 712. Anti-alias filter 712 is configured for restricting a bandwidth of a mixed analog input signal. Anti-alias filter 712 is also configured for communicating filtered, analog input signals to A/D converter 714. A/D converter 714 is configured for converting received analog input signals to digital signals. A/D converter 714 is also configured for communicating digital input signals to multipliers 716, 718.

Receiver 106 further includes a quadrature digital local oscillator (QDLO) 722, frequency control word 782, phase control word 784, and lowpass filters 790, 792.

Receiver 106 can also be configured for obtaining protected data encoded in the first product signal 124 from the transmitted analog chaotic signal by correlating it with a replica of the chaotic sequences generated by chaos generator 640 of the transmitter (e.g., transmitter 102 described above in relation to FIG. 1A and FIG. 6). Similarly, receiver 106 can be configured for obtaining protected data encoded in the second product signal 126 from the transmitted analog chaotic signal by correlating it with a replica of the chaotic sequences generated by chaos generator 618 of the transmitter (e.g., transmitter 102 described above in relation to FIG. 1A and FIG. 6). Likewise, receiver 106 can be configured for obtaining global data from the transmitted analog chaotic signal by correlating it with a de-spreading code defined by the sum of the chaotic sequences generated by chaos generators 640, 618 of the transmitter (e.g., transmitter 102 described above in relation to FIG. 1A and FIG. 6). The global data can be converted into text, sound, pictures, navigational-position information, and/or any other type of useful payload information that can be communicated. Likewise, the protected data can be converted into text, sound, pictures, navigational-position information, and/or any other type of useful payload information that can be communicated.

Notably, receiver 106 of FIG. 7A and FIG. 7B is designed to eliminate the drawbacks of conventional analog based coherent communications systems. In this regard, it should be understood that analog chaos circuits of conventional analog based coherent communications systems are synchronized by periodically exchanging state information. The exchange of state information requires a substantial amount of additional bandwidth. In contrast, receiver 106 is configured to synchronize strings of discrete time chaotic samples (i.e., chaotic sequences) without using a constant or periodic transfer of state update information. This synchronization feature of receiver 106 will become more apparent as the discussion progresses.

As shown in FIG. 7B, receiver 106 further comprises a channel encoded acquisition data generator (CEADG) 750, a symbol timing recovery circuit 726, a receiver controller 738, and a precision real time reference clock 736. Receiver 106 also includes one or more correlators 728, 770, 772, acquisition correlator, 754, protected data decision device 774, global data decision device 766, protected data source decoder 776, global data source data decoder 768, and complex multiplier 752. Receiver 106 further comprises one or more chaos generators 740, 760, real uniform statistic to quadrature Gaussian statistic mappers (RUQGs) 742, 762, re-sampling filters 744, 764, complex adder 746, and loop control circuit 720. It should be noted that the functions of the RUQGs 742, 762, can be performed by the chaos generators 740, 760. In such a scenario, receiver 106 is absent of the RUQG(s) 742, 762.

QDLO 722 shown in FIG. 7A is generally configured for generating a complex quadrature amplitude-and-time-discrete digital sinusoid at a given frequency. The digital sinusoid can be generated using a binary phase control word 784 and a binary frequency control word 782 received from the loop control circuit 720. QDLO 722 is also configured for communicating digital words representing in-phase components of the digital sinusoid to the complex multiplier 716. QDLO 722 is further configured for communicating digital words representing quadrature-phase components of the digital sinusoid to the complex multiplier 718.

Complex multiplier 716 is configured for receiving digital words from the A/D converter 714 and digital words from the in-phase component of the QDLO 722. Complex multiplier 716 is also configured for generating digital output words by multiplying digital words from A/D converter 714 by digital words from the QDLO 722. Complex multiplier 716 is further configured for communicating real data represented as digital output words to lowpass filter 790.

Complex multiplier 718 is configured for receiving digital words from A/D converter 714 and digital words from the quadrature-phase component of the QDLO 722. Complex multiplier 718 is also configured for generating digital output words by multiplying the digital words from A/D converter 714 by the digital words from QDLO 722. Complex multiplier 718 is further configured for communicating imaginary data represented as digital output words to lowpass filter 792.

Lowpass filter 790 is configured to receive the real digital data from multiplier 716 and lowpass filter the real data to generate the in-phase digital data component of the quadrature baseband form of the received signal. Lowpass filter 790 is further configured to communicate the in-phase digital output words to acquisition correlator 754 and correlators 770, 772, 728. Lowpass filter 792 is configured to receive the imaginary digital data from multiplier 718 and lowpass filter the imaginary data to generate the quadrature-phase digital data component of the quadrature baseband form of the received signal. Lowpass filter 792 is further configured to communicate the in-phase digital output words to acquisition correlator 754 and correlators 770, 772, 728.

It should be noted that the functional blocks hereinafter described in FIG. 7B represent three channel devices in the sense that the same or similar functions are being performed concurrently for purposes of extracting global data and protected data. In this regard, it will be recalled that protected data communication signal 128 includes protected data signal 120 and complimentary protected data signal 122.

Complex correlators 728, 770, 772 are configured for performing complex correlations in the digital domain. Each of the complex correlators can generally involve multiplying digital words received from multipliers 716, 718 (filtered by lowpass filters 790, 792) by digital words representing a chaotic sequence and computing a complex sum of products with staggered temporal offsets. The chaotic sequences are generated by chaos generators 740, 760, RUQGs 742, 762, or the sum of the two sequences. A first one of the chaotic sequences $CSC_1'$ is a replica of a chaotic sequence $CSC_1$ generated by chaos generator 640 and RUQG 674 of the transmitter (e.g., transmitter 102 described above in relation to FIG. 1A and FIG. 6). The first chaotic sequence $CSC_1'$ is synchronized in time and frequency with the chaotic sequence $CSC_1$ generated by chaos generator 640 and RUQG 674 of the transmitter (e.g., transmitter 102 described above in relation to FIG. 1A and FIG. 6). A second one of the chaotic sequences $CSC_2'$ is a replica of a chaotic sequence $CSC_2$ generated by chaos generator 618 and RUQG 670 of the transmitter (e.g., transmitter 102 described above in relation to FIG. 1A and FIG. 6). The second chaotic sequence $CSC_2'$ is synchronized in time and frequency with the chaotic sequence $CSC_2$ generated by chaos generator 618 and RUQG 670 of the transmitter (e.g., transmitter 102 described above in relation to FIG. 1A and FIG. 6). A third one of the chaotic sequences is a global de-spreading code. The global de-spreading code is generated by additively combining the first and second chaotic sequences ($CSC_1'+CSC_2'$).

The first and second chaotic sequences $CSC_1'$, $CSC_2'$ are generally generated in accordance with the methods described below in relation to FIGS. 9-10. Accordingly, chaos generators 740, 760 employ sets of polynomial equations, sets of constants, and/or sets of relatively prime numbers as modulus for use in chaotic sequence generations. Chaos generators 740, 760 can be configured for receiving initial conditions from receiver controller 738. The initial conditions define arbitrary sequence starting locations, i.e., the number of places (e.g., zero, one, two, etc.) that chaotic sequences are to be cyclically shifted. The initial conditions will be described below in relation to step 1014 of FIG. 10.

Chaos generator 740 is configured for communicating its chaotic sequence to the RUQG 742. Chaos generator 760 is configured for communicating its chaotic sequence to the RUQG 762. In this regard, it should be appreciated that chaos generators 740, 760 are coupled to receiver controller 738. Receiver controller 738 is configured to control chaos generators 740, 760 so that chaos generators 740, 760 generate chaotic sequences with the correct initial state when receiver 106 is in an acquisition mode and a tracking mode.

RUQGs 742, 762 are configured for statistically transforming digital chaotic sequences into transformed digital chaotic sequences. Each of the transformed digital chaotic sequences has a characteristic form. The characteristic form can include, but is not limited to, real, complex, quadrature, and combinations thereof. Each of the transformed digital chaotic sequences can have different word widths and/or different statistical distributions. RUQGs 742, 762 are also configured for communicating transformed chaotic sequences to re-sampling filters 744, 764.

According to the embodiment of the invention, RUQGs 742, 762 are configured for statistically transforming digital chaotic sequences into quadrature Gaussian forms of the digital chaotic sequences. RUQGs 742, 762 are also configured for communicating quadrature Gaussian form of the digital chaotic sequences to the re-sampling filters 744, 764. More particularly, RUQGs 742, 762 communicate in-phase ("I") data and quadrature phase ("Q") data to the re-sampling filters 744, 764. Embodiments of the present invention are not limited in this regard.

Referring again to FIG. 7B, re-sampling filters 744, 764 are configured for forwarding transformed chaotic sequences $CSC_1'$, $CSC_2'$ to the complex correlators 770, 772, and complex adder 746. Re-sampling filters 744, 764 are also configured for making chaos sample rates compatible with a received signal sample rate when receiver 106 is in acquisition mode. Re-sampling filters 744, 764 are further configured to compensate for transmit and receive clock offsets with less than a certain level of distortion when receiver 106 is in a steady state demodulation mode. In this regard, it should be appreciated that re-sampling filters 744, 764 are configured for converting the sampling rates of in-phase ("I") and quadrature-phase ("Q") data sequences from first sampling rates to second sampling rates without changing the spectrum of the data contained therein. Re-sampling filters 744, 764 are configured to communicate in-phase ("I") and quadrature-phase ("Q") data sequences to complex correlators 770, 772 and complex adder 746.

It should be noted that if a sampled form of a chaotic sequence is thought of as discrete samples of a continuous band limited chaos then re-sampling filters 744, 764 are effectively tracking the discrete time samples, computing continuous representations of the chaotic sequences, and re-sampling the chaotic sequences at the discrete time points required to match the discrete time points sampled by the A/D converter 714. In effect, input values and output values of each re-sampling filter 744, 764 are not exactly the same because the values are samples of the same waveform taken at slightly offset times. However, the values are samples of the same waveform so the values have the same power spectral density.

Referring again to FIG. 7B, complex adder 746 is configured to receive $CSC_1'$ from resampling filter 744 and to receive $CSC_2'$ from resampling filter 764 and to compute global data chaotic sequence $CSC_1'+CSC_2'$. Complex adder 746 is also configured to output the global chaotic sequence to global correlator 728. In the embodiment shown in FIG. 7B, initial time, phase and frequency offset acquisition is performed using the global chaotic sequence $CSC_1'+CSC_2'$. Complex adder 746 is also configured to output the global chaotic sequence to complex multiplier 752. In other embodiments of the present invention, initial time, phase and frequency offset acquisition may be performed using the global chaotic sequences $CSC_1'$ or $CSC_2'$.

Referring again to FIG. 7B, CEADG 750 is configured for generating modulated acquisition sequences. CEADG 750 is also configured for communicating modulated acquisition sequences to the complex multiplier 752. Complex multiplier 752 is configured for performing complex multiplications in the digital domain to yield references for the digital input signal. Each of the complex multiplications can involve multiplying a modulated acquisition sequence received from the CEADG 750 by a digital representation of a global chaotic sequence. Complex multiplier 752 is also configured for communicating reference signals to the acquisition correlator.

Correlators 770, 772, 728 are configured to correlate locally generated chaotic signals with the received chaotic spread signals to recover the protected and local data. When properly aligned with symbol timing, correlator 770 recovers protected data by correlating the received spread signal with the chaotic sequence $CSC_1'$. Correlator 772 recovers complement protected data by correlating the received spread signal with the chaotic sequence $CSC_2'$. Correlator 728 is configured for recovering global data by correlating the received spread signal with the global chaotic sequence $CSC_1'+CSC_2'$. In this regard, it should be understood that the sense of the real and imaginary components of the correlations is directly related to the values of the real and imaginary components of the symbols of a digital input signal. It should also be understood that the magnitudes relative to a reference magnitude of the real and imaginary components of the correlation can be directly related to the magnitude values of the real and imaginary components of the amplitude modulated symbols of a digital input signal. The reference value is dependent on the processing gain of the correlator, the gain control value, and the overall gain of the receiver signal processing chain. Methods for calculating a reference magnitude are known to those having ordinary skill in the art and shall not be discussed in detail herein. Thus, the data recovery correlators include both phase and magnitude components of symbol soft decisions. The phrase "soft decisions", as used herein, refers to soft-values (which are represented by soft-decision bits) that comprise information about the bits contained in a sequence. Soft-values are values that represent the probability that a particular symbol is an allowable symbol. For example, a soft-value for a particular binary symbol can indicate that a probability of a bit being a one (1) is p(1)=0.3. Conversely, the same bit can have a probability of being a zero (0) which is p(0)=0.7.

Similarly, at least one of the correlators is configured to facilitate symbol timing tracking. Correlator 728 is configured for correlating a chaotic sequence $CSC_1'+CSC_2'$ with a digital input signal on the assumed symbol boundaries, advanced symbol boundaries, and retarded symbol boundaries. In this regard, it should be understood that, the sense and magnitude of the real and imaginary components of the correlation is directly related to the time offsets of the real and imaginary components of the symbols relative to actual boundaries. This symbol tracking technique is well known to those having ordinary skill in the art and shall not be discussed in detail herein. It should also be understood that this symbol time tracking method is only one of a number of methods known to those skilled in the art and does not limit the scope of the invention in any way. The symbol time tracking correlator is also configured to communicate advanced, on time, and retarded correlation information to the symbol timing recovery block 726.

Each of the correlators 770, 772, are also configured for communicating soft decisions to a protected data hard decision device 774 for final symbol decision making. The protected data hard decision device 774 is configured for communicating symbol decisions to a protected data source decoder 776. The protected data source decoder 776 is configured for converting symbols to a binary form and decoding any FEC applied at a transmitter (e.g., transmitter 102 described above in relation to FIG. 1A and FIG. 6). The protected data source decoder 776 is also configured for passing decoded bit streams to one or more external devices (not shown) utilizing the decoded protected data. The correlator 728 is also configured for communicating soft decisions to a global data hard decision device 766 for final symbol decision making. The global data hard decision device 766 is configured for communicating symbol decisions to a global data source decoder 768. The global data source decoder 768 is configured for converting symbols to a binary form and decoding any FEC applied at a transmitter (e.g., transmitter 102 described above in relation to FIG. 1A and FIG. 6). The global data source decoder 768 is also configured for passing decoded bit streams to one or more external devices (not shown) utilizing the decoded global data.

Acquisition Mode:

The acquisition correlator 754 is generally configured for acquiring initial timing information associated with a chaotic sequence and initial timing associated with a data sequence. The acquisition correlator 754 is further configured for acquiring initial phase and frequency offset information between a chaotic sequence and a digital input signal. Methods for acquiring initial timing information are well known to persons having ordinary skill in the art, and therefore will not be described herein. Similarly, methods for acquiring initial phase/frequency offset information are well known to persons having ordinary skill in the art, and therefore will not be described herein. However, it should be appreciated that any such method for acquiring initial timing information and/or for tracking phase/frequency offset information can be used without limitation.

The acquisition correlator 754 is configured for communicating magnitude and phase information as a function of time to the loop control circuit 720. Loop control circuit 720 is configured for using magnitude and phase information to calculate a deviation of an input signal magnitude from a nominal range and to calculate timing, phase, and frequency offset information. The calculated information can be used to synchronize a chaotic sequence with a digital input signal. Loop control circuit 720 is also configured for communicating phase/frequency offset information to the QDLO 722 and for communicating gain deviation compensation information to the AGC amplifier 708. Loop control circuit 720 is further configured for communicating retiming control signals to re-sampling filters 744, 764 and chaos generators 740, 760.

Precision real time reference 736 is the same as or substantially similar to the precision real time reference 612 of FIG. 6. The description provided above in relation to the precision real time reference 612 is sufficient for understanding the precision real time reference 736 of FIG. 7B.

The operation of receiver 106 will now be briefly described with regard to an acquisition mode and a steady state demodulation mode. In acquisition mode, re-sampling filters 744, 764 perform a rational rate change and forwards a transformed chaotic sequences to a complex adder 746. The complex adder forms the global chaotic sequence $CSC_1'+CSC_2'$ and outputs it to digital complex multiplier 752. CEADG 750 generates a modulated acquisition sequence and forwards the same to a particular digital complex multiplier 752. The complex multiplier 752 performs a complex multiplication in the digital domain. In the complex multiplier 752, a modulated acquisition sequence from the CEADG 750 is multiplied by a digital representation of a chaotic sequence to yield a reference for a digital input signal that was generated at a transmitter (e.g., transmitter 102 described above in relation to FIG. 1A and FIG. 6) to facilitate initial acquisition. The chaotic sequence is generated in a chaos generators 740, 760 and RUQGs 744, 764. The complex multiplier 752 communicates a reference signal to the acquisition correlator 754. In this search mode, the acquisition correlator 754 searches across an uncertainty window to locate a received signal state so that chaos generators 740, 760 can be set with the time synchronized state vector.

Steady State Demodulation Mode:

In the embodiment shown in FIG. 7B, in steady state demodulation mode, correlator 728 tracks the correlation between the received modulated signal and the locally generated chaos close to the nominal correlation peak to generate magnitude and phase information as a function of time. This information is passed to the loop control circuit 720. Loop control circuit 720 applies appropriate algorithmic processing to this information to extract phase offset, frequency offset, and magnitude compensation information. The correlator 728 also passes its output information, based on correlation times terminated by symbol boundaries, to a symbol timing recovery circuit 726 and global data decision device 766.

Loop control circuit 720 monitors the output of the global correlator 728. When loop control circuit 720 detects fixed correlation phase offsets, the phase control of QDLO 722 is modified to remove the phase offset. When loop control circuit 720 detects phase offsets that change as a function of time, it adjusts re-sampling filters 744, 764 which act as incommensurate re-samplers when receiver 106 is in steady state demodulation mode or the frequency control of QDLO 722 is modified to remove frequency or timing offsets.

When the correlator's 728 output indicates that the received digital input signal timing has "drifted" more than plus or minus a half (½) of a sample time relative to a locally generated chaotic sequence, loop control circuit 720 (1) adjusts a correlation window in an appropriate temporal direction by one sample time, (2) advances or retards a state of the local chaos generators 740, 760 by one iteration state, and (3) adjusts re-sampling filters 744, 764 to compensate for the time discontinuity. This loop control circuit 720 process keeps the chaos generators 618, 640 of the transmitter (e.g., transmitter 102 described above in relation to FIG. 1A and FIG. 6) and the chaos generators 740, 760 of the receiver 106 synchronized to within half (½) of a sample time.

If a more precise temporal synchronization is required to enhance performance, a re-sampling filter can be implemented as a member of the class of polyphase fractional time delay filters. This class of filters is well known to persons having ordinary skill in the art, and therefore will not be described herein.

As described above, a number of chaotic samples are combined with an information symbol at the transmitter 102. Since the transmitter 102 and receiver 106 timing are referenced to two (2) different precision real time reference clock 612, 736 oscillators, symbol timing must be recovered at receiver 106 to facilitate robust demodulation. In another embodiment, symbol timing recovery can include (1) multiplying a received input signal by a complex conjugate of a locally generated chaotic sequence using a complex multiplier, (2) computing an N point running average of the product where N is a number of chaotic samples per symbol time, (3) storing the values, the maximum absolute values of the running averages, and the time of occurrence, and (4) statistically combining the values at the symbol timing recovery circuit 726 to recover symbol timing.

In this steady state demodulation mode, symbol timing recovery circuit 726 communicates symbol onset timing to correlators 770, 772, 728 for controlling an initiation of a symbol correlation. The correlators 770, 772, 728 correlates a locally generated chaotic sequence with a received digital input signal during symbol duration. The sense and magnitude of real and imaginary components of the correlation are directly related to the values of the real and imaginary components of symbols of a digital input signal. Accordingly, the correlators 770, 772, 728 generates symbol soft decisions.

Figure 8A:
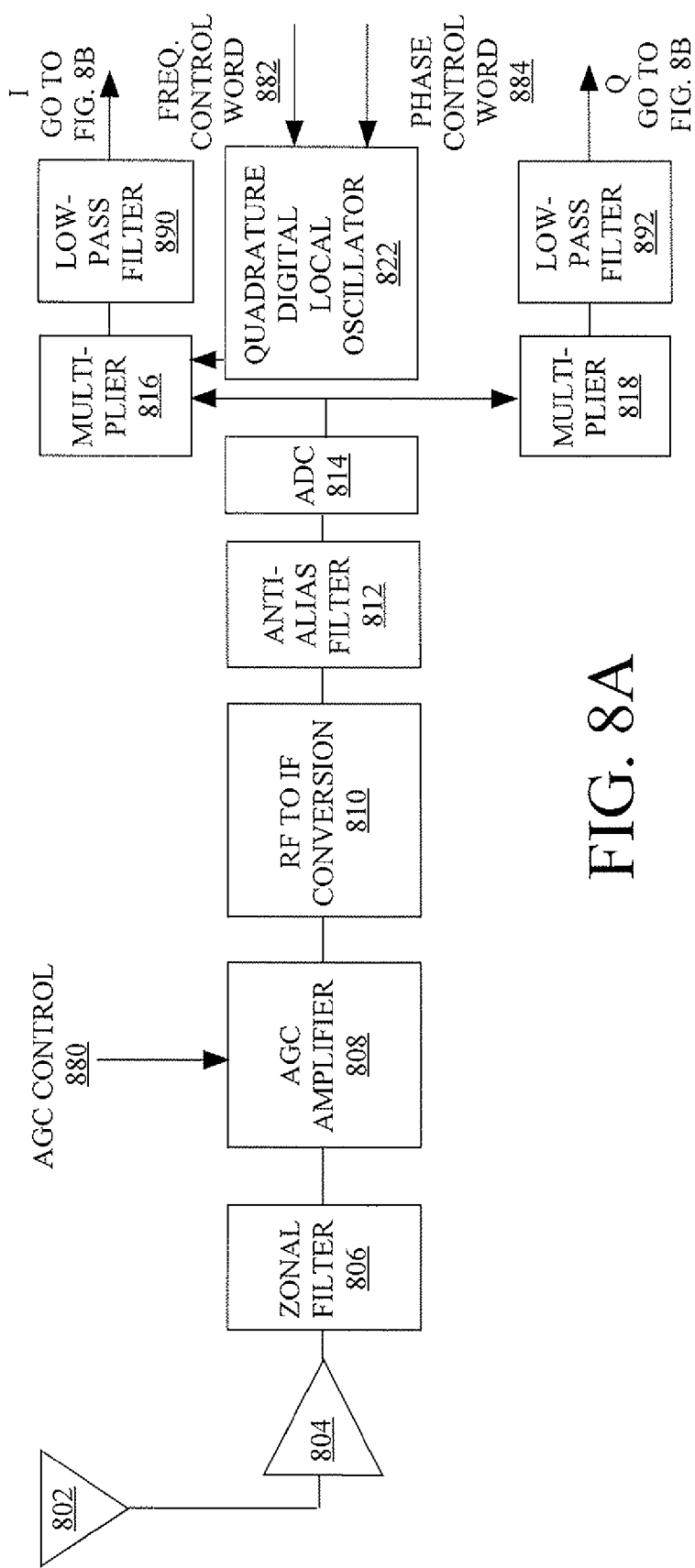
FIG. 8A is a more detailed block diagram of the partial permission receiver shown in FIG. 1A according to an embodiment of the invention.
Figure 8B:
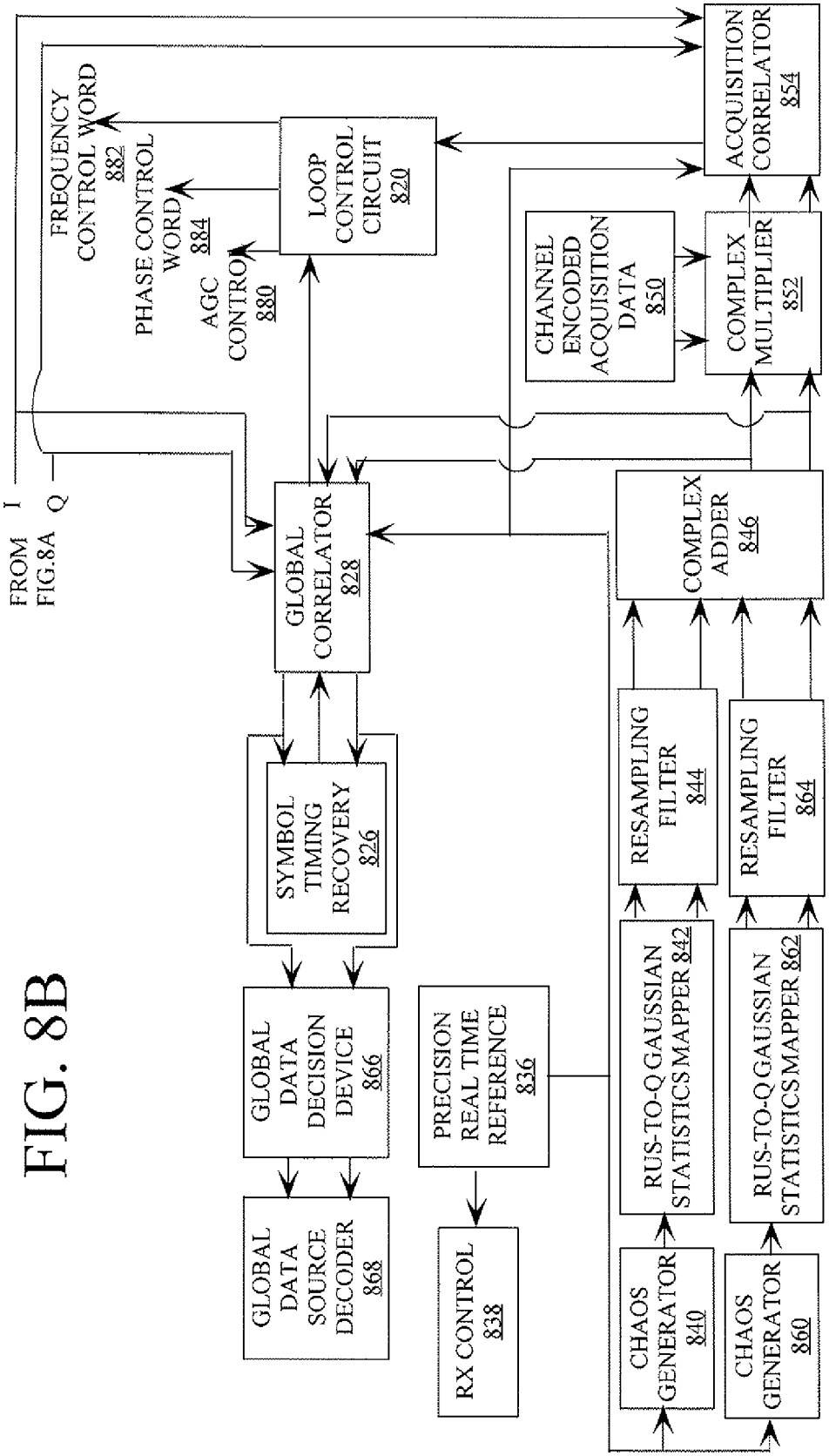
FIG. 8B is a more detailed block diagram of the partial permission receiver shown in FIG. 1A according to an embodiment of the invention.

Referring now to FIGS. 8A and 8B, there is provided block diagrams of an exemplary embodiment of receiver 108 of FIG. 1A. Receiver 108 is generally configured for receiving transmitted analog chaotic signals from a transmitter (e.g., transmitter 102 described above in relation to FIG. 1A and FIG. 6), down converting the received analog chaotic signal, and digitizing the down converted analog chaotic signal. Receiver 108 is also generally configured for acquiring, tracking, and de-spreading a transmitted analog chaotic signal by correlating it with a de-spreading code. The de-spreading code is defined by the following mathematical expression $DSC=CSC_1'+CSC_2'$, where $CSC_1'$ and $CSC_2'$ are as described in relation to FIG. 7B. Receiver 108 is further configured for processing de-spreaded analog chaotic signals to obtain global data contained therein. The global data can be converted into text, sound, pictures, navigational-position information, and/or any other type of useful payload information that can be communicated.

As shown in FIG. 8A, receiver 108 is comprised of a plurality of components 802, 804, 806, 808, 810, 812, 814, 816, 818, 822, 880, 882, 884, 890, 892. Components 802, 804, 806, 808, 810, 812, 814, 816, 818, 822, 880, 882, 884, 890, 892 of the receiver 108 are the same as or substantially similar to the respective components 702, 704, 706, 708, 710, 712, 714, 716, 718, 722, 780, 782, 784, 790, 792 of FIG. 7B. As such, the description provided above in relation to the components 702, 704, 706, 708, 710, 712, 714, 716, 718, 722, 780, 782, 784, 790, 792 is sufficient for understanding the components 802, 804, 806, 808, 810, 812, 814, 816, 818, 822, 880, 882, 884, 890, 892. of receiver 108.

As shown in FIG. 8B, receiver 108 further comprises a channel encoded acquisition data generator (CEADG) 850, a symbol timing recovery circuit 826, a receiver controller 838, and a precision real time reference clock 836. Receiver 108 also includes global correlator 828, acquisition correlator, 854, global data decision device 866, global data source data decoder 868, and complex multiplier 852. Receiver 108 further comprises one or more chaos generators 840, 860, real uniform statistic to quadrature Gaussian statistic mappers (RUQGs) 842, 862, re-sampling filters 844, 864, complex adder 846, and loop control circuit 820. It should be noted that the functions of the RUQGs 842, 862, can be performed by the chaos generators 840, 860. In such a scenario, receiver 108 is absent of the RUQG(s) 842, 862.

Components 850, 826, 838, 836, 828, 854, 866, 868, 852, 840, 860, 842, 862, 844, 864, 846 of the receiver 108 are the same as or substantially similar to the respective components 750, 726, 738, 736, 728, 754, 766, 768, 752, 740, 760, 742, 762, 744, 764, 746 of FIG. 7B. As such, the description provided above in relation to the components 750, 726, 738, 736, 728, 754, 766, 768, 752, 740, 760, 742, 762, 744, 764, 746 is sufficient for understanding the components 850, 826, 838, 836, 828, 854, 866, 868, 852, 840, 860, 842, 862, 844, 864, 846 of receiver 108. However, it should be understood that acquisition and demodulation in receiver 108 is restricted to the global data symbols, e.g., any information-bearing amplitude content can not be demodulated as $CSC_1'$ and $CSC_2'$ are not independently available for exclusive despreading.

In some embodiments of the present invention, the intermediate calculation results and other related values used to generate the despreading sequence DSC of FIG. 8B may be intentionally masked from access by the user of the partial permission receiver 104. Embodiments of the present invention are not limited in this regard.

Chaos Generators and Digital Chaotic Sequence Generation

Figure 9:
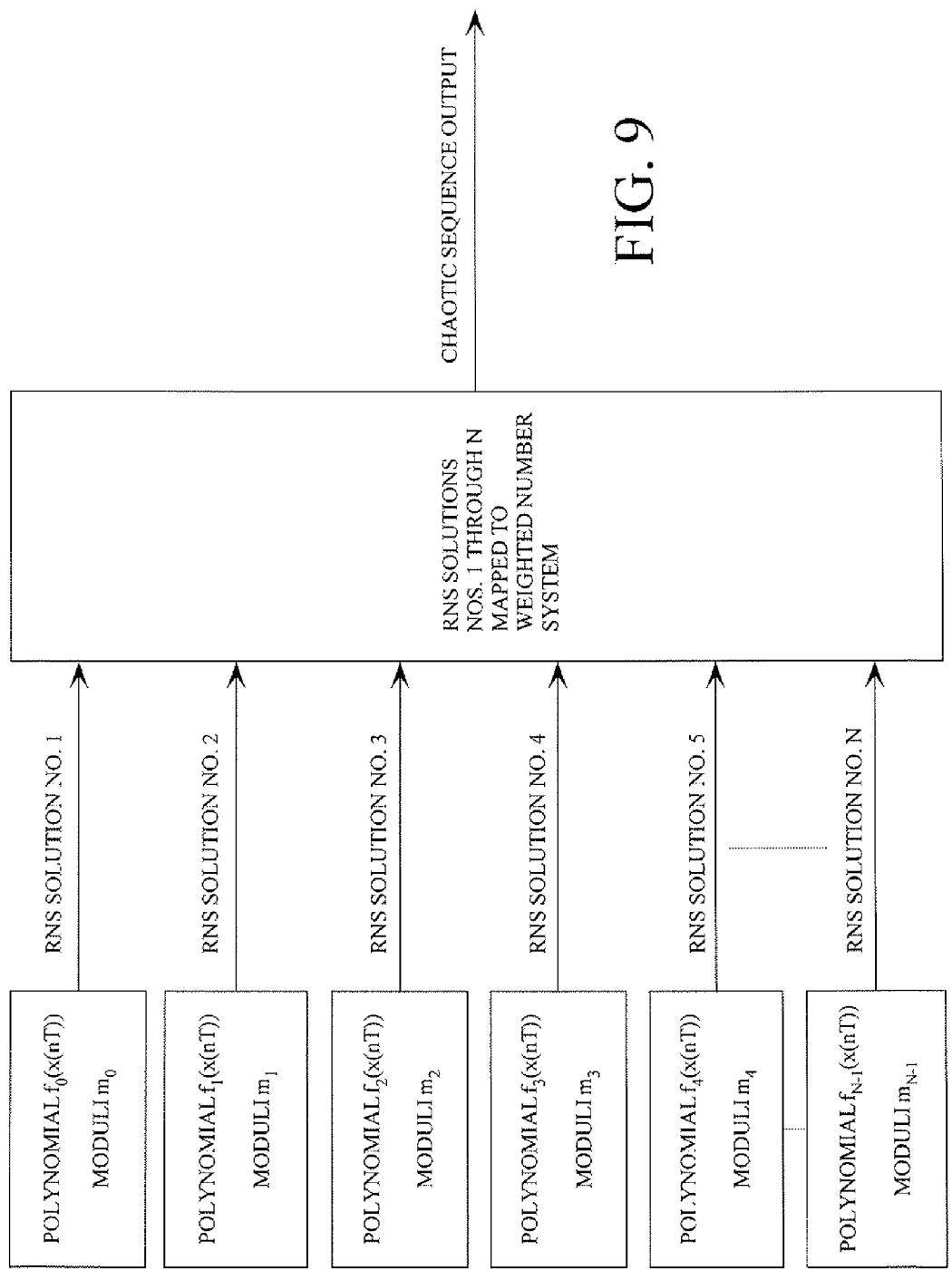
FIG. 9 is a conceptual diagram of the chaos generators of FIGS. 6, 7B and 8B.

Referring now to FIG. 9, there is provided a conceptual diagram of a chaos generator 618, 640, 740, 760, 840, 860 (described above in relation to FIG. 6, FIG. 7B, and FIG. 8B). As shown in FIG. 9, generation of the chaotic sequence begins with N polynomial equations $f_0(x(nT))$, ..., $f_{N-1}(x(nT))$. The polynomial equations $f_0(x(nT))$, ..., $f_{N-1}(x(nT))$ can be selected as the same polynomial equation or as different polynomial equations. According to an aspect of the invention, the polynomial equations $f_0(x(nT))$, ..., $f_{N-1}(x(nT))$ are selected as irreducible polynomial equations having chaotic properties in Galois field arithmetic. Such irreducible polynomial equations include, but are not limited to, irreducible cubic polynomial equations and irreducible quadratic polynomial equations. The phrase "irreducible polynomial equation", as used herein, refers to a polynomial equation that cannot be expressed as a product of at least two nontrivial polynomial equations over the same Galois field (GF). For example, the polynomial equation $f(x(nT))$ is irreducible if there does not exist two (2) non-constant polynomial equations $g(x(nT))$ and $h(x(nT))$ in $x(nT)$ with rational coefficients such that $f(x(nT))=g(x(nT)) \cdot h(x(nT))$.

Each of the polynomial equations $f_0(x(nT))$, ..., $f_{N-1}(x(nT))$ can be solved independently to obtain a respective solution. Each solution can be expressed as a residue number system (RNS) residue value using RNS arithmetic operations, i.e., modulo operations. Modulo operations are well known to persons having ordinary skill in the art, and therefore will not be described herein. However, it should be appreciated that an RNS residue representation for some weighted value "a" can be defined by mathematical equation (27).

$$R=\{a \text{ modulo } m_0, a \text{ modulo } m_1, \ldots, a \text{ modulo } m_{N-1}\} \quad (27)$$

where R is an RNS residue N-tuple value representing a weighted value "a" and $m_0, m_1, \ldots, m_{N-1}$ respectively are the moduli for RNS arithmetic operations applicable to each polynomial equation $f_0(x(nT))$, ..., $f_{N-1}(x(nT))$. $R(nT)$ can be a representation of the RNS solution of a polynomial equation $f(x(nT))$ defined as $R(nT)\{f_0(x(nT)) \text{ modulo } m_0, f_1(x(nT)) \text{ modulo } m_1, \ldots, f_{N-1}(x(nT)) \text{ modulo } m_{N-1}\}$.

From the foregoing, it will be appreciated that the RNS employed for solving each of the polynomial equations $f_0(x(nT))$, ..., $f_{N-1}(x(nT))$ respectively has a selected modulus value $m_0, m_1, \ldots, m_{N-1}$. The modulus value chosen for each RNS moduli is preferably selected to be relatively prime numbers $p_0, p_1, \ldots, p_{N-1}$. The phrase "relatively prime numbers", as used herein, refers to a collection of natural numbers having no common divisors except one (1). Consequently, each RNS arithmetic operation employed for expressing a solution as an RNS residue value uses a different prime number $p_0, p_1, \ldots, p_{N-1}$ as a moduli $m_0, m_1, \ldots, m_{N-1}$.

The RNS residue value calculated as a solution to each one of the polynomial equations $f_0(x(nT))$, ..., $f_{N-1}(x(nT))$ will vary depending on the choice of prime numbers $p_0, p_1, \ldots, p_{N-1}$ selected as a moduli $m_0, m_1, \ldots, m_{N-1}$. Moreover, the range of values will depend on the choice of relatively prime numbers $p_0, p_1, \ldots, p_{N-1}$ selected as a moduli $m_0, m_1, \ldots, m_{N-1}$. For example, if the prime number five hundred three (503) is selected as modulus $m_0$, then an RNS solution for a first polynomial equation $f_0(x(nT))$ will have an integer value between zero (0) and five hundred two (502). Similarly, if the prime number four hundred ninety-one (491) is selected as modulus $m_1$, then the RNS solution for a second polynomial equation $f_1(x(nT))$ has an integer value between zero (0) and four hundred ninety (490).

According to an embodiment of the invention, each of the polynomial equations $f_0(x(nT))$, ..., $f_{N-1}(x(nT))$ is selected as an irreducible cubic polynomial equation having chaotic properties in Galois field arithmetic. Each of the polynomial equations $f_0(x(nT))$, ..., $f_{N-1}(x(nT))$ can also be selected to be a constant or varying function of time. The irreducible cubic polynomial equation is defined by a mathematical equation (28).

$$f(x(nT))=Q(k)x^3(nT)+R(k)x^2(nT)+S(k)x(nT)+C(k,L) \quad (28)$$

where:
x is value for a variable defining a sequence location;
n is a sample time index value;
k is a polynomial time index value;
L is a constant component time index value;
T is a fixed constant having a value representing a time interval or increment;
Q, R, and S are coefficients that define the polynomial equation $f(x(nT))$; and
C is a coefficient of $x(nT)$ raised to a zero power and is therefore a constant for each polynomial characteristic.

In embodiments of the present invention, a value of C is selected which empirically is determined to produce an irreducible form of the stated polynomial equation $f(x(nT))$ for a particular prime modulus. For a given polynomial with fixed values for Q, R, and S more than one value of C can exist, each providing a unique iterative sequence. Embodiments of the present invention are not limited in this regard.

According to another embodiment of the invention, the polynomial equations $f_0(x(nT))$, ..., $f_{N-1}(x(nT))$ are identical exclusive of a constant value C. For example, a first polynomial equation $f_0(x(nT))$ is selected as $f_0(x(nT))=3x^3(nT)+3x^2(nT)+x(nT)+C_0$. A second polynomial equation $f_1(x(nT))$ is selected as $f_1(x(nT))=3x^3(nT)+3x^2(nT)+x(nT)+C_1$. A third polynomial equation $f_2(x(nT))$ is selected as $f_2(x(nT))=3x^3(nT)+3x^2(nT)+x(nT)+C_2$, and so on. Each of the constant values $C_0, C_1, \ldots, C_{N-1}$ is selected to produce an irreducible form in a residue ring of the stated polynomial equation $f(x(nT))=3x^3(nT)+3x^2(nT)+x(nT)+C$. In this regard, it should be appreciated that each of the constant values $C_0, C_1, \ldots, C_{N-1}$ is associated with a particular modulus $m_0, m_1, \ldots, m_{N-1}$ value to be used for RNS arithmetic operations when solving the polynomial equation $f(x(nT))$. Such constant values $C_0, C_1, \ldots, C_{N-1}$ and associated modulus $m_0, m_1, \ldots, m_{N-1}$ values which produce an irreducible form of the stated polynomial equation $f(x(nT))$ are listed in the following Table (1).

TABLE 1

| Moduli values $m_0, m_1, \ldots, m_{N-1}$: | Sets of constant values $C_0, C_1, \ldots, C_{N-1}$: |
|---|---|
| 3 | {1, 2} |
| 5 | {1, 3} |
| 11 | {4, 9} |
| 29 | {16, 19} |
| 47 | {26, 31} |
| 59 | {18, 34} |
| 71 | {10, 19, 20, 29} |
| 83 | {22, 26, 75, 79} |
| 101 | {27, 38, 85, 96} |
| 131 | {26, 39, 77, 90} |
| 137 | {50, 117} |
| 149 | {17, 115, 136, 145} |
| 167 | {16, 32, 116, 132} |
| 173 | {72, 139} |
| 197 | {13, 96, 127, 179} |
| 233 | {52, 77} |
| 251 | {39, 100, 147, 243} |
| 257 | {110, 118} |
| 269 | {69, 80} |
| 281 | {95, 248} |
| 293 | {37, 223} |
| 311 | {107, 169} |
| 317 | {15, 55} |
| 347 | {89, 219} |
| 443 | {135, 247, 294, 406} |
| 461 | {240, 323} |
| 467 | {15, 244, 301, 425} |
| 479 | {233, 352} |
| 491 | {202, 234} |
| 503 | {8, 271} |

Embodiments of the present invention are not limited in this regard.

The number of discrete magnitude states (dynamic range) that can be generated with the system shown in FIG. 9 will depend on the quantity of polynomial equations N and the modulus values $m_0, m_1, \ldots, m_{N-1}$ values selected for the RNS number systems. In particular, this value can be calculated as the product $M = m_0 \cdot m_1 \cdot m_3 \cdot m_4 \cdot \ldots \cdot m_{N-1}$.

Referring again to FIG. 9, it should be appreciated that each of the RNS solutions No. 1, . . . , No. N is expressed in a binary number system representation. As such, each of the RNS solutions No. 1, . . . , No. N is a binary sequence of bits. Each bit of the sequence has a zero (0) value or a one (1) value. Each binary sequence has a bit length selected in accordance with particular moduli.

According to an embodiment of the invention, each binary sequence representing a residue value has a bit length (BL) defined by a mathematical equation (29).

$$BL = \text{Ceiling}[\text{Log } 2(m)] \quad (29)$$

where m is selected as one of moduli $m_0, m_1, \ldots, m_{N-1}$. Ceiling[u] refers to a next highest whole integer with respect to an argument u.

In order to better understand the foregoing concepts, an example is useful. In this example, six (6) relatively prime moduli are used to solve six (6) irreducible polynomial equations $f_0(x(nT)), \ldots, f_5(x(nT))$. A prime number $p_0$ associated with a first modulus $m_0$ is selected as five hundred three (503). A prime number $p_1$ associated with a second modulus $m_1$ is selected as four hundred ninety one (491). A prime number $p_2$ associated with a third modulus $m_2$ is selected as four hundred seventy-nine (479). A prime number $p_3$ associated with a fourth modulus $m_3$ is selected as four hundred sixty-seven (467). A prime number $p_4$ associated with a fifth modulus $m_4$ is selected as two hundred fifty-seven (257). A prime number $p_5$ associated with a sixth modulus $m_5$ is selected as two hundred fifty-one (251). Possible solutions for $f_0(x(nT))$ are in the range of zero (0) and five hundred two (502) which can be represented in nine (9) binary digits. Possible solutions for $f_1(x(nT))$ are in the range of zero (0) and four hundred ninety (490) which can be represented in nine (9) binary digits. Possible solutions for $f_2(x(nT))$ are in the range of zero (0) and four hundred seventy eight (478) which can be represented in nine (9) binary digits. Possible solutions for $f_3(x(nT))$ are in the range of zero (0) and four hundred sixty six (466) which can be represented in nine (9) binary digits. Possible solutions for $f_4(x(nT))$ are in the range of zero (0) and two hundred fifty six (256) which can be represented in nine (9) binary digits. Possible solutions for $f_5(x(nT))$ are in the range of zero (0) and two hundred fifty (250) which can be represented in eight (8) binary digits. Arithmetic for calculating the recursive solutions for polynomial equations $f_0(x(nT)), \ldots, f_4(x(nT))$ requires nine (9) bit modulo arithmetic operations. The arithmetic for calculating the recursive solutions for polynomial equation $f_5(x(nT))$ requires eight (8) bit modulo arithmetic operations. In aggregate, the recursive results $f_0(x(nT)), \ldots, f_5(x(nT))$ represent values in the range from zero (0) to M−1. The value of M is calculated as follows: $p_0 \cdot p_1 \cdot p_2 \cdot p_3 \cdot p_4 \cdot p_5 = 503 \cdot 491 \cdot 479 \cdot 467 \cdot 257 \cdot 251 = 3{,}563{,}762{,}191{,}059{,}523$. The binary number system representation of each RNS solution can be computed using Ceiling[Log 2(3,563,762,191,059,523)]=Ceiling[51.66]=52 bits. Because each polynomial is irreducible, all 3,563,762,191,059,523 possible values are computed resulting in a sequence repetition time of every M times T seconds, i.e., a sequence repetition times an interval of time between exact replication of a sequence of generated values. Embodiments of the present invention are not limited in this regard.

Referring again to FIG. 9, the RNS solutions No. 1, . . . , No. N are mapped to a weighted number system representation thereby forming a chaotic sequence output. The phrase "weighted number system", as used herein, refers to a number system other than a residue number system. Such weighted number systems include, but are not limited to, an integer number system, a binary number system, an octal number system, and a hexadecimal number system.

According to an aspect of the invention, the RNS solutions No. 1, . . . , No. N are mapped to a weighted number system representation by determining a series of digits in the weighted number system based on the RNS solutions No. 1, . . . , No. N. The term "digit", as used herein, refers to a symbol of a combination of symbols to represent a number. For example, a digit can be a particular bit of a binary sequence. According to another aspect of the invention, the RNS solutions No. 1, . . . , No. N are mapped to a weighted number system representation by identifying a number in the weighted number system that is defined by the RNS solutions No. 1, . . . , No. N. According to yet another aspect of the invention, the RNS solutions No. 1, . . . , No. N are mapped to a weighted number system representation by identifying a truncated portion of a number in the weighted number system that is defined by the RNS solutions No. 1, . . . , No. N. The truncated portion can include any serially arranged set of digits of the number in the weighted number system. The truncated portion can also be exclusive of a most significant digit of the number in the weighted number system. The truncated portion can be a chaotic sequence with one or more digits removed from its beginning and/or ending. The truncated portion can also be a segment including a defined number of digits extracted from a chaotic sequence. The truncated portion can further be a result of a partial mapping of the RNS solutions No. 1, . . . , No. N to a weighted number system representation.

According to an embodiment of the invention, a mixed-radix conversion method is used for mapping RNS solutions No. 1, . . . , No. N to a weighted number system representation. "The mixed-radix conversion procedure to be described here can be implemented in" [modulo moduli only and not modulo the product of moduli.] *See Residue Arithmetic and Its Applications To Computer Technology*, written by Nicholas S. Szabo & Richard I. Tanaka, McGraw-Hill Book Co., New York, 1967. To be consistent with said reference, the following discussion of mixed radix conversion utilizes one (1) based variable indexing instead of zero (0) based indexing used elsewhere herein. In a mixed-radix number system, "a number x may be expressed in a mixed-radix form:

$$x = a_N \prod_{i=1}^{N-1} R_i + \ldots + a_3 R_1 R_2 + a_2 R_1 + a_1$$

where the $R_i$ are the radices, the $a_i$ are the mixed-radix digits, and $0 \leq a_i < R_i$. For a given set of radices, the mixed-radix representation of x is denoted by $(a_n, a_{N-1}, \ldots, a_1)$ where the digits are listed in order of decreasing significance." See Id. "The multipliers of the digits $a_i$ are the mixed-radix weights where the weight of $a_i$ is $$\prod_{j=1}^{i-1} R_j \text{ for } i \neq 1.\text{" See Id.}$$

For conversion from the RNS to a mixed-radix system, a set of moduli are chosen so that $m_i = R_i$. A set of moduli are also chosen so that a mixed-radix system and a RNS are said to be associated. "In this case, the associated systems have the same range of values, that is $$\prod_{i=1}^{N} m_i.$$

The mixed-radix conversion process described here may then be used to convert from the [RNS] to the mixed-radix system." See Id.

"If $m_i = R_i$, then the mixed-radix expression is of the form:

$$x = a_N \prod_{i=1}^{N-1} m_i + \ldots + a_3 m_1 m_2 + a_2 m_1 + a_1$$

where $a_i$ are the mixed-radix coefficients. The $a_i$ are determined sequentially in the following manner, starting with $a_1$." See Id.

$$x = a_N \prod_{i=1}^{N-1} m_i + \ldots + a_3 m_1 m_2 + a_2 m_1 + a_1$$

is first taken modulo $m_1$. "Since all terms except the last are multiples of $m_1$, we have $\langle x \rangle_{m_{1=a1}}$. Hence, $a_1$ is just the first residue digit." See Id.

"To obtain $a_2$, one first forms x-$a_1$ in its residue code. The quantity x-$a_1$ is obviously divisible by $m_1$. Furthermore, $m_1$ is relatively prime to all other moduli, by definition. Hence, the division remainder zero procedure [Division where the dividend is known to be an integer multiple of the divisor and the divisor is known to be relatively prime to M] can be used to find the residue digits of order 2 through N of $$\frac{x - a_1}{m_1}.$$

Inspection of $$\left[ x = a_N \prod_{i=1}^{N-1} m_i + \ldots + a_3 m_1 m_2 + a_2 m_1 + a_1 \right]$$

shows then that x is $a_2$. In this way, by successive subtracting and dividing in residue notation, all of the mixed-radix digits may be obtained." See Id.

"It is interesting to note that $$a_1 = \langle x \rangle_{m_1},$$

$$a_2 = \left\langle \left\lfloor \frac{x}{m_1} \right\rfloor \right\rangle_{m_2},$$

$$a_3 = \left\langle \left\lfloor \frac{x}{m_1 m_2} \right\rfloor \right\rangle_{m_3}$$

and in general for i>1

$$a_i \left\langle \left\lfloor \frac{x}{m_1 m_2 \ldots m_{i-1}} \right\rfloor \right\rangle_{m_i}.\text{"}$$

See Id. From the preceding description it is seen that the mixed-radix conversion process is iterative. The conversion can be modified to yield a truncated result. Embodiments of the present invention are not limited in this regard.

According to another embodiment of the invention, a Chinese remainder theorem (CRT) arithmetic operation is used to map the RNS solutions No. 1, . . . , No. N to a weighted number system representation. The CRT arithmetic operation can be defined by a mathematical equation (30) [returning to zero (0) based indexing].

$$Y(nT) = \left\{ \left[ \left( \begin{array}{c} 3x_0^3(nT) + 3x_0^2(nT) + \\ x_0(nT) + C_0 \end{array} \right) b_0 \right]_{p_0} \frac{M}{p_0} + \ldots + \right. \\ \left. \left[ \left( \begin{array}{c} 3x_{N-1}^3(nT) + 3x_{N-1}^2(nT) + \\ x_{N-1}(nT) + C_{N-1} \end{array} \right) b_{N-1} \right]_{p_{N-1}} \frac{M}{p_{N-1}} \right\}_M \quad (30)$$

where Y(nT) is the result of the CRT arithmetic operation;
n is a sample time index value;
T is a fixed constant having a value representing a time interval or increment;
$x_0, \ldots, x_{N-1}$ are RNS solutions No. 1, ..., No. N;
$p_0, p_1, \ldots, p_{N-1}$ are prime numbers;
M is a fixed constant defined by a product of the relatively prime numbers $p_0, p_1, \ldots, p_{N-1}$; and
$b_0, b_1, \ldots, b_{N-1}$ are fixed constants that are chosen as the multiplicative inverses of the product of all other primes modulo $p_0, p_1, \ldots, p_{N-1}$, respectively.
Equivalently, $$b_j = \left( \frac{M}{p_j} \right)^{-1} \bmod p_j.$$

The $b_j$'s enable an isomorphic mapping between an RNS N-tuple value representing a weighted number and the weighted number. However without loss of chaotic properties, the mapping need only be unique and isomorphic. As such, a weighted number x can map into a tuple y. The tuple y can map into a weighted number z. The weighted number x is not equal to z as long as all tuples map into unique values for z in a range from zero (0) to M–1.

In other embodiments of the present invention, all $b_j$'s can be set equal to one or more non-zero values without loss of the chaotic properties. For example, if $b_j=1$ for all j, Equation 30 reduces to Equation 31. The invention is not limited in this regard.

$$Y(nT) = \left\{ \left[ \left( \begin{array}{c} 3x_0^3(nT) + 3x_0^2(nT) + \\ x_0(nT) + C_0 \end{array} \right) \right]_{p_0} \frac{M}{p_0} + \ldots + \right. \\ \left. \left[ \left( \begin{array}{c} 3x_{N-1}^3(nT) + 3x_{N-1}^2(nT) + \\ x_{N-1}(nT) + C_{N-1} \end{array} \right) \right]_{p_{N-1}} \frac{M}{p_{N-1}} \right\}_M \quad (31)$$

Referring again to FIG. 9, the chaotic sequence output can be expressed in a binary number system representation. As such, the chaotic sequence output can be represented as a binary sequence. Each bit of the binary sequence has a zero (0) value or a one (1) value. The chaotic sequence output can have a maximum bit length (MBL) defined by a mathematical equation (32).

$$MBL = \text{Ceiling}[\text{Log } 2(M)] \quad (32)$$

where M is the product of the relatively prime numbers $p_0, p_1, \ldots, p_{N-1}$ selected as moduli $m_0, m_1, \ldots, m_{N-1}$. In this regard, it should be appreciated that M represents a dynamic range of a CRT arithmetic operation. The phrase "dynamic range", as used herein, refers to a maximum possible range of outcome values of a CRT arithmetic operation. It should also be appreciated that the CRT arithmetic operation generates a chaotic numerical sequence with a periodicity equal to the inverse of the dynamic range M. The dynamic range requires a Ceiling[Log 2(M)] bit precision.

According to an embodiment of the invention, M equals three quadrillion five hundred sixty-three trillion seven hundred sixty-two billion one hundred ninety-one million fifty-nine thousand five hundred twenty-three (3,563,762,191,059,523). By substituting the value of M into mathematical equation (8), the bit length (BL) for a chaotic sequence output Y expressed in a binary system representation can be calculated as follows: BL=Ceiling[Log 2(3,563,762,191,059,523)]=52 bits. As such, the chaotic sequence output is a fifty-two (52) bit binary sequence having an integer value between zero (0) and three quadrillion five hundred sixty-three trillion seven hundred sixty-two billion one hundred ninety-one million fifty-nine thousand five hundred twenty-two (3,563,762,191,059,522), inclusive. Embodiments of the present invention are not limited in this regard. For example, the chaotic sequence output can be a binary sequence representing a truncated portion of a value between zero (0) and M–1. In such a scenario, the chaotic sequence output can have a bit length less than Ceiling[Log 2(M)]. It should be noted that while truncation affects the dynamic range of the system it has no effect on the periodicity of a generated sequence.

As should be appreciated, the above-described chaotic sequence generation can be iteratively performed. In such a scenario, a feedback mechanism (e.g., a feedback loop) can be provided so that a variable "x" of a polynomial equation can be selectively defined as a solution computed in a previous iteration. Mathematical equation (32) can be rewritten in a general iterative form: $f(x(nT)=Q(k)x^3((n-1)T)+R(k)x^2((n-1)T)+S(k)x((n-1)T)+C(k,L)$. For example, a fixed coefficient polynomial equation is selected as $f(x(n\cdot 1 \text{ ms}))=3x^3((n-1)\cdot 1 \text{ ms})+3x^2((n-1)\cdot 1\text{ms})+x((n-1)\cdot 1 \text{ ms})+8$ modulo 503. n is a variable having a value defined by an iteration being performed. x has a value allowable in a residue ring. In a first iteration, n equals one (1) and x is selected as two (2) which is allowable in a residue ring. By substituting the value of n and x into the stated polynomial equation f(x(nT)), a first solution having a value forty-six (46) is obtained. In a second iteration, n is incremented by one and x equals the value of the first solution, i.e., forty-six (46) resulting in the solution 298,410 mod 503 or one hundred thirty-one (131). In a third iteration, n is again incremented by one and x equals the value of the second solution.

Figure 10:
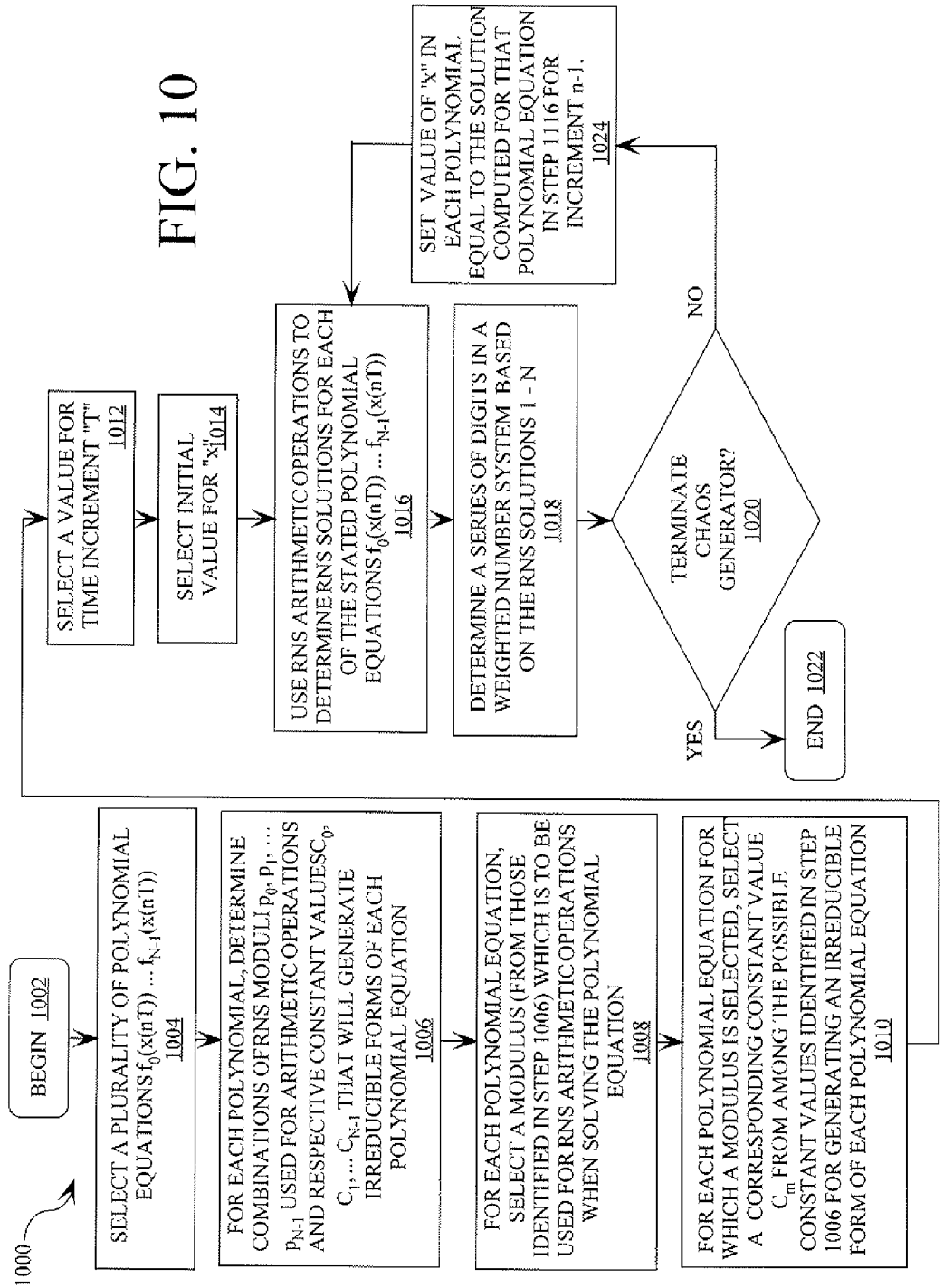
FIG. 10 is a flow diagram of a method for generating a chaotic spreading code (or chaotic sequence) according to an embodiment of the invention.

Referring now to FIG. 10, there is provided a flow diagram of a method 1000 for generating a chaotic sequence according to an embodiment of the invention. As shown in FIG. 10, method 1000 begins with step 1002 and continues with step 1004. In step 1004, a plurality of polynomial equations $f_0(x(nT)), \ldots, f_{N-1}(x(nT))$ are selected. The polynomial equations $f_0(x(nT)), \ldots, f_{N-1}(x(nT))$ can be selected as the same polynomial equation except for a different constant term or different polynomial equations. After step 1004, step 1006 is performed where a determination for each polynomial equation $f_0(x(nT)), \ldots, f_{N-1}(x(nT))$ is made as to which combinations of RNS moduli $m_0, m_1, \ldots, m_{N-1}$ used for arithmetic operations and respective constant values $C_0, C_1, \ldots, C_{N-1}$ generate irreducible forms of each polynomial equation $f_0(x(nT)), \ldots, f_{N-1}(x(nT))$. In step 1008, a modulus is selected for each polynomial equation $f_0(x(nT)), \ldots, f_{N-1}(x(nT))$ that is to be used for RNS arithmetic operations when solving the polynomial equation $f_0(x(nT)), \ldots, f_{N-1}(x(nT))$. The modulus is selected from the moduli identified in step 1006. It should also be appreciated that a different modulus must be selected for each polynomial equation $f_0(x(nT)), \ldots, f_{N-1}(x(nT))$.

As shown in FIG. 10, method 1000 continues with a step 1010. In step 1010, a constant $C_m$ is selected for each polynomial equation $f_0(x(nT))$, ..., $f_{N-1}(x(nT))$ for which a modulus is selected. Each constant $C_m$ corresponds to the modulus selected for the respective polynomial equation $f_0(x(nT))$, ..., $f_{N-1}(x(nT))$. Each constant $C_m$ is selected from among the possible constant values identified in step 1206 for generating an irreducible form of the respective polynomial equation $f_0(x(nT))$, ..., $f_{N-1}(x(nT))$.

After step 1010, method 1000 continues with step 1012. In step 1012, a value for time increment T is selected. Thereafter, an initial value for the variable x of the polynomial equations is selected. The initial value for the variable x can be any value allowable in a residue ring. Notably, the initial value of the variable x defines a sequence starting location. As such, the initial value of the variable x can define a static offset of a chaotic sequence.

Referring again to FIG. 10, method 1000 continues with step 1016. In step 1016, RNS arithmetic operations are used to iteratively determine RNS solutions for each of the stated polynomial equations $f_0(x(nT))$, ..., $f_{N-1}(x(nT))$. In step 1018, a series of digits in a weighted number system are determined based in the RNS solutions. Step 1018 can involve performing a mixed radix arithmetic operation or a CRT arithmetic operation using the RNS solutions to obtain a chaotic sequence output.

After completing step 1018, method 1000 continues with a decision step 1020. If a chaos generator is not terminated (1020:NO), then step 1024 is performed where a value of the variable "x" in each polynomial equation $f_0(x(nT))$, ..., $f_{N-1}(x(nT))$ is set equal to the RNS solution computed for the respective polynomial equation $f_0(x(nT))$, ..., $f_{N-1}(x(nT))$ in step 1016. Subsequently, method 1000 returns to step 1016. If the chaos generator is terminated (1020:YES), then step 1022 is performed where method 1000 ends.

Referring now to FIG. 11, there is illustrated one embodiment of the chaos generator 618 shown in FIG. 6. Chaos generators 640, 740, 760, 840, 860 are the same as or substantially similar to chaos generator 618. As such, the following discussion of chaos generator 618 is sufficient for understanding chaos generators 640 of FIG. 6, chaos generators 740, 760 of FIG. 7B, and chaos generators 840, 860 of FIG. 8B.

As shown in FIG. 11, chaos generator 618 is generally comprised of hardware and/or software configured to generate a digital chaotic sequence. Accordingly, chaos generator 618 is comprised of computing processors $1102_0$, ..., $1102_{N-1}$ and a mapping processor 1104. Each computing processor $1102_0$, ..., $1102_{N-1}$ is coupled to the mapping processor 1104 by a respective data bus $1106_0$, ..., $1106_{N-1}$. As such, each computing processor $1102_0$, ..., $1102_{N-1}$ is configured to communicate data to the mapping processor 1104 via a respective data bus $1106_0$, ..., $1106_{N-1}$. The mapping processor 1104 can be coupled to an external device (not shown) via a data bus 1108. The external device (not shown) includes, but is not limited to, a communications device configured to combine or modify a signal in accordance with a chaotic sequence output.

Referring again to FIG. 11, the computing processors $1102_0$, ..., $1102_{N-1}$ are comprised of hardware and/or software configured to solve the polynomial equations $f_0(x(nT))$, ..., $f_{N-1}(x(nT))$ to obtain a plurality of solutions. The polynomial equations $f_0(x(nT))$, ..., $f_{N-1}(x(nT))$ can be irreducible polynomial equations having chaotic properties in Galois field arithmetic. Such irreducible polynomial equations include, but are not limited to, irreducible cubic polynomial equations and irreducible quadratic polynomial equations. The polynomial equations $f_0(x(nT))$, ..., $f_{N-1}(x(nT))$ can also be identical exclusive of a constant value. The constant value can be selected so that a polynomial equation $f_0(x(nT))$, ..., $f_{N-1}(x(nT))$ is irreducible for a predefined modulus. The polynomial equations $f_0(x(nT))$, ..., $f_{N-1}(x(nT))$ can further be selected as a constant or varying function of time.

Each of the solutions can be expressed as a unique residue number system (RNS) N-tuple representation. In this regard, it should be appreciated that the computing processors $1102_0$, ..., $1102_{N-1}$ employ modulo operations to calculate a respective solution for each polynomial equation $f_0(x(nT))$, ..., $f_{N-1}(x(nT))$ using modulo based arithmetic operations. Each of the computing processors $1102_0$, ..., $1102_{N-1}$ is comprised of hardware and/or software configured to utilize a different relatively prime number $p_0, p_1, ..., p_{N-1}$ as a moduli $m_0, m_1, ..., m_{N-1}$ for modulo based arithmetic operations. The computing processors $1102_0$, ..., $1102_{N-1}$ are also comprised of hardware and/or software configured to utilize modulus $m_0, m_1, ..., m_{N-1}$ selected for each polynomial equation $f_0(x(nT))$, ..., $f_{N-1}(x(nT))$ so that each polynomial equation $f_0(x(nT))$, ..., $f_{N-1}(x(nT))$ is irreducible. The computing processors $1102_0$, ..., $1102_{N-1}$ are further comprised of hardware and/or software configured to utilize moduli $m_0, m_1, ..., m_{N-1}$ selected for each polynomial equation $f_0(x(nT))$, ..., $f_{N-1}(x(nT))$ so that solutions iteratively computed via a feedback mechanism $1110_0$, ..., $1110_{N-1}$ are chaotic. In this regard, it should be appreciated that the feedback mechanisms $1100_0$, ..., $1110_{N-1}$ are provided so that the solutions for each polynomial equation $f_0(x(nT))$, ..., $f_{N-1}(x(nT))$ can be iteratively computed. Accordingly, the feedback mechanisms $1110_00$, ..., $1110_{N-1}$ are comprised of hardware and/or software configured to selectively define variables "x" of a polynomial equation as a solution computed in a previous iteration.

Referring again to FIG. 11, the computing processors $1102_0$, ..., $1102_{N-1}$ are further comprised of hardware and/or software configured to express each of the RNS residue values in a binary number system representation. In this regard, the computing processors $1102_0$, ..., $1102_{N-1}$ can employ an RNS-to-binary conversion method. Such RNS-to-binary conversion methods are generally known to persons having ordinary skill in the art, and therefore will not be described herein. However, it should be appreciated that any such RNS-to-binary conversion method can be used without limitation. It should also be appreciated that the residue values expressed in binary number system representations are hereinafter referred to as moduli solutions No. 1, ..., No. N comprising the elements of an RNS N-tuple.

According to an embodiment of the invention, the computing processors $1102_0$, ..., $1102_{N-1}$ are further comprised of memory based tables (not shown) containing pre-computed residue values in a binary number system representation. The address space of each memory table is at least from zero (0) to $m_m-1$ for all m, $m_0$ through $m_{N-1}$. The table address is used to initiate the chaotic sequence at the start of an iteration. The invention is not limited in this regard.

Referring again to FIG. 11, the mapping processor 1104 is comprised of hardware and/or software configured to map the moduli (RNS N-tuple) solutions No. 1, ..., No. N to a weighted number system representation. The result is a series of digits in the weighted number system based on the moduli solutions No. 1, ..., No. N. For example, the mapping processor 1104 can be comprised of hardware and/or software configured to determine the series of digits in the weighted number system based on the RNS residue values using a Chinese Remainder Theorem process. In this regard, it will be appreciated by those having ordinary skill in the art that the mapping processor 1104 is comprised of hardware and/or software configured to identify a number in the weighted number system that is defined by the moduli solutions No. 1, . . . , No. N.

According to an aspect of the invention, the mapping processor 1104 can be comprised of hardware and/or software configured to identify a truncated portion of a number in the weighted number system that is defined by the moduli solutions No. 1, . . . , No. N. For example, mapping processor 1104 can be comprised of hardware and/or software configured to select the truncated portion to include any serially arranged set of digits of the number in the weighted number system. Mapping processor 1104 can also include hardware and/or software configured to select the truncated portion to be exclusive of a most significant digit when all possible weighted numbers represented by P bits are not mapped, i.e., when M−1<$2^P$. P is a fewest number of bits required to achieve a binary representation of the weighted numbers. The invention is not limited in this regard.

Referring again to FIG. 11, mapping processor 1104 is comprised of hardware and/or software configured to express a chaotic sequence in a binary number system representation. In this regard, it should be appreciated that the mapping processor 1104 can employ a weighted-to-binary conversion method. Weighted-to-binary conversion methods are generally known to persons having ordinary skill in the art, and therefore will not be described herein. However, it should be appreciated that any such weighted-to-binary conversion method can be used without limitation.

All of the apparatus, methods, and algorithms disclosed and claimed herein can be made and executed without undue experimentation in light of the present disclosure. While the invention has been described in terms of preferred embodiments, it will be apparent to those having ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the invention as defined.

We claim:

1. A method for selectively controlling access to multiple data streams which are communicated using a shared frequency spectrum and shared spreading codes, comprising:
   generating a first product signal by spreading first symbols of a first amplitude modulated signal using a first spreading code;
   generating a second product signal by spreading second symbols of a complimentary amplitude modulated signal using a second spreading code;
   combining said first and second product signals to form a protected data communication signal including first data recoverable by at least one receiver of a plurality of receivers; and
   combining a global data communication signal and said protected data communication signal to form an output signal having a spread spectrum format;
   wherein said global data communication signal is generated using a digital modulation process and includes second data recoverable by all of said plurality of receivers.

2. The method according to claim 1, wherein said first and second spreading codes include pseudo-random number sequences.

3. The method according to claim 1, wherein said first and second spreading codes include digitally generated chaotic sequences.

4. The method according to claim 1, wherein said second spreading code is orthogonal or statistically orthogonal to said first spreading code.

5. The method according to claim 1, wherein said digital modulation process includes a phase modulation process.

6. The method according to claim 1, wherein said first and second product signals are additively combined to produce a constant power envelope in said protected data communication signal.

7. The method according to claim 1, further comprising recovering said global data communication signal at a first receiver of said plurality of receivers by de-spreading said output signal using a sum of a third spreading code and a fourth spreading code which are respectively identical to said first spreading code and said second spreading code.

8. The method according to claim 7, further comprising synchronizing in time said first and third spreading codes, and said second and fourth spreading codes.

9. The method according to claim 7, further comprising preventing said first receiver from independently recovering the third spreading code or the fourth spreading code.

10. The method according to claim 1, further comprising recovering said first product signal at a first receiver of said plurality of receivers by de-spreading said output using a third spreading code that is identical to said first spreading code.

11. A communication system configured for selectively controlling access to multiple data streams which are communicated using a shared frequency spectrum and shared spreading codes, comprising:
   a first discrete time amplitude modulator generating a first product signal by spreading first symbols of a first amplitude modulated signal using a first spreading code;
   a second discrete time amplitude modulator configured for generating a second product signal by spreading second symbols of a complimentary amplitude modulated signal using a second spreading code;
   a first combiner configured for combining said first and second product signals to form a protected data communication signal including first data recoverable by at least one receiver of a plurality of receivers; and
   a second combiner configured for combining a global data communication signal and said protected data communication signal to form an output signal having a spread spectrum format;
   wherein said global data communication signal is generated using a digital modulation process and includes second data recoverable by all of said plurality of receivers.

12. The communication system according to claim 11, wherein said first and second spreading codes include pseudo-random number sequences.

13. The communication system according to claim 11, wherein said first and second spreading codes include digitally generated chaotic sequences.

14. The communication system according to claim 11, wherein said second spreading code is orthogonal or statistically orthogonal to said first spreading code.

15. The communication system according to claim 11, wherein said digital modulation process includes a phase modulation process.

16. The communication system according to claim 11, wherein said first combiner is further configured for additively combining said first and second product signals to produce a constant power envelope in said protected data communication signal.

17. The communication system according to claim 11, further comprising:
   a transmitter configured for transmitting said output signal to a first receiver of said plurality of receivers;
   wherein said first receiver is configured for recovering said global data communication signal by de-spreading said output signal using a sum of a third spreading code and a fourth spreading code which are respectively identical to said first spreading code and said second spreading code.

18. The communication system according to claim 17, wherein said first and third spreading codes are synchronized in time and said second and fourth spreading codes are synchronized in time.

19. The communication system according to claim 17, wherein said first receiver is prevented from independently recovering said third spreading code or said fourth spreading code.

20. The communication system according to claim 11, further comprising:
   a transmitter configured for transmitting said output signal to a first receiver of said plurality of receivers;
   wherein said first receiver is configured for recovering said first product signal by de-spreading said output using a third spreading code that is identical to said first spreading code.

* * * * *